US012649340B2

(12) United States Patent
Holz

(10) Patent No.: US 12,649,340 B2
(45) Date of Patent: Jun. 9, 2026

(54) DEVICE FOR COUPLING A TRAILER

(71) Applicant: ACPS Automotive GmbH, Ingersheim (DE)

(72) Inventor: Christian Holz, Fellback (DE)

(73) Assignee: ACPS Automotive GmbH (DE)

( * ) Notice: Subject to any disclaimer, the term of this patent is extended or adjusted under 35 U.S.C. 154(b) by 781 days.

(21) Appl. No.: 17/869,038

(22) Filed: Jul. 20, 2022

(65) Prior Publication Data

US 2022/0396106 A1     Dec. 15, 2022

Related U.S. Application Data

(63) Continuation of application No. PCT/EP2020/077594, filed on Oct. 1, 2020.

(30) Foreign Application Priority Data

Jan. 21, 2020   (DE) .......................... 102020101304.3
Jul. 2, 2020    (DE) .......................... 102020117528.0

(51) Int. Cl.
| | |
|---|---|
| *B60D 1/24* | (2006.01) |
| *B60D 1/06* | (2006.01) |
| *B60D 1/52* | (2006.01) |
| *B60D 1/54* | (2006.01) |
| *B60D 1/62* | (2006.01) |
| *B60W 30/02* | (2012.01) |
| *G01L 1/22* | (2006.01) |

(52) U.S. Cl.
CPC .............. *B60D 1/248* (2013.01); *B60D 1/06* (2013.01); *B60D 1/52* (2013.01); *B60D 1/54* (2013.01); *B60D 1/62* (2013.01); *B60W 30/02* (2013.01); *G01L 1/2262* (2013.01); *B60W 2530/207* (2020.02)

(58) Field of Classification Search
CPC .. B60D 1/248; B60D 1/06; G01L 1/22; G01L 1/2287; G01L 1/225; G01L 1/2262; B60W 30/02
See application file for complete search history.

(56) References Cited

U.S. PATENT DOCUMENTS 5,273,347 A * 12/1993 Hansson ................... B60T 7/20
                                                        303/7
10,717,332 B2     7/2020  Gentner et al.
                (Continued)

FOREIGN PATENT DOCUMENTS

DE          3617426 C1      9/1987
DE      102011106302 B3     9/2012
                (Continued)

*Primary Examiner* — Paul M. West

(74) *Attorney, Agent, or Firm* — Reinhart Boerner Van Deuren P.C.

(57)          ABSTRACT

The invention relates to a device, which can be mounted on the rear end of a motor vehicle body, for coupling a trailer or a load carrier unit, comprising a holding arm, which at a first end is fixedly connected to the motor vehicle body during operation and which, at a second end, is configured to support a coupling element, wherein the holding arm is provided with a sensor arrangement with at least three deformation sensors, and wherein the at least three deformation sensors deliver sensor values, on the basis of which at least one force component is determined by means of an evaluation unit.

35 Claims, 46 Drawing Sheets

(56)                  References Cited

U.S. PATENT DOCUMENTS

| | | | |
|---|---|---|---|
| 2004/0075243 A1 | 4/2004 | Reutlinger et al. | |
| 2005/0006946 A1* | 1/2005 | Traechtler | B60D 1/065 |
| | | | 303/7 |
| 2008/0249421 A1* | 10/2008 | Twery | A63B 24/0062 |
| | | | 600/481 |
| 2010/0114437 A1* | 5/2010 | Boss | B60K 28/08 |
| | | | 701/48 |
| 2010/0332049 A1 | 12/2010 | Sy et al. | |
| 2013/0253814 A1 | 9/2013 | Wirthlin | |
| 2015/0231938 A1 | 8/2015 | Gentner | |
| 2017/0334256 A1 | 11/2017 | Scheips et al. | |
| 2019/0033150 A1* | 1/2019 | Lassche | G01L 1/10 |
| 2019/0070915 A1 | 3/2019 | Gentner et al. | |
| 2019/0381844 A1 | 12/2019 | Niedert et al. | |

FOREIGN PATENT DOCUMENTS

| | | |
|---|---|---|
| DE | 102014217801 A1 | 3/2016 |
| DE | 102014117712 A1 | 6/2016 |
| DE | 102016107302 A1 | 10/2017 |
| DE | 2016108541 A1 | 11/2017 |
| EP | 1380446 A1 | 1/2004 |
| EP | 2589504 A1 | 5/2013 |
| EP | 2907681 A1 | 8/2015 |
| EP | 3379222 A1 | 9/2018 |

* cited by examiner

$$\begin{pmatrix} F_x \\ F_y \\ F_z \end{pmatrix} = \begin{pmatrix} t_{1x} & t_{2x} & t_{3x} \\ t_{1y} & t_{2y} & t_{3y} \\ t_{1z} & t_{2z} & t_{3z} \end{pmatrix} * \begin{pmatrix} U_{D152} \\ U_{D154} \\ U_{D156} \end{pmatrix}$$

Figure 43:
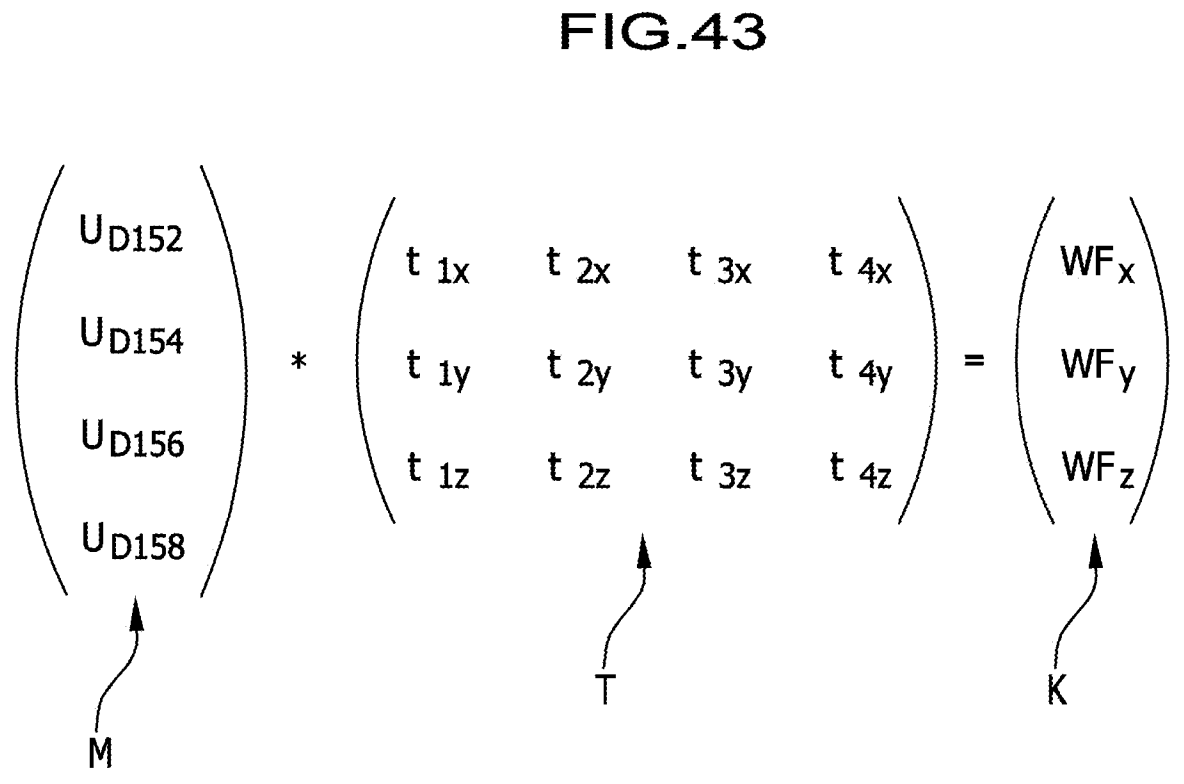

$$
\begin{pmatrix} WF_x \\ WF_y \\ WF_z \end{pmatrix} = \begin{pmatrix} t_{1x} & t_{2x} & t_{3x} & t_{4x} \\ t_{1y} & t_{2y} & t_{3y} & t_{4y} \\ t_{1z} & t_{2z} & t_{3z} & t_{4z} \end{pmatrix} * \begin{pmatrix} U_{D152} \\ U_{D154} \\ U_{D156} \\ U_{D158} \end{pmatrix}
$$

K

T

M

DEVICE FOR COUPLING A TRAILER

This application is a continuation of international application number PCT/EP2020/077594 filed on 1 Oct. 2020 and claims the benefit of German application number 10 2020 101 304.3 filed on 21 Jan. 2020 and German application number 10 2020 117 528.0 filed on 2 Jul. 2020.

The present disclosure relates to the subject matter disclosed in international application number PCT/EP2020/077594 of 1 Oct. 2020 and German application number 10 2020 101 304.3 of 21 Jan. 2020 and German application number 10 2020 117 528.0 of 2 Jul. 2020, which are incorporated herein by reference in their entirety and for all purposes.

BACKGROUND OF THE INVENTION

The invention relates to a device, which can be mounted on the rear end of a motor vehicle body, for coupling a trailer or a load carrier unit, comprising a holding arm, which at a first end is fixedly connected to the motor vehicle body during operation and which, at a second end, is configured to support a coupling element.

Such devices are known from the prior art.

In these devices there is the problem of detecting the forces acting on the holding arm as precisely and reliably as possible.

SUMMARY OF THE INVENTION

In a device of the kind described at the outset, this problem is solved in accordance with the invention in that the holding arm is provided with a sensor arrangement, in that the holding arm is provided with at least three deformation sensors, which in particular respond differently to three forces acting on the coupling element in spatial directions running transversely to one another, and in that the three deformation sensors deliver sensor values, on the basis of which at least one force component acting on the coupling element is determined by means of an evaluation unit.

The advantage of the solution according to the invention can be considered to be that it provides a suitable way of reliably determining the forces on the coupling element and thus also on the holding arm.

It is particularly favourable if the evaluation unit determines the values of its force components running in the spatial directions so that the information regarding the orientation and values of the force components is thus available, moreover in a simple way.

It is particularly advantageous if the evaluation unit determines the value of its force component running in the direction of the force of gravity.

This force component is particularly useful for determining the magnitude of the support load acting on the motor vehicle, since the support load has a disadvantageous effect on the driving properties and should not exceed a prescribed value.

It is additionally advantageous if the evaluation unit determines the value of its force component running in the direction of travel of the motor vehicle.

The value of the force component acting in the direction of travel is also of significant importance for the driving properties of the motor vehicle and for this reason should be known.

It is additionally advantageous if the evaluation unit determines the value of its force component running transversely, in particular perpendicularly to a vertical longitudinal median plane.

This value of the force component effective transversely to the longitudinal median plane is also important in particular for the driving stability, in particular for the driving stability of the motor vehicle necessary transversely to the driving direction.

A wide range of different solutions are conceivable in respect of the effect of the force acting on the coupling element and thus on the holding arm.

For example, for this purpose it would be conceivable to use directly the sensor values delivered by the sensor arrangement, without further correction.

However, this leads to significant inaccuracies for many reasons.

It is therefore preferably provided that the evaluation unit, prior to a determination of the force components, checks by means of a state detection stage whether a suitable state exists for determining the force components on the coupling element.

With this state detection stage, it is thus possible to determine from the outset that a value is determined for the force components which might be erroneous, in particular extremely erroneous, on account of an unsuitable state of the device or of the motor vehicle.

For example, it is preferably provided that the state detection stage, by detecting at least one of the parameters such as voltage supply, vehicle orientation in space, presence of the working position of the holding arm, checks whether a suitable state exists for determining the force components on the coupling element.

For example, an inadmissible voltage supply has the consequence that the sensor values generated by the sensor arrangement are falsified, and thus their evaluation would lead to completely erroneous values of the force components.

In addition, the vehicle orientation in space, in particular the orientation such that the vehicle is oriented as standing on a plane running substantially horizontally, is important, since otherwise non-representative forces that are too strong act on the coupling element and the holding arm.

A substantially horizontal orientation of the plane means that this plane may be inclined at most by ±30°, better still ±20° and preferably ±10° relative to an exactly horizontally running plane in all directions of the plane, in order to prevent the sensor arrangement from delivering unusable sensor values for the determination of the values of the force components.

Furthermore, it is likewise important that the holding arm is in the working position and not in a position inadmissible for an operating state, which likewise would again deliver completely inaccurate values for the force components on the coupling element or the holding arm.

After checking a suitable state for determining the force components on the coupling element, it is preferably advantageous if the evaluation unit, by means of a zero-load detection stage, prior to determination of the force components on the coupling element, detects the values of the force components, determined on the basis of the sensor values of the deformation sensors, in the case of a zero load.

With a detection of this kind of the values of the force components in the case of a zero load, it is ensured that the values of the force components determined in the case of a load on the coupling element have no significant falsification.

For example, it is preferably provided that, following a movement of the holding arm into a working position, at least one of the values of the force components at zero load is detected by the zero-load detection stage.

It can thus be ruled out that the zero-load detection stage already outside the working position determines the values of the force components, which thus are non-representative for the case of the zero load.

In addition, it is preferably provided that, following mounting of a coupling element to the holding arm, at least one of the values of the force components at zero load is detected by the zero-load detection stage.

In addition, it is particularly advantageous if the values of the force components at zero load are stored by the zero-load detection stage only if the values of the force components of the zero-load detection stage drop below predefined values ruling out an external force on the coupling element.

This check represents a plausibility check insofar as it ensures that the values of the force components lie within a realistic range and are not falsified by other influences.

In addition, it is preferably provided that, in the event of recognition of movement towards an object, in particular towards a trailer or a load carrier, at least one of the values of the force components at zero load is detected by the zero-load detection stage.

This means that, in this case, for example advantageously only during the course of the movement towards an object, which may lead to a force on the coupling element and holding arm, the values at zero load are detected in order to prevent falsified values of the force components due to other circumstances.

Lastly, it is advantageous if, following a detection of at least one of the values of the force components at zero load, at least one of the values of the force components at zero load is detected once more after a predefined time, in order to prevent the values of the force components from changing following an excessively long time interval after determination of the values of the force components at zero load, which would lead to falsified results.

In addition, a further advantageous solution provides that the evaluation unit, by means of a load detection stage for determining at least one of the load-induced values of the force components, subtracts the corresponding values of the force components delivered at zero load from the values of the force components delivered when a force is acting on the coupling element.

It is thus advantageously ensured that the values of the force components at zero load do not influence the load-induced values of the force components, which are induced solely by the object acting on the coupling element, for example the trailer or the load carrier.

Also when determining the force on the coupling element, checks are performed by the load detection stage in order to avoid falsifications of the values of the force components.

For example, an advantageous solution provides that a load detection stage performs a determination of at least one of the values of the force components on the coupling element, provided an on-board function of the motor vehicle is performed, so that the force on the coupling element is prevented from being determined without a performed on-board function, that is to say without an operating state of the motor vehicle, for example if the vehicle is in standby operation or is switched off.

In addition, it is preferably provided that the load detection unit performs a determination of at least one of the values of the force components on the coupling element if a plug is inserted into a socket associated with the holding arm.

The fact that a plug is inserted in a socket associated with the holding arm is evaluated here as a signal for the fact that a trailer or a load carrier unit engage the coupling element, and therefore engagement by an object exists only if the force on the coupling element is determined.

Another advantageous solution provides that the load detection stage performs a determination of at least one of the values of the force components on the coupling element following recognition of an object engaging with the coupling element.

Such a recognition of an object engaging with the coupling element can be implemented, for example, by a camera system or a sensor unit, for example by ultrasonic sensors, by means of which a rear end of the vehicle is monitored, for example during reverse travel.

It is furthermore preferably provided that the load detection stage then performs a determination of at least one of the values of the force components on the coupling element when the speed of the motor vehicle is less than 5 km per hour, in particular when the vehicle is stationary, in order to thus ensure that the determined force components on the coupling element are not falsified by dynamic influences, but represent the static force effect on the coupling element.

In addition, in a preferred exemplary embodiment, it is provided that the evaluation unit, by means of a presentation stage, transmits at least one value of the load-induced force components acting on the coupling element.

This can be implemented in many different ways.

For example, an advantageous solution provides that the evaluation unit, by means of a presentation stage, transmits at least one value of the load-induced force component acting in the vertical direction on the coupling element.

Furthermore, an advantageous solution provides that the evaluation stage, by means of a presentation stage, transmits at least one value of the load-induced force component acting on the coupling element in the direction of travel and in particular parallel to a vertical longitudinal median plane.

A further advantageous solution provides that the evaluation unit, by means of the presentation stage, transmits at least one value of the load-induced force component acting transversely to a vertical longitudinal median plane of the holding arm and in particular in an approximately horizontal direction.

A transmission of this kind of the particular values of the force components can be implemented in many different ways.

For example, an advantageous solution provides that the presentation stage, by means of a presentation unit, indicates the at least one value of the particular force component and in particular also indicates the measurement accuracy associated with this value.

A further advantageous way of determining the value of the force components provides that the presentation stage, by means of the presentation unit, indicates qualitatively the at least one value of the particular force component, in order to thus give a user of the device according to the invention, in a simple way, an impression of the extent to which the coupling element and the holding arm are loaded by the force.

A further advantageous solution provides that the presentation stage, by means of the presentation unit, indicates the value of the load-induced force component acting on the coupling element in the vertical direction in relation to a predefined support load for the motor vehicle.

This solution has the particular advantage that the value of the support load significant in particular for the driving properties can be detected for the user of the vehicle in a simple way in relation to the permitted support load.

A further advantageous solution provides that the presentation stage, by means of the presentation unit, indicates the value of the force component acting in the direction of travel in relation to a maximum tractive force, in order to likewise give the user of the motor vehicle, in a simple way, an indication of the influence for example of a trailer or a load carrier on the driving properties of the vehicle.

A further expedient solution provides that the presentation stage transmits at least one of the values of the force components acting on the coupling element to an electronic stabilisation system of the motor vehicle.

A further expedient solution provides that the presentation stage transmits at least one of the values of the force components acting on the coupling element to a chassis control system of the motor vehicle.

A particularly advantageous solution of the device according to the invention provides that the deformation sensors are arranged relative to the holding arm such that they deliver different sensor values under the action of a force having an identical value in each of the three spatial directions running transversely to one another.

Here, it is provided in particular that four deformation sensors are arranged on the holding arm and deliver different sensor values in the event of a force acting with the same magnitude in the various spatial directions running transversely to one another.

In the solution according to the invention it is assumed that the values of the force components acting on the coupling element are linked to sensor values by means of transformation coefficients.

In particular, it is assumed that the sensor values delivered by the deformation sensors are linked by means of transformation coefficients of a transformation matrix to the force components in the three spatial directions running transversely to one another.

Here, it is provided advantageously that, from the coupling element as centre point, the space around the coupling element is divided into eight octants defined by the three spatial directions running transversely to one another, that an octant-based transformation matrix is predefined in the evaluation circuit for each of the octants, that the evaluation circuit determines the values of the force components by means of one of the predefined transformation matrices and assigns them to one of the octants and then, on the basis of the octant-based transformation matrix, again determines the values for the force components for the octants receiving the force vector.

With this solution it has been made possible in a simple way to determine more precise values for the individual force components by means of the octant-based transformation matrices.

In addition, the problem mentioned at the outset is solved in accordance with the invention by a method for detecting the force on a device, which can be mounted on the rear end of a motor vehicle body, for coupling a trailer or a load carrier unit, comprising a holding arm, which at a first end is fixedly connected to the motor vehicle body during operation and which, at a second end, is configured to support a coupling element, wherein the holding arm is provided with a sensor arrangement, wherein in this method, in accordance with the invention, the holding arm is provided with at least three deformation sensors, which in particular respond in different ways to three forces acting on the coupling element in spatial directions running transversely to one another, and in that the at least three deformation sensors deliver sensor values, on the basis of which at least one force component acting on the coupling element is determined.

The advantage of the solution according to the invention can be considered that it is possible, in a simple way, to determine reliable values for the effective force.

It is particularly advantageous if at least one of the values of the force components running in these spatial directions is determined.

It is particularly advantageous if at least the value of the force component running in the direction of the force of gravity is determined.

It is also advantageous if at least the value of the force component running in the direction of travel of the motor vehicle is determined.

It is further advantageous if at least the value of the force component running transversely, in particular perpendicularly, to a vertical longitudinal median plane is determined.

In order to avoid erroneous determinations of the values of the force components on the coupling element, it is preferably provided that, prior to a determination of the values of the force components, it is checked whether a suitable state for determining the force components on the coupling element exists.

To this end, a wide range of different criteria can be used.

A favourable solution provides that, by detecting at least one of the parameters such as voltage supply, in particular of the deformation sensors, vehicle orientation in space, that is to say a vehicle orientation in such a way that the vehicle is standing substantially on a horizontal plane, and presence of the working position of the holding arm, it is checked whether a suitable state for determining the force component on the coupling element exists.

In order to avoid a falsification of the values of the force components, at least one of the values of the force components is detected in the case of a zero load prior to a determination of the force components.

It is furthermore advantageous if the values of the force components at zero load are detected following a movement of the holding arm into a working position, so that a determination of the values of the force components outside the working position can be avoided, which would lead to erroneous results.

In addition, an advantageous solution provides alternatively or additionally that the values of the force components at zero load are detected following a mounting of the coupling element on the holding arm, provided the coupling element is not fixedly connected to the holding arm, in order to likewise avoid incorrect measurements.

In addition, it is provided that the values of the force components at zero load are stored only if the values drop below predefined values ruling out an external force on the coupling element, so that a plausibility check is thus possible in order to rule out an erroneous detection of the zero load.

A further advantageous solution provides that the values of the force components at zero load are detected following recognition of movement towards an object, in particular towards a trailer or a load carrier.

Lastly, it is preferably provided that, following a detection of the values of the force components at zero load, the values at zero load are detected once more after a predefined time, in order to ensure that the initially detected values of the force components at zero load are not permanently maintained and therefore cannot lead to incorrect measurements.

In order to obtain the most accurate possible load-induced values of the force components, it is preferably provided that, to determine at least one of the load-induced values of the force components, the corresponding values of the force components delivered at zero load are subtracted from the values of the force components delivered when a force is acting on the coupling element.

The force on the coupling element, in order to likewise avoid incorrect determinations of the force on the coupling element, can then be determined in particular if it is ensured, wherever possible, that the state of the motor vehicle and of the device according to the invention allows the most error-free determination possible of the force on the coupling element.

For example, it is thus provided that at least one of the values of the force components on the coupling element is determined, provided an on-board function of the motor vehicle is performed, that is to say the motor vehicle is in a state ready for operation, but not in a standby state or for example in a switched-off state.

A further advantageous solution provides that a determination of at least one of the values of the force components on the coupling element is performed if a plug is inserted into a socket associated with the holding arm.

Here, the insertion of the plug into the socket associated with the holding arm can be evaluated as a signal for the fact that an object is engaged with the holding arm, in particular the coupling element, and thus exerts a force thereon.

Another expedient solution provides that at least one of the values of the force components on the coupling element is determined following recognition of an object, in particular a trailer or a load carrier, engaging with the coupling element.

This recognition of an object engaging with the coupling element can be implemented for example by means of a camera system or a sensor arrangement, preferably an ultrasonic sensor arrangement, which are usually provided anyway to facilitate reverse travel by the motor vehicle.

A further expedient solution provides that at least one of the values of the force components on the coupling element is determined if the speed of the motor vehicle is less than 5 km per hour, in particular if the motor vehicle is stationary, so that the occurrence of dynamic forces can thus be excluded and it can be ensured that only static forces acting on the coupling element are detected.

Following the determination of at least one of the values of the force components, this is transmitted in many different ways.

It is preferably provided that at least one of the values of the force component acting on the coupling element in the vertical direction is transmitted.

It is further advantageous if at least one of the values of the force component acting on the coupling element in the direction of travel and in particular parallel to a vertical longitudinal median plane is transmitted.

Lastly, a further expedient solution provides that at least one of the values of a force component acting transversely to a vertical longitudinal median plane of the holding arm, in particular in an approximately horizontal direction, is transmitted.

In addition, the values of the particular force component can be transmitted in many different ways.

One possibility provides that at least one of the values of the particular force component and in particular the measurement accuracy associated therewith is indicated, that is to say is indicated on a presentation unit, for example a display.

It is thus made easier for a user of the motor vehicle to very quickly recognise the quality of the determination of the value of the particular force component and, on this basis, to reach the conclusions necessary to move the vehicle.

In order to allow a quick assessment of the values of the force component, a solution provides in particular that at least one of the values of the particular force component is indicated qualitatively, in order to allow a quick evaluation of the forces acting on the device according to the invention, without the need for detailed study.

A further advantageous solution provides that the value of the force component acting on the coupling element in the vertical direction is indicated in relation to a predefined support load for the particular motor vehicle.

Furthermore, an advantageous solution provides that the value of the force component acting in the direction of travel is indicated in relation to a maximum tractive force, in order to likewise make it easier for a user of the vehicle to determine the effect of the forces acting on the vehicle.

A further advantageous solution provides that at least one of the values of the force components acting on the coupling element is transmitted to an electronic stabilisation system of the motor vehicle, so that it is thus possible, in a simple way, to also take into consideration the forces acting by the trailer or the load carrier already at the time of electronic stabilisation of the vehicle.

In addition, an advantageous solution provides that the value of the force components acting on the coupling element is transmitted to a chassis control system of the motor vehicle.

In conjunction with the previous explanation of the individual variants of the method according to the invention, it was not discussed in further detail how the values of the force components acting on the coupling element are linked to the sensor values.

For example, an advantageous solution provides that the values of the force components acting on the coupling element are linked to sensor values by means of transformation coefficients.

A linking of this kind represents a simple mathematical solution which takes into account the different conditions.

In particular, it is provided that the sensor values delivered by the deformation sensors are linked by means of the transformation coefficients of a transformation matrix to the values of the force components in the three spatial directions running transversely to one another.

No further details have yet been provided in respect of the determination of the transformation coefficients of the transformation matrix.

For example, an advantageous solution provides that the transformation coefficients of the transformation matrix are determined within the scope of a calibration process.

A calibration process of this kind for example provides that, under the action of a defined force component on the coupling element, the sensor values delivered by the deformation sensors are detected, wherein, during the calibration process, successive different force components on the coupling element are used to generate different sensor values.

In particular, it is provided here that, during the calibration process, the coupling element is acted on in one of the three spatial directions running transversely to one another, in each case with a defined force component, and the sensor values delivered by the deformation sensors are detected.

In particular, the calibration can be performed advantageously if, during the calibration process, each force component acting in one of the three spatial directions has the same value, wherein in particular the individual force components act successively on the coupling element, in order to obtain the particular sensor values for each of the individual force components.

A particularly simple mathematical model provides that the transformation coefficients are determined on the assumption of a linear link between the values of the force components in the three spatial directions running transversely to one another and the sensor values delivered by the deformation sensors.

Alternatively or additionally, however, it is also conceivable to carry out the determination of the transformation coefficients by other methods, for example by means of the least squares method.

A particularly simple approach provides that the spatial directions running transversely to one another run perpendicularly to one another.

An improved approach for determining the values of the force components provides that, starting from the coupling element as centre point, the space around the coupling element is divided into eight octants defined by the three spatial directions running transversely to one another, that, in order to determine the transformation coefficient set in each of the octants, the coupling element is acted on by force components lying within a particular octant, that the sensor values are detected, and that octant-based transformation coefficients are determined for these force components in each of the octants.

However, in order to be able to use the octant-based transformation coefficient, it is preferably provided that, in order to determine the values of the force components on the coupling element, one of the transformation matrices, which may be a non-octant-based transformation matrix or one of the octant-based transformation matrices, is used and it is then checked to which of the octants the force components should be assigned and then a renewed determination of the values of the force components is performed with the transformation matrix assigned to this octant.

Alternatively or additionally to the above-described solutions, the problem is also solved in accordance with the invention for a device of the kind described at the outset in that forces acting on the coupling element during operation and transferred from the holding arm to the motor vehicle body are detected by an evaluation unit with a sensor arrangement which has at least three deformation sensors, and in that in particular the at least three deformation sensors of the sensor arrangement are arranged on the same side of a neutral fibre of the holding arm not deformed under a bending deformation of the holding arm.

The advantage of the solution according to the invention lies in the fact that it is thus possible to detect the deformations of the holding arm in a simple way using a sensor arrangement.

In particular, it is advantageous here if all sensors of the sensor arrangement are arranged on the same side of the neutral fibre of the holding arm not deformed under a deformation of the holding arm.

The problem mentioned at the outset is also solved in accordance with the invention for a device of the kind described at the outset in that a force detection module is arranged on one side of the holding arm and comprises a sensor arrangement which detects forces that act on the coupling element during operation and are transferred from the holding arm to the motor vehicle body.

A force detection module of this kind represents an advantageous and simple solution for detecting the forces acting on the holding arm.

In particular, it is provided here that the sensor arrangement of the force detection module has at least three deformation sensors.

No further details have yet been provided in respect of the arrangement of the motor vehicle module.

Thus an advantageous solution provides that the force detection module in the operating state is not arranged on a side of the holding arm facing a roadway, that is to say the force detection module is merely arranged on the sides of the holding arm not facing the roadway, since the force detection module is thus prevented from being damaged as a result of contact between the holding arm and objects arranged on a roadway or on a subsurface.

It is particular favourable here if the force detection module is arranged in the operating state on a side of the holding arm facing away from a roadway.

An arrangement of this kind of the force detection module has the advantage that this is the side that is least likely to result in damage to the force detection module.

In order, on the one hand, to be able to arrange the deformation sensors advantageously and, on the other hand, to be able to transfer the deformations of the holding arm advantageously to the deformation sensors, it is preferably provided in a further solution to the problem described at the outset that forces acting on the coupling element during operation and transferred from the holding arm to the motor vehicle body are detected by an evaluation unit with a sensor arrangement which has at least three deformation sensors, and that the deformation sensors are arranged on at least one deformation transfer element which is connected to the holding arm.

Here, the deformations can be arranged on different deformation transfer elements.

It is particularly favourable in a further solution of the problem described at the outset if forces acting on the coupling element during operation and transferred from the holding arm to the motor vehicle body are detected by an evaluation unit with a sensor arrangement which has at least three deformation sensors and if all deformation sensors of the sensor arrangement are arranged on a common deformation transfer element.

A particularly advantageous detection of the forces acting on the holding arm is then possible in particular if each of the at least three deformation sensors, with one and the same force acting on the coupling element, detects deformations of differing magnitude of the holding arm, since differently oriented forces that may act on the coupling element can thus be separated in a simple way.

In respect of the connection of the deformation transfer element to the holding arm, it is preferably provided that the deformation transfer element is connected to the holding arm in a manner free from relative movement and thereby rigidly at least at two fastening regions, and that at least one of the deformation sensors is arranged between the fastening regions of the deformation element.

It is even more advantageous if the deformation transfer element is connected by at least three fastening regions to the holding arm and if at least one of the deformation sensors is respectively arranged between two of the fastening regions.

No further details have yet been provided in respect of the connection of the fastening regions of the deformation transfer element to the holding arm.

In principle, it is conceivable to connect the fastening regions directly to the holding arm, for example by welding thereto.

A particularly advantageous solution, however, provides that the deformation transfer element is connected in the fastening regions to the holding arm by means of connection elements.

A connection of this kind to the holding arm by means of the connection elements can be realised particularly favourably if the connection elements are connected on the one hand rigidly to the holding arm and on the other hand rigidly to the fastening regions of the deformation transfer element.

A particularly advantageous solution provides that the connection elements are moulded onto the holding arm, in particular in one piece.

When providing a connection of this kind between the holding arm and the deformation transfer element, it is preferably provided that the connection elements transfer deformations of the holding arm in deformation regions of the holding arm located between the connection elements to the fastening regions of the deformation transfer element.

In particular, it is favourable if a deformation region of the holding arm is located in each case between two connection elements.

A structurally particularly advantageous solution provides that the holding arm has at least two deformation regions, the deformation of which is transferred via connection elements arranged on either side of the respective deformation region to fastening regions of the deformation transfer element, between which there is a deformable region of the deformation transfer element.

In respect of the arrangement of the two deformation regions in the holding arm, it is particularly advantageous if the at least two deformation regions are arranged successively in a direction of extent of the holding arm.

It is furthermore favourable for detecting the deformations in the deformable regions if at least one deformation sensor is arranged in one of the deformable regions of the deformation transfer element.

In particular, at least one deformation sensor is arranged here in each of the deformable regions of the deformation transfer element.

In addition, it is expediently provided that each deformable region is connected to a deformation-resistant region of the deformation transfer element and that the fastening regions each lie in a deformation-resistant region, and therefore are comprised by the respective deformation-resistant region.

A deformation-resistant region is understood here to mean in particular that this has a significantly higher rigidity, that is to say higher at least by a factor of two, even better at least by a factor of five, than a deformable region.

This solution has the advantage that the greatest possible amount of the deformations transferred from the deformation regions of the holding arm to the deformation transfer element are not distributed over the entire deformation transfer element, but act substantially in the deformable regions, in order to thus achieve the greatest possible deformation in these deformable regions, in which in particular the deformation sensors are arranged, and to have minimal or no deformations present in the deformation-resistant regions of the deformation transfer element.

It is particularly favourable if the deformable regions are in each case arranged between two deformation-resistant regions.

It is also favourable, for an optimal shifting to the deformable regions of, where possible, all the deformations transferred to the deformation transfer element, if the deformation-resistant regions and the deformable regions are arranged successively in a deformation direction, that is to say if the deformation-resistant and the deformable regions are arranged successively in the direction in which the principal deformation is transferred to the deformation transfer element.

It is further advantageous if the deformable regions are formed as deformation concentration regions.

A deformation concentration region is to be understood in particular to mean that the majority, that is to say more than 50%, even better more than 70%, of the deformations transferred to or acting on the deformation transfer element form in said region.

A formation of this kind of the deformable regions has the advantage that the deformations can be concentrated substantially in these regions and therefore the greatest deformations possible can be detected by the corresponding deformation sensors.

No further details have yet been provided in respect of the configuration of the material of the deformation transfer element.

For example, it is preferably provided that the material of the deformation transfer element is formed outside the deformable regions as deformation-resistant or deformation-inert material, that is to say that, for example, less than 30%, even better less than 20%, preferably less than 10% of the deformations transferred to or acting on the deformation transfer element form outside the deformable regions.

On the other hand, it is preferably provided that the material of the deformation transfer element in the deformable regions has a tendency for deformation or is suitable for deformation as the result of a suitable shaping, for example a cross-sectional narrowing.

In order to be able to compensate for the deformations of the deformation transfer element brought about by the deformations of the holding arm, it is preferably provided that the deformation transfer element, next to the corresponding deformable region, has a deformation-free region in which there is arranged at least one reference deformation sensor.

In a deformation-free region, on account of its formation and arrangement, there occur substantially none of the deformations transferred to or acting on the deformation transfer element, that is to say in particular less than 20%, even better less than 10%, and preferably less than 5% of said deformations.

With a reference deformation sensor of this kind, it is possible in a deformation-free region to detect, via the reference deformation sensors, material deformations in the deformation element which are caused by influences other than the deformations transferred to or acting on the deformation transfer element and which are created for example by thermal influences, and then, since they are also detected by the deformation sensor, to thus correct them.

For this reason, it is preferably provided that each deformation-free region is formed from the same material as the deformable region.

It is further preferably provided that each deformation-free region is connected on one side to a deformation-resistant region of the deformation transfer element.

A particularly advantageous geometric configuration provides that the deformation-free region of the deformation transfer element is tongue-like.

In addition, it is preferably provided that the deformation-free region of the deformation transfer element is produced from the same material, in particular with the same material thickness, as the deformable region.

In order to achieve an optimal coupling between the effects detected by the reference deformation sensors, it is preferably provided that the reference deformation sensors are thermally coupled to the deformation transfer element.

In particular it is thus possible that the reference deformation sensors are thermally coupled to the deformation sensors by means of the deformation transfer element.

In particular in the case that a reference deformation sensor is associated with each deformation sensor, an optimal thermal coupling is then achieved if, between each deformation sensor and the associated reference deformation sensor, each deformable region provided with a deformation sensor is thermally coupled to the deformation-free region associated with this deformable region and supporting the associated reference deformation sensor.

On the whole, it is advantageous if the deformation-free region supporting the particular reference deformation sensor has the same thermal behaviour as the deformable region supporting the corresponding deformation sensor.

In order to obtain, to the greatest possible extent, the same deformations in the region of the reference deformation sensor as in the region of the deformation sensor, it is expediently provided that each deformation-free region supporting a reference deformation sensor has a geometric form that is comparable, preferably identical, to the deformable region supporting the deformation sensor.

In particular, it is likewise advantageous here if the deformation-free region of the deformation transfer element is produced from the same material as the deformable region of the deformation transfer element.

In order to monitor the functionality of the reference deformation sensors, it is preferably provided that at least one temperature sensor for function monitoring is associated with the reference deformation sensors.

It is better still if a temperature sensor for function monitoring is associated with each of the reference deformation sensors.

No further details have yet been provided in respect of the configuration of the deformation transfer element.

For example, an advantageous solution provides that the deformation transfer element is plate-like and each deformable region supporting a deformation sensor is formed by a cross-sectional constriction of the deformation transfer element.

In particular, it is provided here that the cross-sectional constriction of the deformation transfer element is formed by a constriction of an areal extent of the deformation transfer element.

The deformation sensors and the reference deformation sensors can be sensors formed in very different ways, which can detect elongation processes and/or compression processes in the deformable regions.

One possibility provides that the deformation sensors and the reference deformation sensors are formed as strain sensors, in particular strain gauges.

Another possibility provides that the deformation sensors and the reference deformation sensors are formed as magnetostrictive or optical sensors detecting elongation and compression.

In particular it is advantageous for optimal compensation of a strain sensor if the reference strain sensor associated with it is identical to the associated strain sensor.

The problem stated at the outset is also solved in accordance with the invention in particular in that the holding arm, between the first end and the second end, has a first deformation region and a second deformation region, which, under a force acting in parallel to the direction of travel in the longitudinal median plane of the holding arm, each experience deformations that differ from the deformations under a force acting in the longitudinal median plane and transversely to the direction of travel.

The advantage of the solution according to the invention can be considered to lie in the fact that, since the first and the second deformation region behave differently, that is to say deform to different extents, under a force acting in the longitudinal median plane of the holding arm and parallel to the direction of travel and a force acting in the longitudinal median plane and transversely, in particular perpendicularly, to the direction of travel, said forces being in particular of the same value, it is possible when evaluating the signals of the deformation sensors, as a result of these different deformations of the first deformation region and of the second deformation region, to differentiate between a force acting in the longitudinal median plane of the holding arm and parallel to the direction of travel and a force acting in the longitudinal median plane of the holding arm and transversely to the direction of travel.

It is even more favourable if the first and the second deformation region likewise behave differently, that is to say deform to different extents, under a force acting transversely, in particular perpendicularly, to the longitudinal median plane, in particular likewise of the same value as the forces acting in the longitudinal median plane and parallel to the direction of travel or transversely thereto.

The different behaviour of the first and the second deformation region can be achieved by a different shaping, in particular different cross-sections and/or a different profile and/or a different length of the first and second deformation regions in the holding arm.

In particular, it is provided here that the first and second deformation region are arranged successively in a direction of extent of the holding arm.

No further details have been provided in conjunction with the previous explanation of the solution according to the invention in respect of the processing of the signals of the deformation sensors and of the reference deformation sensors.

For example, an advantageous solution provides that each deformation sensor is connected to the associated reference deformation sensor in a Wheatstone bridge.

It is thus possible to compensate in a simple way, with direct use of the signals of the deformation sensor and of the reference deformation sensor, for effects, in particular thermal effects, not caused by the deformation of one of the deformation regions of the holding arm.

Furthermore, an advantageous solution provides that the evaluation unit has a processor which converts the values corresponding to the deformations in the deformable regions using transformation values determined by a calibration and stored in a memory into the corresponding values of forces on the coupling element acting in three spatial directions running transversely, in particular perpendicularly to one another.

It is thus possible to determine the forces on the coupling element acting in three spatial directions running transversely, in particular perpendicularly to one another, on the basis of the values corresponding to the deformations.

It is particularly favourable here if two of the forces run parallel to, in particular in, the longitudinal median plane of the holding arm, but transversely, in particular perpendicularly, to one another and if the third force runs transversely, in particular perpendicularly, to the longitudinal median plane of the holding arm.

An improvement of the conversion of the values corresponding to the deformations is then possible if transformation values for force combinations acting in different octants on the coupling element are stored in the memory, since these different transformation values allow an optimised adaptation to the actual conditions.

In particular, an evaluation unit in accordance with the solution according to the invention is formed such that it detects values of deformation sensors and in particular optionally also reference deformation sensors to determine the deformations.

In order to additionally also have the possibility of performing a function check of the reference deformation sensors, it is provided that the evaluation unit comprises values from at least one temperature sensor to perform a function check of the reference deformation sensors.

It is better still if the evaluation unit, to perform a function check of the reference deformation sensors, detects values of a temperature sensor associated with the particular reference deformation sensor.

Here, the at least one temperature sensor or the temperature sensors can be arranged either on a circuit board supporting the evaluation unit or on the deformation transfer element.

In the previous exemplary embodiments, it was not discussed in further detail how the holding arm and the coupling element can be connected to one another.

An advantageous solution provides that the holding arm at its second end supports the coupling element.

In this case it is in particular favourable if the holding arm and the coupling element form a continuous part, so that it is not possible to separate the holding arm and coupling element.

In particular, it is provided in such a case that the holding arm is formed as a ball neck and, at the second end, supports the coupling element comprising a coupling ball.

A further advantageous solution provides that the holding arm comprises a receiving body which is configured to receive the coupling element releasably.

The coupling element is, for example, part of a carrier system for coupling the coupling element to the holding arm.

The coupling element is, for example, formed as a coupling element of a carrier system for items, in particular luggage or bicycles.

In particular, the receiving body is formed here such that it has an insertion receptacle which is accessible through an insertion opening.

In a receiving body of the holding arm as described above, it is preferably provided that the coupling element comprises a carrier arm.

Here, the carrier arm is expediently provided with an insertion portion which is insertable into the insertion receptacle and is fixable therein.

The carrier arm is then, for example, part of the carrier system.

Alternatively, in a further embodiment of the carrier arm is configured such that it supports a coupling ball.

In a further embodiment the carrier arm is provided with other coupling devices, for example with a coupling jaw.

To precisely fix the carrier arm, it is expedient if the insertion portion is received in positive-locking fashion in the insertion receptacle transversely to an insertion direction and in the functional state is fixed in the insertion direction by a positive-locking body.

The above description of solutions according to the invention thus comprises, in particular, the various combinations of features defined by the following consecutively numbered embodiments:

1. A device, which can be mounted on the rear end of a motor vehicle body (12), for coupling a trailer or a load carrier unit, comprising a holding arm (30), which at a first end (32) is fixedly connected to the motor vehicle body (12) during operation and which, at a second end (34), is configured to support a coupling element (40), wherein the holding arm (30) is provided with a sensor arrangement (170), wherein the holding arm (30) is provided with at least three deformation sensors (172, 174, 176, 178), which in particular respond in different ways to three forces acting on the coupling element (40) in spatial directions running transversely to one another, and wherein the at least three deformation sensors (172, 174, 176, 178) deliver sensor values (M), on the basis of which at least one force component acting on the coupling element (40) is determined by means of an evaluation unit (270).

2. A device in accordance with embodiment 1, wherein the evaluation unit (270) determines at least one of the values ($WF_x$, $WF_y$, $WF_z$) of its force components running in the spatial directions (x, y, z).

3. A device in accordance with the preceding embodiments, wherein the evaluation unit (270) determines the value ($WF_z$) of its force component running in the direction of the force of gravity (Z).

4. A device in accordance with the preceding embodiments, wherein the evaluation unit (270) determines the value ($F_x$) of its force component running in the direction of travel of the motor vehicle (10).

5. A device in accordance with the preceding embodiments, wherein the evaluation unit (270) determines the value ($F_y$) of the force component running transversely, in particular perpendicularly, to a vertical longitudinal median plane (18).

6. A device in accordance with the preceding embodiments, wherein the evaluation unit (270), prior to a determination of the force components, checks by means of a state detection stage (282) whether a suitable state exists for determining the force components on the coupling element (40).

7. A device in accordance with embodiment 6, wherein the state detection stage (282), by detecting at least one of the parameters such as voltage supply, vehicle orientation in space, presence of the working position of the holding arm (30), checks whether a suitable state exists for determining the force on the coupling element (40).

8. A device in accordance with the preceding embodiments, wherein the evaluation unit (270), by means of a zero-load detection stage (286), prior to determination of the force components on the coupling element (40), detects the values ($WF_{x0}$, $WF_{y0}$, $WF_{z0}$) of the force components in the case of a zero load.

9. A device in accordance with the preceding embodiments, wherein, following a movement of the holding arm (30) into a working position, at least one of the values ($WF_x$, $WF_y$, $WF_z$) of the force components at zero load is detected by the zero-load detection stage (286).

10. A device in accordance with the preceding embodiments, wherein, following mounting of a coupling element (40) to the holding arm (30), at least one of the values ($WF_x$, $WF_y$, $WF_z$) of the force components at zero load is detected by the zero-load detection stage (286).

11. A device in accordance with the preceding embodiments, wherein the values ($WF_x$, $WF_z$, $WF_y$) of the force components at zero load are stored by the zero-load detection stage (286) only if the values ($WF_x$, $WF_y$, $WF_z$) of the force components drop below pre-defined values ruling out an external force on the coupling element (40).

12. A device in accordance with the preceding embodiments, wherein, in the event of recognition of movement towards an object, in particular towards a trailer or a load carrier, at least one of the values $WF_x$, $WF_y$, $WF_z$) at zero load is detected by the zero-load detection stage (286).

13. A device in accordance with the preceding embodiments, wherein, following a detection of at least one of the values ($WF_x$, $WF_z$, $WF_y$) of the force components at zero load, at least one of the values ($WF_x$, $WF_y$, $WF_z$) of the force components at zero load is detected once more after a predefined time.

14. A device in accordance with the preceding embodiments, wherein the evaluation unit (270), by means of a load detection stage (288) for determining at least one of the load-induced values ($WF_{x1}$, $WF_{y1}$, $WF_{z1}$) of the force components, subtracts the corresponding values ($WF_{x0}$, $WF_{y0}$, $WF_{z0}$) of the force components delivered at zero load from the values ($WF_x$, $WF_y$, $WF_z$) of the force components delivered when a force is acting on the coupling element (40).

15. A device in accordance with the preceding embodiments, wherein the load detection stage (288) performs a determination of at least one value of the force components on the coupling element (40), provided an on-board function of the motor vehicle (10) is performed.

16. A device in accordance with the preceding embodiments, wherein the load detection stage (288) performs a determination of at least one of the values ($WF_x$, $WF_y$, $WF_z$) of the force components on the coupling element (40) if a plug is inserted into a socket (31) associated with the holding arm (30).

17. A device in accordance with the preceding embodiments, wherein the load detection stage (288) performs a determination of at least one of the values ($WF_x$, $WF_y$, $WF_z$) of the force components on the coupling element (40) following recognition of an object, in particular a trailer or a load carrier, engaging with the coupling element (40).

18. A device in accordance with the preceding embodiments, wherein the load detection stage (288) performs a determination of at least one of the values $WF_x$, $WF_y$, $WF_z$) of the force components on the coupling element (40) when the speed of the motor vehicle (10) is less than five kilometres per hour, in particular when the motor vehicle (10) is stationary 19. A device in accordance with the preceding embodiments, wherein the evaluation unit (270), by means of a presentation stage (292), transmits at least one load-induced value ($F_x$, $F_y$, $F_z$) of the force components acting on the coupling element (40).

20. A device in accordance with the preceding embodiments, wherein the evaluation unit (270), by means of a presentation stage (292), transmits at least one value ($WF_z$) of the load-induced force component acting in the vertical direction (Z) on the coupling element (40).

21. A device in accordance with the preceding embodiments, wherein the evaluation unit (270), by means of a presentation stage (292), transmits at least one value ($WF_x$) of the load-induced force component acting on the coupling element (40) in the direction of travel and in particular parallel to a vertical longitudinal median plane (18).

22. A device in accordance with the preceding embodiments, wherein the values of the force components ($WF_x$, $WF_y$, $WF_z$) and the sensor values acting on the coupling element (40) are linked by means of transformation coefficients ($t_{1x}$, . . . , $t$ . . . ).

23. A device in accordance with the preceding embodiments, wherein the evaluation unit (270), by means of the presentation stage (292), transmits at least one value ($WF_y$) of the load-induced force component ($WF_y$) acting transversely to a vertical longitudinal median plane (18) of the holding arm (30), in particular in an approximately horizontal direction (Y).

24. A device in accordance with the preceding embodiments, wherein the presentation stage, (292) by means of a presentation unit (304), indicates the at least one value ($WF_x$, $WF_y$, $WF_z$) of the particular force component and in particular also indicates the measurement accuracy associated with this value.

25. A device in accordance with the preceding embodiments, wherein the presentation stage (292) by means of the presentation unit (304) qualitatively indicates the at least one value ($WF_x$, $WF_y$, $WF_z$) of the particular force component.

26. A device in accordance with the preceding embodiments, wherein the presentation stage (292), by means of the presentation unit (304), indicates the at least one value ($WF_z$) of the load-induced force component acting on the coupling element (40) in the vertical direction in relation to a predefined support load for the respective motor vehicle (10).

27. A device in accordance with the preceding embodiments, wherein the presentation stage (292), by means of the presentation unit (304), indicates the at least one value ($F_x$) of the force component acting in the direction of travel in relation to a maximum tractive force.

28. A device in accordance with the preceding embodiments, wherein the presentation stage (292) transmits at least one of the values ($WF_x$, $WF_y$, $WF_z$) of the force components acting on the coupling element (40) to an electronic stabilisation system of the motor vehicle.

29. A device in accordance with the preceding embodiments, wherein the presentation stage (292) transmits at least one of the values ($WF_x$, $WF_y$, $WF_z$) of the force components acting on the coupling element (40) to a chassis control system (328) of the motor vehicle (10).

30. A device in accordance with the preceding embodiments, wherein the deformation sensors (172, 174, 176, 178) are arranged relative to the holding arm (30) such that they deliver different sensor values under the action of a force ($F_x$, $F_y$, $F_z$) having an identical value in each of the three spatial directions (x, y, z).

31. A device in accordance with the preceding embodiments, wherein four deformation sensors (172, 174, 176, 178) are arranged on the holding arm (30) and deliver different sensor values in the event of a force ($F_x$, $F_y$, $F_z$) acting with the same magnitude in the various spatial directions (x, y, z) running transversely to one another.

32. A device in accordance with the preceding embodiments, wherein the sensor values delivered by the deformation sensors (172, 174, 176, 178) are linked by means of transformation coefficients ($t_1$, . . . $t_u$) of a transformation matrix (T) to the values ($WF_x$, $WF_y$, $WF_z$) of the force components ($F_x$, $F_y$, $F_z$) in the three spatial directions (x, y, z) running transversely to one another.

33. A device in accordance with the preamble of embodiment 1 or in accordance with the preceding embodiments, wherein, starting from the coupling element (40) as centre point, the space around the coupling element (40) is divided into eight octants (I . . . VIII) defined by the three spatial directions (x, y, z) running transversely to one another, wherein an octant-based transformation matrix (T) is predefined in the evaluation circuit (230) for each of the octants (I . . . VIII), wherein the evaluation circuit (230) determines the values ($F_x$, $F_y$, $F_z$) of the force components by means of one of the predefined transformation matrices (T) and assigns them to one of the octants (I . . . VIII) and then, on the basis of the octant-based transformation matrix (T), again determines the values ($WF_x$, $WF_y$, $WF_z$) of the force components for the octants receiving the force vector.

34. A method for detecting the force on a device, which can be mounted on the rear end of a motor vehicle body (12), for coupling a trailer or a load carrier unit, comprising a holding arm (30), which at a first end (32) is fixedly connected to the motor vehicle body (12) during operation and which, at a second end (34), is configured to support a coupling element (40), wherein the holding arm (30) is provided with a sensor arrangement (170), wherein the holding arm (30) is provided with at least three deformation sensors (172, 174, 176, 178), which in particular respond in different ways to three forces acting on the coupling element (40) in spatial directions (x, y, z) running transversely to one another, and wherein the at least three deformation sensors (172, 174, 176, 178) deliver sensor values (M), on the basis of which at least one force component (K) acting on the coupling element is determined.

35. A method in accordance with embodiment 34, wherein at least one of the values ($WF_x$, $WF_y$, $WF_z$) of the force components running in the spatial directions (x, y, z) is determined for the force.

36. A method in accordance with embodiment 34 or 35, wherein at least the value ($WF_z$) of the force component running in the direction of the force of gravity (Z) is determined.

37. A method in accordance with embodiments 34 to 36, wherein at least the value ($WF_x$) of the force component running in the direction of travel of the motor vehicle (10) is determined.

38. A method in accordance with the preceding embodiments, wherein at least the value ($WF_y$) of the force component running transversely, in particular perpendicularly, to a vertical longitudinal median plane (18) is determined.

39. A method in accordance with embodiments 34 to 38, wherein, prior to a determination of the values ($WF_x$, $WF_y$, $WF_z$) of the force component (K), it is checked whether a suitable state for determining the force components on the coupling element (40) exists 40. A method in accordance with embodiment 39, wherein, by detecting at least one of the parameters such as voltage supply, vehicle orientation in space, presence of the working position of the holding arm (30), it is checked whether a suitable state exists for determining the force components on the coupling element (40).

41. A method in accordance with embodiments 34 to 40, wherein at least one of the values ($WF_x$, $WF_y$, $WF_z$) of the force components is detected in the case of a zero load prior to a determination of the force components on the coupling element (40).

42. A method in accordance with embodiments 34 to 41, wherein the values ($WF_x$, $WF_y$, $WF_z$) of the force components at zero load are detected following a movement of the holding arm (30) into a working position.

43. A method in accordance with embodiments 34 to 42, wherein the values ($F_x$, $F_y$, $F_z$) of the force components at zero load are detected following a mounting of a coupling element (40) on the holding arm (30).

44. A method in accordance with the preceding embodiments, wherein the values ($F_x$, $F_y$, $F_z$) of the force components at zero load are stored only if the values ($F_x$, $F_y$, $F_z$) drop below predefined values ruling out an external force on the coupling element (40).

45. A method in accordance with embodiments 34 to 44, wherein the values ($F_x$, $F_y$, $F_z$) of the force components at zero load are detected following recognition of movement towards an object, in particular towards a trailer or a load carrier.

46. A method in accordance with embodiments, 34 to 45 wherein, following a detection of the values ($F_x$, $F_y$, $F_z$) of the force components at zero load, the values ($F_x$, $F_y$, $F_z$) of the force components at zero load are detected once more after a predefined time.

47. A method in accordance with embodiments 34 to 46, wherein, to determine at least one of the load-induced values ($WF_{x1}$, $WF_{y1}$, $WF_{z1}$) of the force components, the corresponding values ($WF_{x0}$, $WF_{y0}$, $WF_{z0}$) of the force components delivered at zero load are subtracted from the values ($WF_x$, $WF_y$, $WF_z$) of the force components delivered when a force is acting on the coupling element (40).

48. A method in accordance with embodiments 34 to 47, wherein at least one of the values ($WF_x$, $WF_y$, $WF_z$) of the force components on the coupling element (40) is determined, provided an on-board function of the motor vehicle (10) is performed.

49. A method in accordance with the preceding embodiments 34 to 48, wherein a determination of at least one of the values of the force components on the coupling element (40) is performed if a plug is inserted into a socket (31) associated with the holding arm (30).

50. A method in accordance with embodiments 34 to 49, wherein at least one of the values of the force components on the coupling element (40) is determined following recognition of an object, in particular a trailer or a load carrier, engaging with the coupling element (40).

51. A method in accordance with the preceding embodiments 34 to 50, wherein at least one of the values ($WF_x$, $WF_y$, $WF_z$) of the force component on the coupling element (40) is determined when the speed of the motor vehicle (10) is less than five kilometres per hour, in particular when the motor vehicle (10) is stationary.

52. A method in accordance with embodiments 34 to 51, wherein at least one value ($WF_z$) of the force component acting on the coupling element (40) in the vertical direction (Z) is determined.

53. A method in accordance with embodiments 34 to 52, wherein at least one value ($WF_x$) of the force component acting on the coupling element (40) in the direction of travel and in particular parallel to a vertical longitudinal median plane (18) is transmitted.

54. A method in accordance with embodiments 34 to 53, wherein at least one value ($WF_y$) of a force component acting transversely to a vertical longitudinal median plane (18) of the holding arm (30), in particular in an approximately horizontal direction, is transmitted.

55. A method in accordance with embodiments 34 to 54, wherein at least one of the values ($WF_{x1}$, $WF_{y1}$, $WF_{z1}$) of the particular force component and in particular the measurement accuracy associated therewith is indicated.

56. A method in accordance with embodiments 34 to 55, wherein at least one of the values ($WF_{x1}$, $WF_{y1}$, $WF_{z1}$) of the particular force component is indicated qualitatively.

57. A method in accordance with embodiments 34 to 56, wherein the value ($WF_z$) of the force component acting on the coupling element (40) in the vertical direction is indicated in relation to a predefined support load for the particular motor vehicle (10).

58. A method in accordance with embodiments 34 to 57, wherein the value ($WF_x$) of the force component acting in the direction of travel is indicated in relation to a maximum tractive force.

59. A method in accordance with embodiments 34 to 58, wherein at least one of the values ($WF_x$, $WF_y$, $WF_z$) of the force components acting on the coupling element (40) is transmitted to an electronic stabilisation system (326) of the motor vehicle (10).

60. A method in accordance with embodiments 34 to 59, wherein at least one of the values ($WF_x$, $WF_y$, $WF_z$) of the force components acting on the coupling element (40) is transmitted to a chassis control system (328) of the motor vehicle (10).

61. A method in accordance with the preamble of embodiment 34 or in accordance with embodiments 34 to 60, wherein the values ($WF_x$, $WF_y$, $WF_z$) of the force components acting on the coupling element (40) are linked to the sensor values (M) by means of transformation coefficients ($t_{1x}$ . . . $t_n$).

62. A method in accordance with embodiments 34 to 61, wherein the sensor values delivered by the deformation sensors (172, 174, 176, 178) are linked by means of the transformation coefficients ($t_{1x}$ . . . $t_n$) of a transformation matrix (T) to the force components in the three spatial directions (x, y, z) running transversely to one another.

63. A method in accordance with embodiment 61 or 62, wherein the transformation coefficients ($t_{1x}$ . . . $t_n$) of the transformation matrix (T) are determined within the scope of a calibration process.

64. A method in accordance with embodiment 63, wherein, under the action of a defined force component on the coupling element (40), the sensor values delivered by the deformation sensors (172, 174, 176, 178) in the calibration process are detected.

65. A method in accordance with embodiment 63 or 64, wherein, during the calibration process, the coupling element (40) is acted on in one of the three spatial directions (x, y, z) running transversely to one another, in each case with a defined force component, and the sensor values delivered by the deformation sensors (172, 174, 176, 178) are detected.

66. A method in accordance with embodiments 64 to 65, wherein, during the calibration process, each force component acting in one of the three spatial directions (x, y, z) has the same value.

67. A method in accordance with embodiments 34 to 66, wherein the values ($WF_x$, $WF_y$, $WF_z$) of the force components acting on the coupling element are determined by means of the sensor values on the basis of the transformation coefficients determined during the calibration in each case by a force component in one of the three spatial directions (x, y, z).

68. A method in accordance with embodiments 34 to 67, wherein the transformation coefficients are determined on the assumption of a linear link between the values ($WF_x$, $WF_y$, $WF_z$) of the force components in the three spatial directions (x, y, z) running transversely to one another and the sensor values delivered by the deformation sensors (172, 174, 176, 178).

69. A method in accordance with embodiments 34 to 67, wherein the three spatial directions (x, y, z) running transversely to one another run perpendicularly to one another.

70. A method in accordance with embodiments 34 to 67, wherein, starting from the coupling element (40) as centre point, the space around the coupling element (40) is divided into eight octants (I . . . VIII) defined by the three spatial directions (x, y, z) running transversely to one another, wherein, in order to determine the transformation coefficient set in each of the octants (I . . . VIII), the coupling element (40) is acted on by force components lying within a particular octant, wherein the sensor values are detected, and wherein octant-based transformation coefficients are determined for these force components in each of the octants (I to VIII).

71. A method in accordance with the preceding embodiments, wherein, in order to determine the values ($WF_x$, $WF_y$, $WF_z$) of the force components on the coupling element (40), one of the transformation matrices (T) is used and it is then checked to which of the octants (I . . . VIII) the values ($F_x$, $F_y$, $F_z$) of the force components should be assigned and then a renewed determination of the values ($WF_x$, $WF_y$, $WF_z$) of the force components is performed with the transformation matrix (T) assigned to this octant (I to VIII).

72. A device, which can be mounted on the rear end of a motor vehicle body (12), for coupling a trailer or a load carrier unit, comprising a holding arm (30), which at a first end (32) is fixedly connected to the motor vehicle body (12) during operation and which, at a second end (34), is configured to support a coupling element (40), in particular in accordance with the preceding embodiments, wherein forces acting on the coupling element (40) during operation and transferred from the holding arm (30) to the motor vehicle body (12) are detected by an evaluation unit (230) with a sensor arrangement (170) which has at least three deformation sensors (172, 174, 176), and in that in particular the at least three deformation sensors (172, 174, 176, 178) of the sensor arrangement (170) are arranged on the same side of a neutral fibre of the holding arm not length-variable under a bending deformation of the holding arm (30).

73. A device in accordance with the preamble of embodiment 72 or in accordance with embodiment 72, wherein a force detection module (100) is arranged on one side of the holding arm (30, 30') and comprises a sensor arrangement (170) which detects forces that act on the coupling element (40) during operation and are transferred from the holding arm (30) to the motor vehicle body (12).

74. A device in accordance with embodiment 73, wherein the sensor arrangement has at least three deformation sensors (172, 174, 176).

75. A device in accordance with embodiment 73 or 74, wherein the force detection module (100) in the operating state is not arranged on a side of the holding arm (30, 30') facing a roadway (44).

76. A device in accordance with embodiments 73 to 75, wherein the force detection module (100) in the operating state is arranged on a side of the holding arm (30, 30') facing away from a roadway (44).

77. A device in accordance the preamble of embodiment 72 or in accordance with the preceding embodiments, wherein forces acting on the coupling element (40) during operation and transferred from the holding arm (30) to the motor vehicle body (12) are detected by an evaluation unit (230) with a sensor arrangement (170) which has at least three deformation sensors (172, 174, 176), and wherein the deformation sensors (172, 174, 176, 178) are arranged on at least one deformation transfer element (102) which is connected to the holding arm (30).

78. A device in accordance with the preamble of embodiment 72 or in accordance with the preceding embodiments, wherein forces acting on the coupling element (40) during operation and transferred from the holding arm (30) to the motor vehicle body (12) are detected by an evaluation unit (230) with a sensor arrangement (170) which has at least three deformation sensors (172, 174, 176), and wherein all deformation sensors (172, 174, 176, 178) of the sensor arrangement (170) are arranged on a common deformation transfer element (102).

79. A device in accordance with the preceding embodiments, wherein each of the at least three deformation sensors (172, 174, 176), under the action of one and the same force on the coupling element (40), detects deformations of differing magnitude of the holding arm (30, 30').

80. A device in accordance with the preceding embodiments, wherein the deformation transfer element (102) is connected to the holding arm (30) in a manner free from relative movement and thereby rigidly at least at two fastening regions (104, 106, 108), and wherein at least one of the deformation sensors (172, 174, 176, 178) is arranged between the fastening regions (104, 106, 108) of the deformation transfer element (102).

81. A device in accordance with the preceding embodiments, wherein the deformation transfer element (102) is connected by at least three fastening regions (104, 106, 108) to the holding arm (30), and in that in each case between two of the fastening regions (104,106, 108) there is arranged at least one of the deformation sensors (172,174,176,178).

82. A device in accordance with the preceding embodiments, wherein the deformation transfer element (102) is connected in the fastening regions (104, 106, 108) to the holding arm (30) by means of connection elements (114, 116, 118).

83. A device in accordance with embodiment 82, wherein the connection elements (114, 116, 118) are connected on the one hand rigidly to the holding arm (30) and on the other hand rigidly to the fastening regions (104, 106, 108) of the deformation transfer element (102).

84. A device in accordance with embodiment 83, wherein the connection elements (114, 116, 118) are moulded onto the holding arm (30).

85. A device in accordance with the preceding embodiments, wherein the connection elements (114, 116, 118) transfer deformations of the holding arm (30) in deformation regions (82, 84) of the holding arm (30) located in each case between the connection elements (114, 116, 118) to the fastening regions (104, 106, 108) of the deformation transfer element (102).

86. A device in accordance with embodiments 82 to 85, wherein in each case between two connection elements (114,116,118) there is located a deformation region (82,84) of the holding arm (30).

87. A device in accordance with the preceding embodiments, wherein the holding arm (30) has at least two deformation regions (82, 84), the deformation of which is transferred via connection elements (114, 116, 118) arranged on either side of the respective deformation region (82, 84) to fastening regions (104, 106, 108) of the deformation transfer element (102), between which there is located a deformable region (152, 154, 156) of the deformation transfer element (102).

88. A device in accordance with embodiment 87, wherein the at least two deformation regions (82, 84) are arranged successively in a direction of extent of the holding arm (30).

89. A device in accordance with the preceding embodiments, wherein at least one deformation sensor (172, 174, 176, 178) is arranged in one of the deformable regions (152, 154, 156, 158) of the deformation transfer element (102).

90. A device in accordance with embodiments 87 to 89, wherein each deformable region (152, 154, 156, 158) is connected to a deformation-resistant region (144, 146, 148) of the deformation transfer element (102), and wherein the fastening regions (104, 106, 108) each lie in a deformation-resistant region (144, 146, 148).

91. A device in accordance with embodiment 90, wherein the deformable regions (152, 154, 156, 158) are in each case arranged between two deformation-resistant regions (144, 146, 148).

92. A device in accordance with embodiment 90 or 91, wherein the deformation-resistant regions (144, 146, 148) and the deformable regions (152, 154, 156, 158) are arranged successively in a deformation direction.

93. A device in accordance with embodiments, 87 to 92, wherein the deformable regions (152, 154, 156, 158) are formed as deformation concentration regions.

94. A device in accordance with the preceding embodiments, wherein the material of the deformation transfer element (102) is formed outside the deformable regions (152, 154, 156, 158) as deformation-resistant or deformation-inert material.

95. A device in accordance with the preceding embodiments, wherein the material of the deformation transfer element (102) in the deformable regions (152, 154, 156, 158) has a tendency for deformation as the result of a shaping, for example a cross-sectional narrowing.

96. A device in accordance with the preceding embodiments, wherein the deformation transfer element (102), next to each deformable region (152, 154, 156, 158), has a deformation-free region (192, 194, 196, 198) in which there is arranged at least one reference deformation sensor (182, 184, 186, 188).

97. A device in accordance with embodiment 96, wherein each deformation-free region (192, 194, 196, 198) is formed from the same material as the deformable region (152, 154, 156, 158).

98. A device in accordance with embodiment 96 or 97, wherein each deformation-free region (192, 194, 196,

198) is connected on one side to a deformation-resistant region (144, 146, 148) of the deformation transfer element (102).

99. A device in accordance with embodiments 96 to 98, wherein the deformation-free region (192, 194, 196, 198) of the deformation transfer element (102) is tongue-like.

100. A device in accordance with embodiments 96 to 99, wherein the deformation-free region (192, 194, 196, 198) of the deformation transfer element (102) is produced from the same material, in particular with the same material thickness, as the deformable region (152, 154, 156, 158).

101. A device in accordance with embodiments 96 to 100, wherein the reference deformation sensors (182, 184, 186, 188) are thermally coupled to the deformation transfer element (102).

102. A device in accordance with embodiment 101, wherein the reference deformation sensors (182, 184, 186, 188) are thermally coupled to the deformation sensors (172, 174, 176, 178) by means of the deformation transfer element (102).

103. A device in accordance with embodiment 102, wherein, for optimal thermal coupling between each deformation sensor (172, 174, 176, 178) and the associated reference deformation sensor (182, 184, 186, 188), each deformable region (152, 154, 156, 158) provided with a deformation sensor (172, 174, 176, 178) is thermally coupled to the deformation-free region (192, 194, 196, 198) associated with this deformable region and supporting the associated reference deformation sensor (182, 184, 186, 188).

104. A device in accordance with embodiments 96 to 103, wherein the deformation-free region (192, 194, 196, 198) supporting the particular reference deformation sensor (182, 184, 186, 188) has the same thermal behaviour as the deformable region (152, 154, 156, 158) supporting the corresponding deformation sensor (172, 174, 176, 178).

105. A device in accordance with embodiments 96 to 104, wherein each deformation-free region (192, 194, 196, 198) supporting a reference deformation sensor (182, 184, 186, 188) has a geometric form that is comparable to the deformable region (152, 154, 156, 158) supporting the deformation sensor (172, 174, 176, 178).

106. A device in accordance with embodiments 96 to 105, wherein the deformation-free region (192, 194, 196, 198) of the deformation transfer element (102) is produced from the same material as the deformable region (152, 154, 156, 158) of the deformation transfer element (102).

107. A device in accordance with embodiments 96 to 106, wherein at least one temperature sensor (252, 254, 256, 258) for function monitoring is associated with the reference deformation sensors (182, 184, 186, 188).

108. A device in accordance with the preceding embodiments, wherein the deformation transfer element (102) is plate-like and each deformable region (152, 154, 156, 158) supporting a deformation sensor (172, 174, 176, 178) is formed by a cross-sectional constriction of the deformation transfer element (102).

109. A device in accordance with embodiment 108, wherein the cross-sectional constriction of the deformation transfer element (102) is formed by a constriction of an areal extent of the deformation transfer element (102).

110. A device in accordance with the preceding embodiments, wherein the deformation sensors and the reference deformation sensors are formed as strain sensors, in particular strain gauges.

111. A device in accordance with embodiments 72 to 109, wherein the deformation sensors and the reference deformation sensors are formed as magnetostrictive or optical sensors.

112. A device in accordance with the preamble of embodiment 72 or in accordance with the preceding embodiments, wherein the holding arm (30), between the first end (32) and the second end (34), has a first deformation region (82) and a second deformation region (84), which, under a force ($F_x$) acting parallel to the direction of travel (24) in the longitudinal median plane (18) of the holding arm (30), each experience deformations that differ from the deformations under a force ($F_z$) acting in the longitudinal median plane (18) transversely to the direction of travel (24).

113. A device in accordance with embodiment 112, wherein the first and the second deformation region (82, 84), under a force ($F_y$) acting perpendicularly to the longitudinal median plane (18), each experience deformations which differ from the deformations under a force ($F_x$, $F_z$) acting in the longitudinal median plane (18) parallel and/or transversely to the direction of travel (24).

114. A device in accordance with embodiments 112 or 113, wherein the first and second deformation region (82, 84) are arranged successively in a direction of extent of the holding arm (30).

115. A device in accordance with the preceding embodiments, wherein each deformation sensor (172, 174, 176, 178) is connected to the associated reference deformation sensor (182, 184, 186, 188) in a Wheatstone bridge (212, 214, 216, 218).

116. A device in accordance with the preceding embodiments, wherein the evaluation unit (230) has a processor (234) which converts the values corresponding to the deformations in the deformable regions (152, 154, 156, 158) using transformation values determined by a calibration and stored in a memory (236) into the corresponding values ($WF_x$, $WF_y$, $WF_z$) of forces ($F_x$, $F_y$, $F_z$) acting on the coupling element (40) in three spatial directions running transversely, in particular perpendicularly to one another.

117. A device in accordance with the preceding embodiments, wherein two of the forces ($F_x$, $F_z$) run parallel to, in particular in, the longitudinal median plane (18) of the holding arm (30), but transversely, in particular perpendicularly, to one another, and wherein the third force ($F_y$) runs transversely, in particular perpendicularly, to the longitudinal median plane (18) of the holding arm (30).

118. A device in accordance with embodiment 116 or 117, wherein transformation values for force combinations acting in different octants on the coupling element (40) are stored in the memory (236).

119. A device in accordance with embodiments 116 to 118, wherein the evaluation unit (230) detects values of deformation sensors (172, 174, 176, 178) and in particular reference deformation sensors (182, 184, 186, 188) to determine the deformations.

120. A device in accordance with embodiment 119, wherein the evaluation unit (230) detects values from at least one temperature sensor (252, 254, 256, 258) to perform a function check of the reference deformation sensors (182, 184, 186, 188).

121. A device in accordance with embodiment 120, wherein the evaluation unit (230) detects values of a temperature sensor associated with the particular reference deformation sensor.

122. A device in accordance with the preceding embodiments, wherein the holding arm (30) at its second end (34) supports the coupling element (40).

123. A device in accordance with embodiment 122, wherein the holding arm (30) and the coupling element (40) form a continuous part.

124. A device in accordance with embodiment 122 or 123, wherein the holding arm (30) is formed as a ball neck and, at the second end (34), supports the coupling element (40) comprising a coupling ball (43).

125. A device in accordance with embodiments 72 to 124, wherein the holding arm (30') comprises a receiving body (31') which is configured to receive the coupling element (40') releasably.

126. A device in accordance with embodiment 125, wherein the receiving body (31') has an insertion receptacle (33') which is accessible through an insertion opening (35').

127. A device in accordance with embodiment 125 or 126, wherein the coupling element (40') comprises a carrier arm (42').

128. A device in accordance with embodiments 125 to 127, wherein the carrier arm (42') is insertable by an insertion portion (45') into the insertion receptacle (33') and is fixable therein.

129. A device in accordance with preceding embodiments 125 to 128, wherein the carrier arm (42') supports a coupling ball (43).

130. A device in accordance with embodiment 128 or 129, wherein the insertion portion (45') is received in positive-locking fashion in the insertion receptacle (33') transversely in an insertion direction (E) and in the functional state is fixed in the insertion direction by a positive-locking body (41).

Further features and advantages of the solution according to the invention are the subject of the following description and also the depiction of some exemplary embodiments in the drawing.

BRIEF DESCRIPTION OF THE DRAWINGS

FIG. 6 shows a plan view of the holding arm with a view in the direction of the arrow D in FIG. 5;

FIG. 10 shows a plan view similar to FIG. 6 under the action of the force $F_y$;

FIG. 11 shows a section along line 11-11 in FIG. 5;

FIG. 14 shows a plan view similar to FIG. 12 under the action of a force $F_y$ corresponding to FIGS. 9 and 10;

FIG. 25 shows a depiction of a third exemplary embodiment of a device according to invention similar to FIG. 23 with a depiction of the additional temperature sensors arranged on the circuit board;

FIG. 26 shows a depiction of a fourth exemplary embodiment of a device according to the invention with depiction of the deformation transfer element and additional temperature sensors arranged thereon;

FIG. 36 shows a plan view of the holding arm with a view in the direction of the arrow D' in FIG. 35;

FIG. 38 shows a plan view of the holding arm in accordance with FIG. 36 under the action of the force $F_z$;

FIG. 43 shows a depiction of a second possibility of a mathematical linking of the values of the force components with the sensor values;

DETAILED DESCRIPTION OF THE INVENTION

Figure 1:
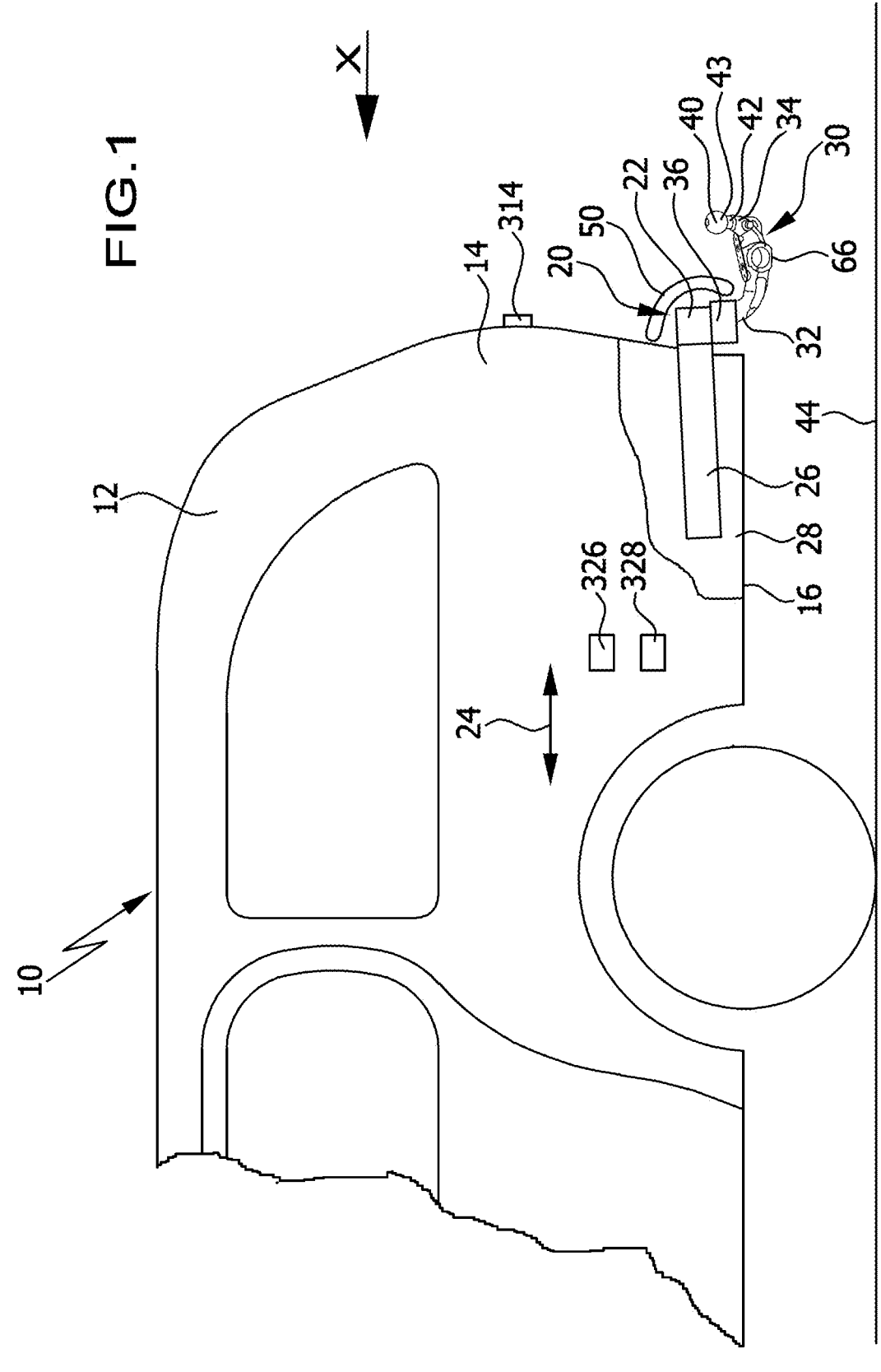
FIG. 1 shows a side view, broken off in part at the rear end, of a motor vehicle body according to a first exemplary embodiment of a device according to the invention for coupling a trailer.

A motor vehicle denoted as a whole by 10 comprises a motor vehicle body 12, which is provided in a rear-end region 14, more specifically in the vicinity of a vehicle floor 16, with a carrier unit 20, which for example has a cross-bar 22, which is connected to the rear-end region 14 in the vicinity of the vehicle floor 16.

The connection between the cross-bar 22 and the rear-end region 14 can be established for example via mounting flanges bearing against the rear-end region 14 or for example by side supports 26, which extend in a vehicle longitudinal direction 24 and likewise abut against vehicle body portions 28 extending in the vehicle longitudinal direction 24.

A holding arm denoted as a whole by 30, in particular a ball neck, is connected to the carrier unit 20 in that a first end 32 of the holding arm 30 is either held directly or via a bearing unit 36 on the carrier unit 20, preferably on the cross-bar 22.

The holding arm 30 supports, at a second end 34 opposite the first end 32, a coupling element 40, which is provided for example for towing a trailer or for fixing a load carrier unit.

For example, a coupling element 40 of this kind is formed as a coupling ball 43, which allows a routine connection to a coupling head of a trailer.

However, the coupling ball 43 also allows for a simple mounting of a load carrier unit, since widely used load carrier units are likewise configured such that they can be mounted on a coupling ball and, as necessary, can be supported additionally on the holding arm 30.

The coupling element 40 for example sits on a carrier 42, which is connected to the second end region 34 of the holding arm 30 and extends starting from a side of the carrier 42 facing away from a roadway 44 in the direction of a centre axis 46, which in the case of a horizontal roadway 44 runs approximately vertically and, in the case of the coupling ball 43, runs through a ball centre point 48.

To improve the aesthetic effect, the cross-bar 22 is preferably arranged below a rear-end bumper unit 50 of the motor vehicle body 12, wherein the bumper unit 50 covers for example the cross-bar 22 and the first end 32 of the holding arm 30.

Figure 2:
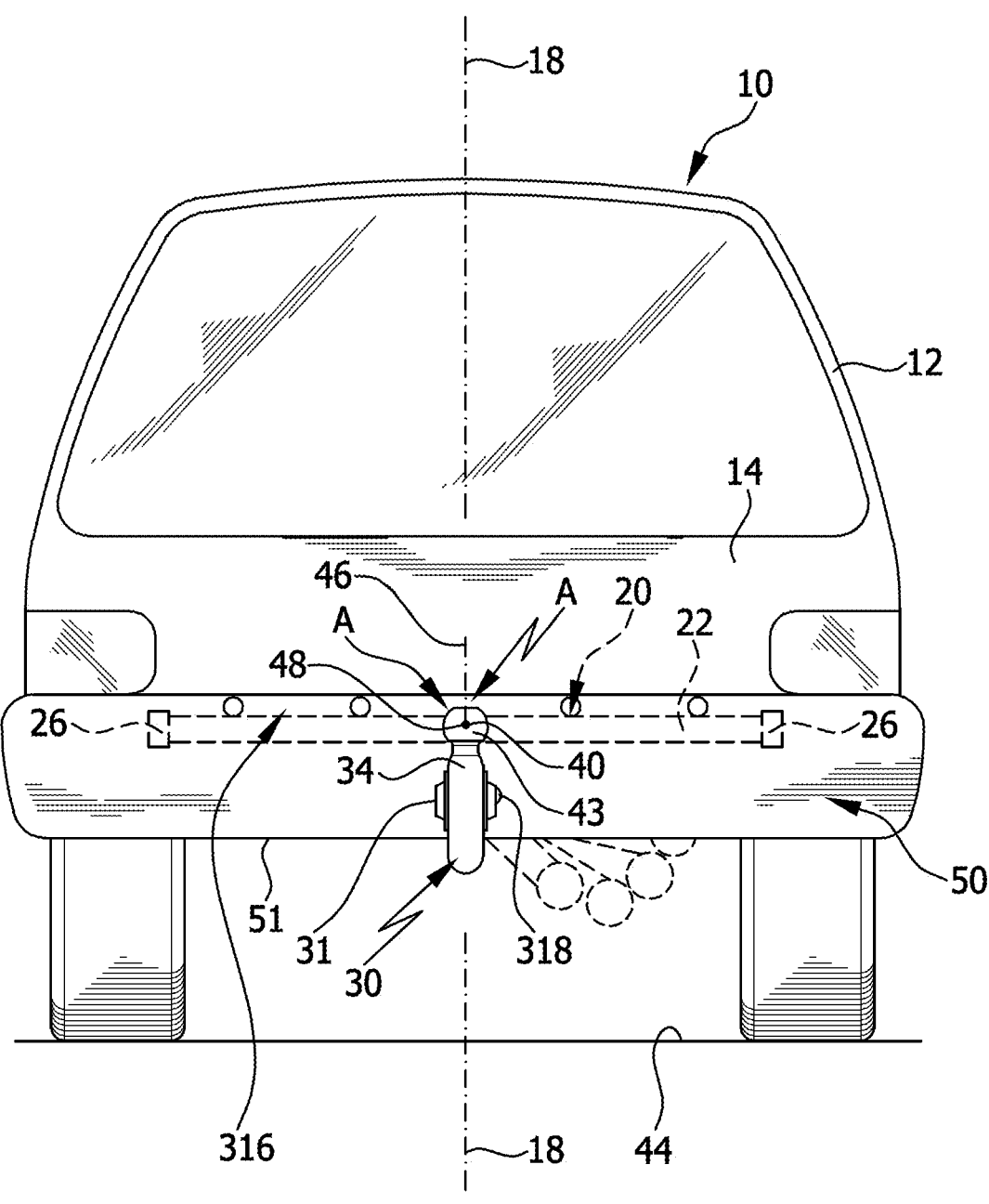
FIG. 2 shows a rear view of the motor vehicle body with a view in the direction of the arrow X in FIG. 1.
Figure 3:
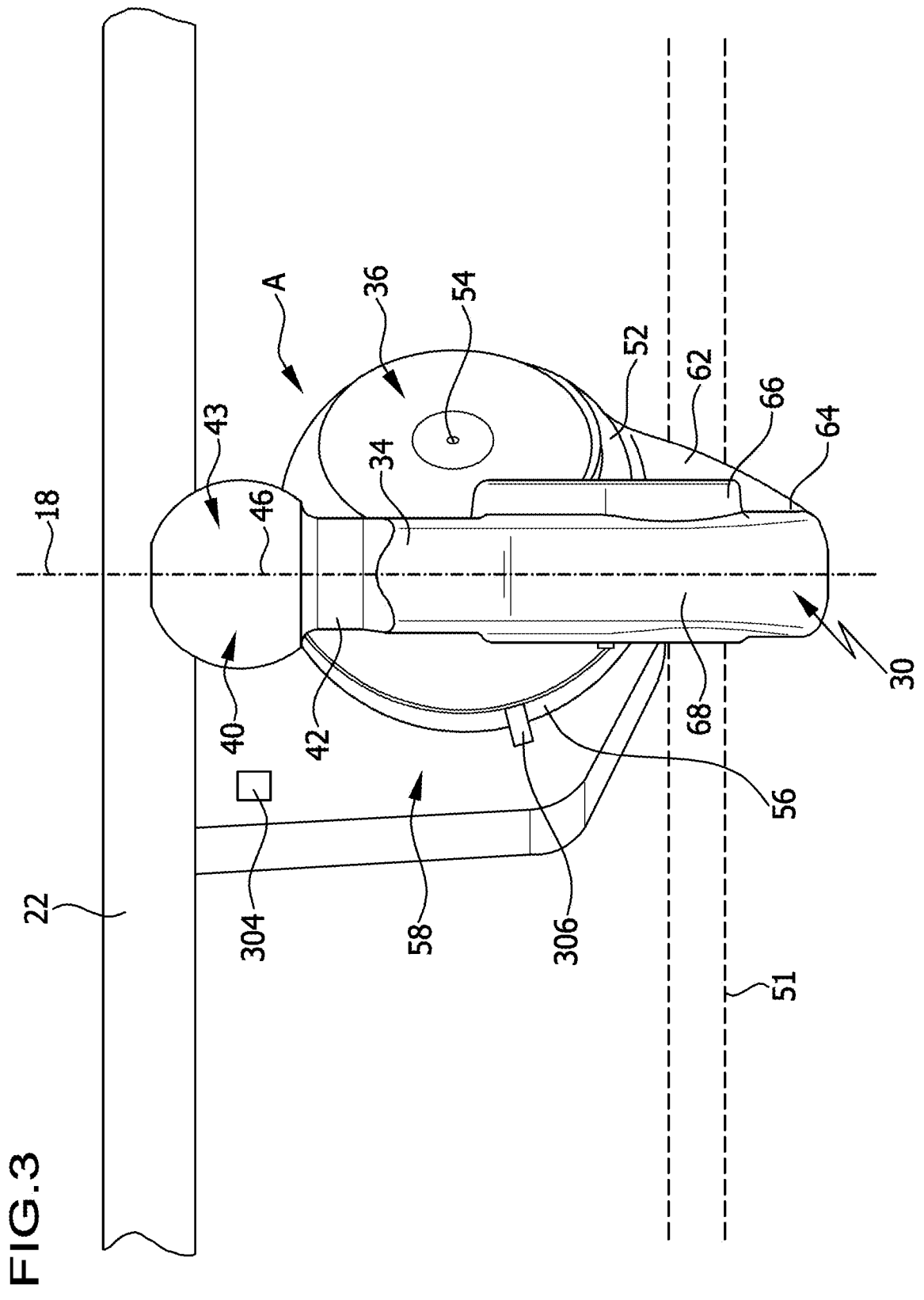
FIG. 3 shows a depiction of the first exemplary embodiment of the device for coupling a trailer or a load carrier unit in its working position according to FIG. 2.

The holding arm 30 supports, in particular in the shown exemplary embodiment, the coupling element 40 formed as a coupling ball, wherein the holding arm 30, as shown in particular in FIGS. 1 to 3, extends starting from the pivot bearing unit 36, to which the holding arm 30 is connected at its first end region 32, wherein for example a pivot bearing body 52 of the pivot bearing unit 36 is moulded on the first end region 32.

The pivot bearing body 52 of the pivot bearing unit 36 is mounted at a pivot bearing receptacle 56 so as to be pivotable about a pivot axis 54, running in particular at an incline to a vertical vehicle longitudinal median plane 18, said pivot bearing receptacle on the one hand guiding the pivot bearing body 52 rotatably about the pivot axis 54 and on the other hand comprising a locking unit (not shown in the drawing), which in the working position and the rest position allows the holding arm 30 to be non-rotatably fixed in respect of pivot movements about the pivot axis 54.

The pivot bearing receptacle 56 is then in turn fixedly connected to the cross-bar 22 via a pivot bearing base 58.

Figure 4:
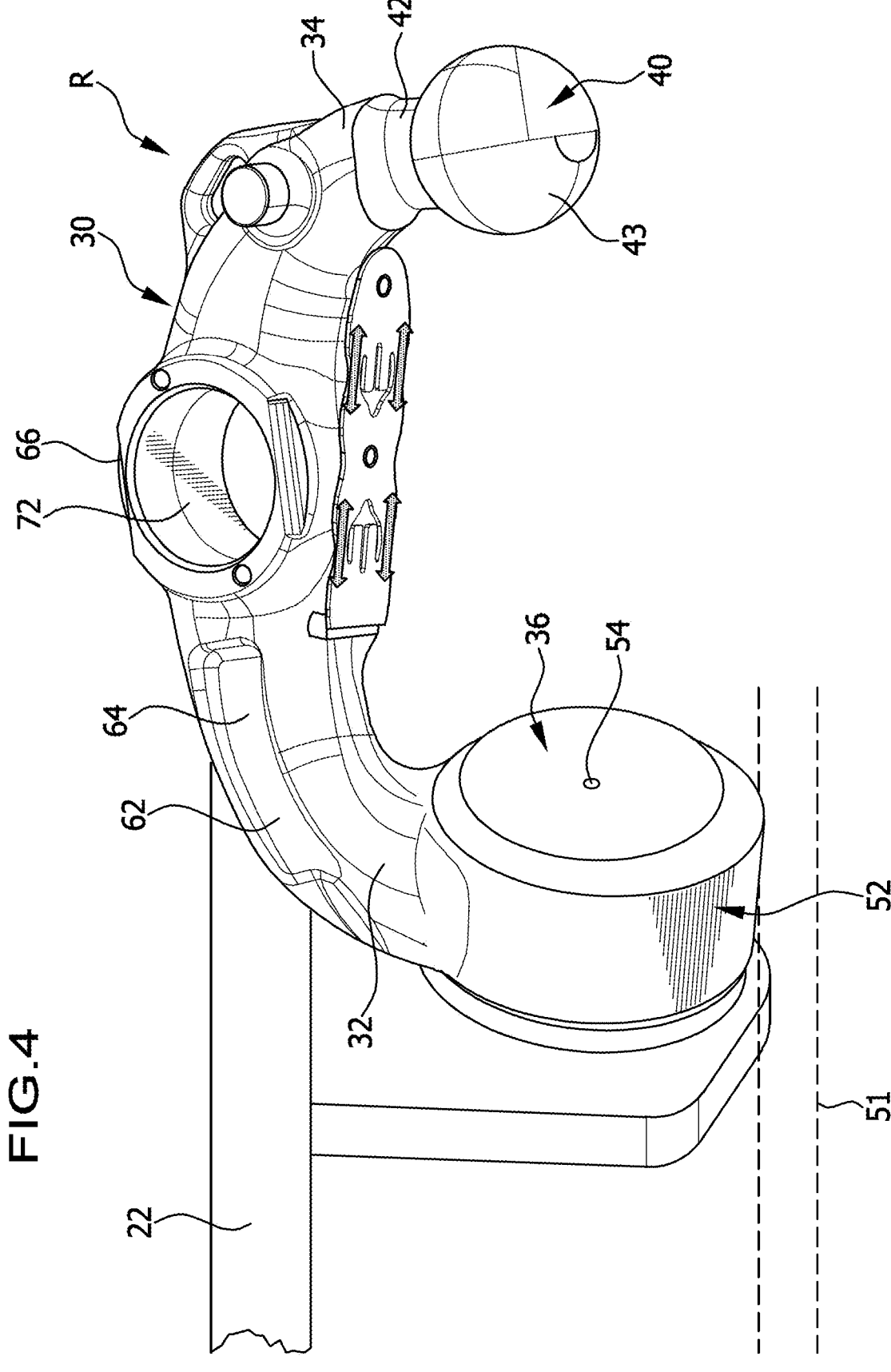
FIG. 4 shows a depiction of the first exemplary embodiment of the device for coupling a trailer or a load carrier unit in a rest position R.

As shown in FIGS. 1 to 4, the holding arm 30 in this exemplary embodiment is pivotable from a working position A, shown in FIGS. 1 to 3, in which the coupling element formed as a coupling ball 40 is arranged such that it is positioned behind the bumper unit 50 on a side facing away from a roadway 44, into a rest position R, shown in FIG. 4, in which the coupling element 40 is arranged facing the roadway 44.

Here, the coupling unit 40 is movable below a lower edge 51 of the bumper unit 50.

In particular, the holding arm 30 in the working position A extends here substantially in the vertical vehicle longitudinal median plane 18, wherein this intersects the coupling element 40 centrally in the case of a configuration thereof as a coupling ball, such that a vertical ball centre axis 48 in the working position A lies in the longitudinal median plane 18.

Starting from the first end region 32, the holding arm 30 in the shown exemplary embodiment extends with a first arcuate piece 62 as far as an intermediate piece 64, which extends as far as an annular body 66, which is adjoined on a second side opposite the intermediate piece 64 and the first arcuate piece 62 by a second arcuate piece 68, which in turn supports the coupling element 40 formed as a coupling ball, wherein the ball end 42 is also provided between the coupling element 40 formed as a coupling ball and the second arcuate piece 148.

The second arcuate piece 68 then forms the end region 34 of the holding arm 30, which then supports the ball end 42 for example, which is adjoined by the coupling element 40 formed as a coupling ball.

Figure 5:
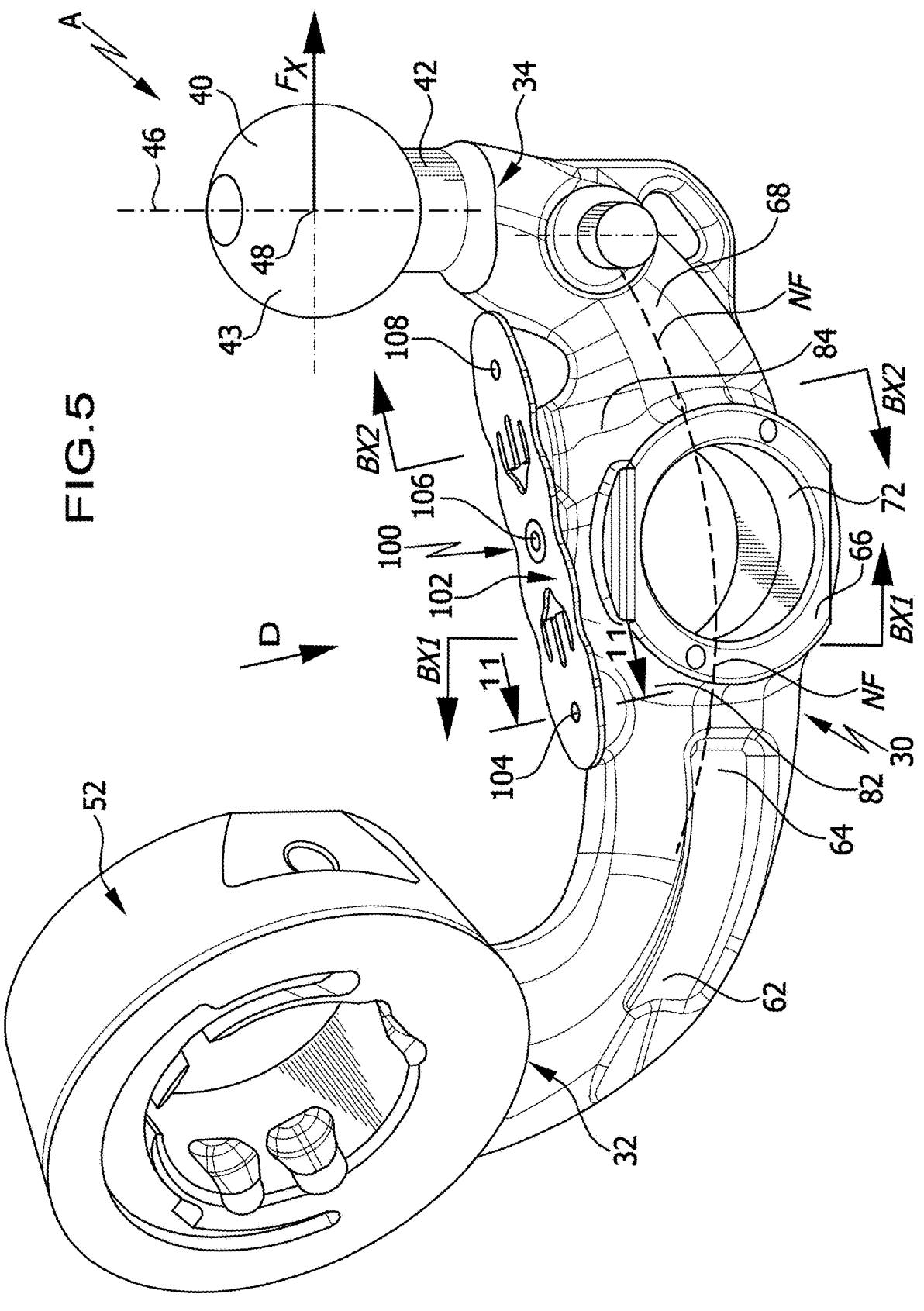
FIG. 5 shows a side view of the holding arm of the first exemplary embodiment with a view of the loading of the coupling element with a force $F_x$.

As shown in particular in FIGS. 4 and 5, for simple mounting of a contact unit on the holding arm 30, the annular body 66 is arranged following the intermediate piece 64 and surrounds a passage 72, in which a contact unit can be mounted.

Here, the annular body 66 is preferably arranged in such a way that a transition into the second arcuate piece 68 occurs following the annular body 66.

A holding arm 30 formed in such a way is formed in an approximately U-shaped manner by the first arcuate piece 62, the intermediate piece 64 and the second arcuate piece 68, and, in the working position A, in which loads occur on the coupling element 40 and are to be detected, is oriented such that the forces acting on the coupling element 40, in particular the ball centre point 46, are transferred via the approximately U-shaped configuration of the holding arm 30 to the pivot bearing body 52 of the pivot bearing unit 36, wherein the pivot axis 54 represents a centre point of the force uptake by the pivot bearing unit 36.

The forces acting on the coupling element 40, as shown in FIGS. 1 to 8, are transferred by the holding arm 30 to the bearing unit 36 and from there to the carrier unit 20, which then introduces these forces into the rear-end region 14 of the motor vehicle body 12, wherein different regions of the holding arm 30 are used to detect the forces acting on the coupling element 40.

In the exemplary embodiment described above, a first deformation region 82 of the holding arm 30 is used by way of example, which comprises a portion of the intermediate piece 64 and of the annular body 66, and a second deformation region of the holding arm 30 is used, which comprises a portion of the annular body 66 and of the second arcuate portion 68.

Furthermore, in this exemplary embodiment, it is assumed that the annular region 66 has a high stability in respect of bending forces running in the longitudinal median plane 18 and also transversely thereto, and in particular responds primarily to tensile loads.

Figure 6:
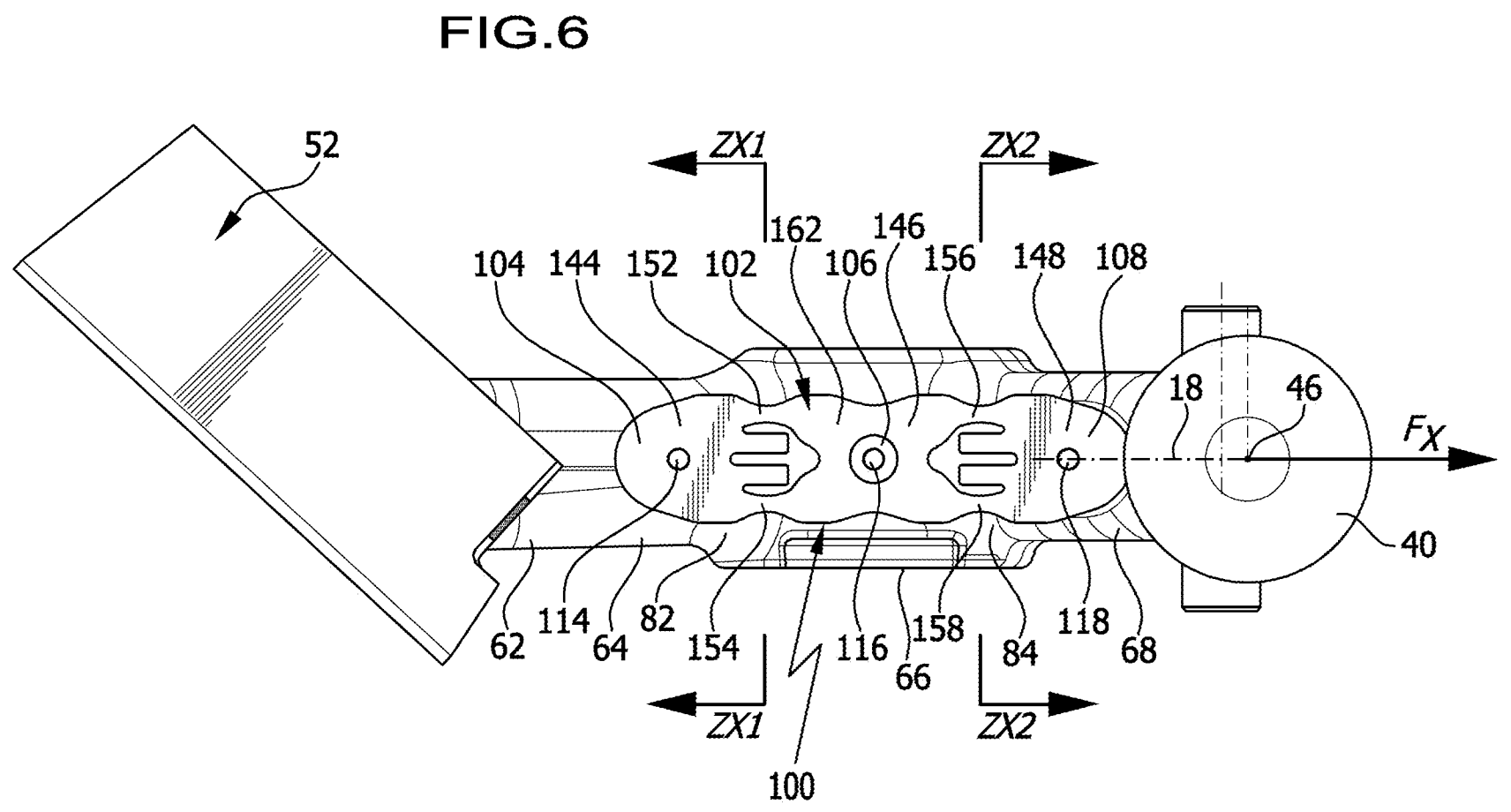

For example, the force $F_x$ shown in FIGS. 5 and 6 and directed in the longitudinal median plane 18 and perpendicularly to the centre axis 46 and also away from the pivot bearing body 52 causes on the one hand tensile forces ZX1 and ZX2 (FIG. 6) to occur in the deformation regions 82 and 84 and on the other hand also bending forces BX1 and BX2 (FIG. 5), which are superimposed by these tensile loads ZX1 and ZX2, wherein these forces act in the direction of the longitudinal median plane 18, in particular in the longitudinal median plane 18, of the holding arm 30.

Figure 7:
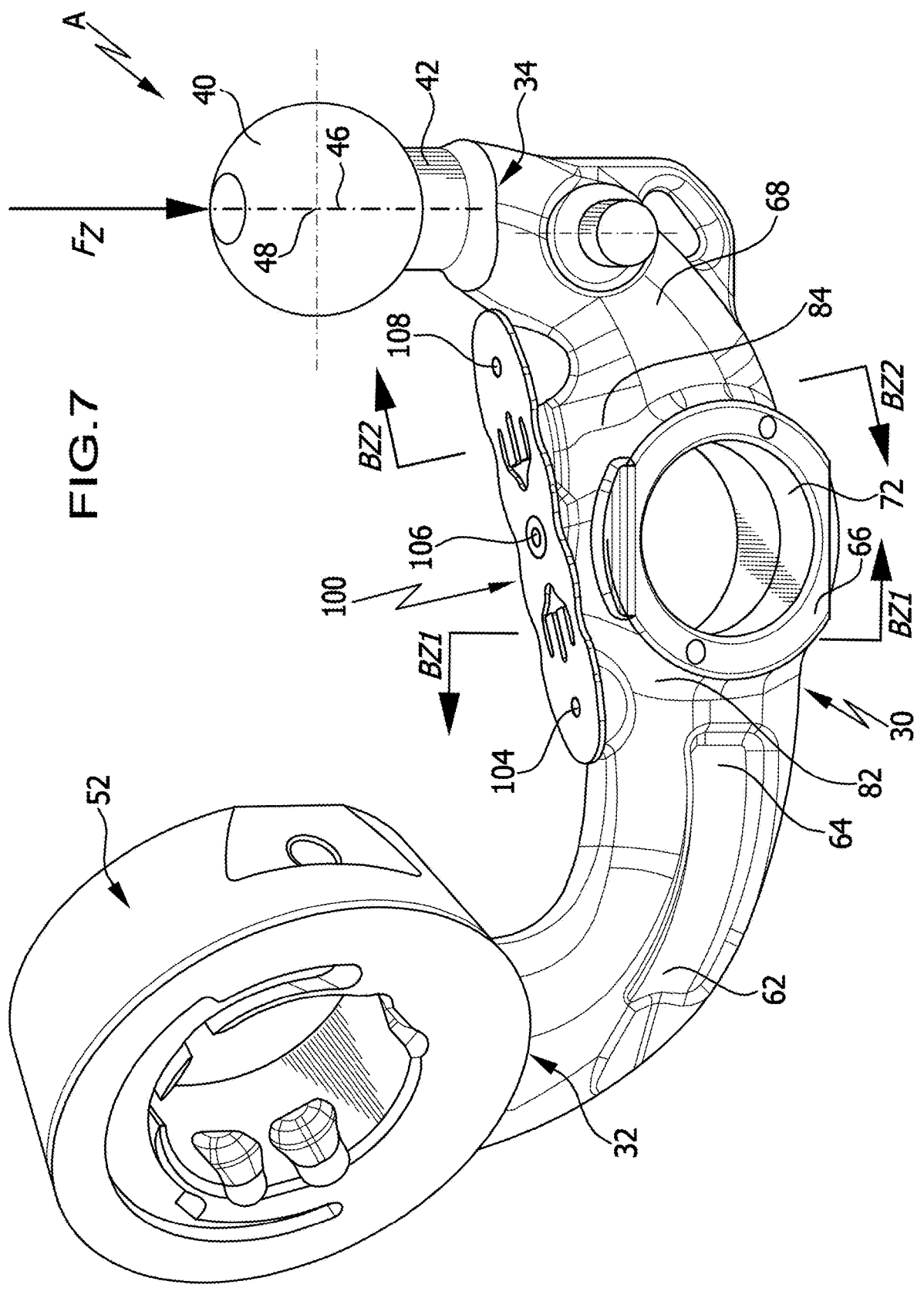
FIG. 7 shows a side view of the holding arm under the action of a force $F_z$.
Figure 8:
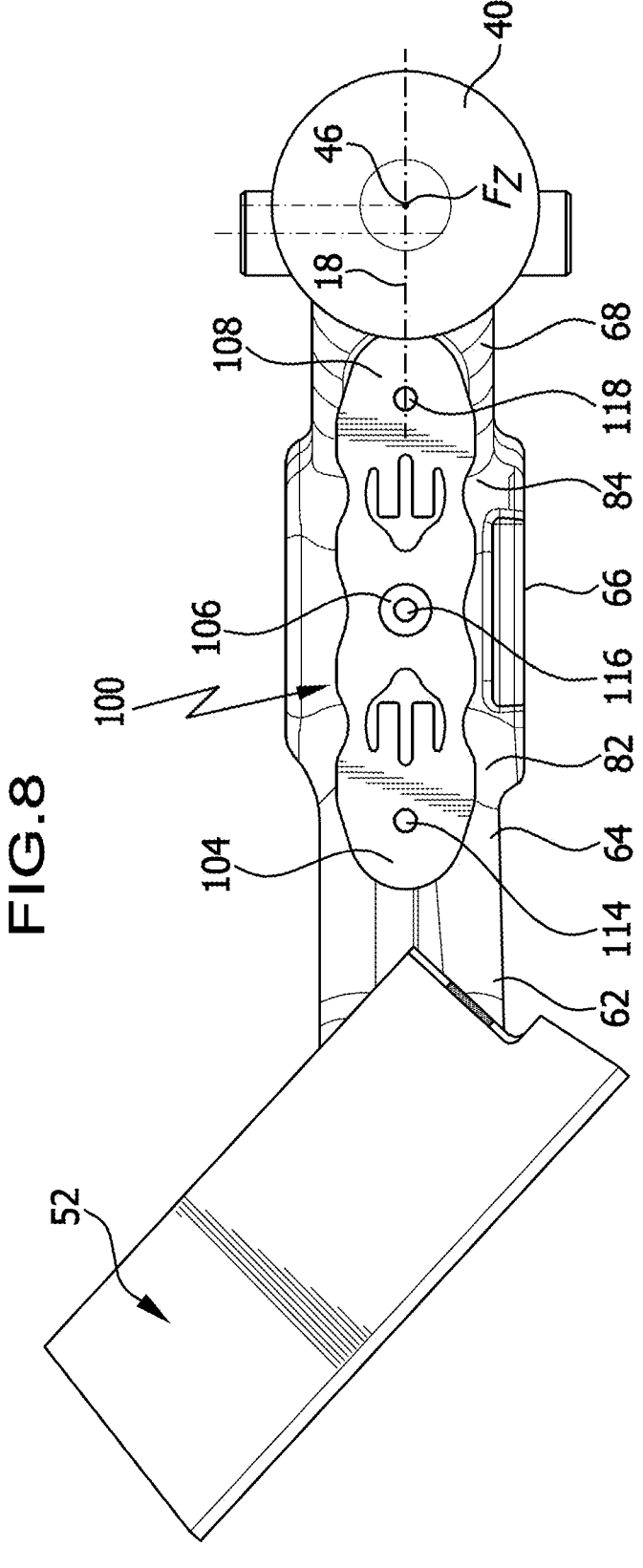
FIG. 8 shows a plan view of the holding arm in accordance with FIG. 6 under the action of the force $F_z$.

Furthermore, in the deformation regions 82 and 84, as shown in FIGS. 7 and 8, under a loading of the coupling element 40 by a force $F_z$ acting in the direction of the centre axis 46, substantially bending forces BZ1 and BZ2 occur in the deformation regions 82 and 84, wherein these forces act in the direction of the longitudinal median plane 18, in particular in the longitudinal median plane 18, of the holding arm 30, which, based on a so-called length-invariable neutral fibre NF, thus have opposite effects on opposite sides.

Figure 9:
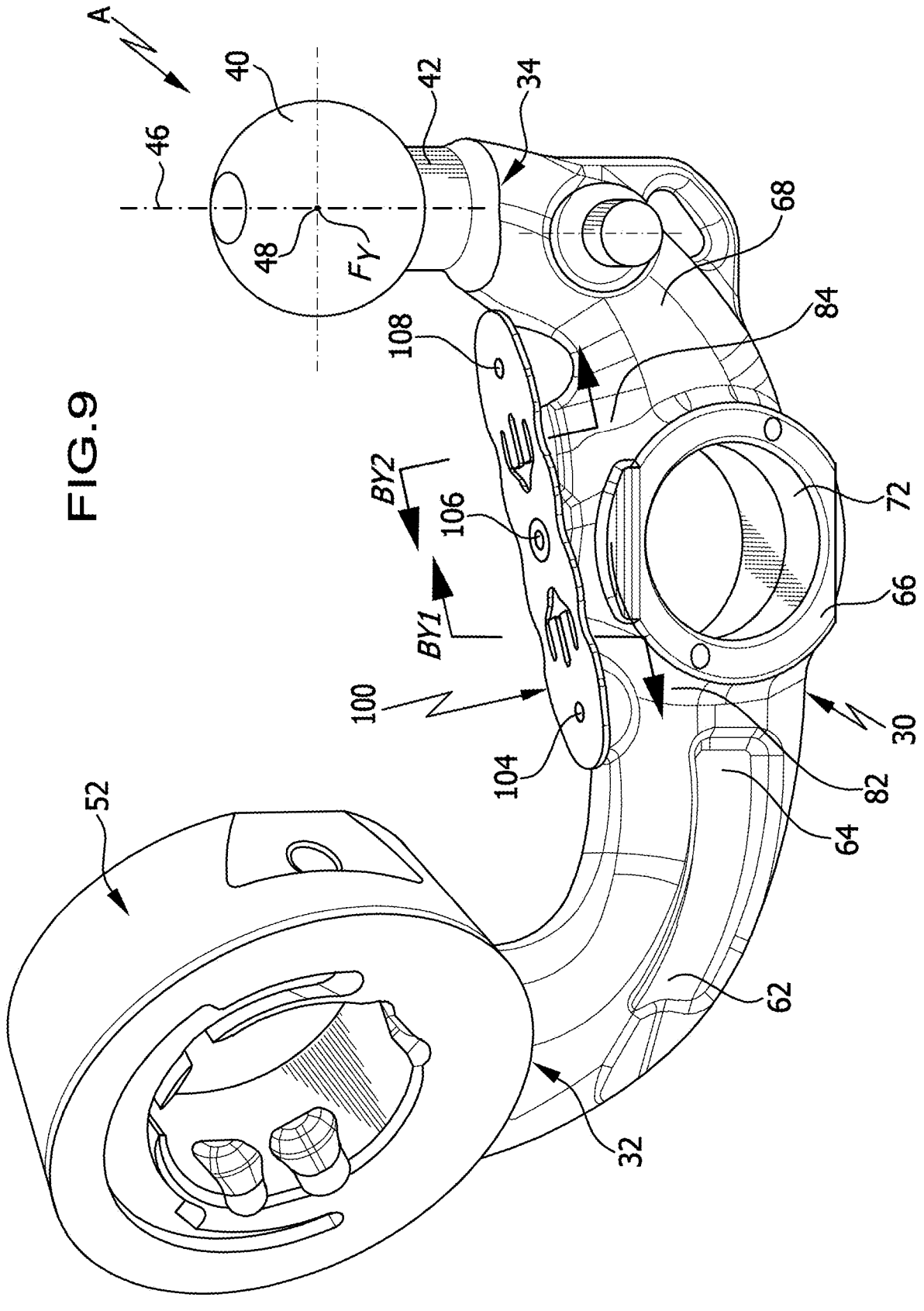
FIG. 9 shows a side view of a holding arm under the action of a force $F_y$.
Figure 10:
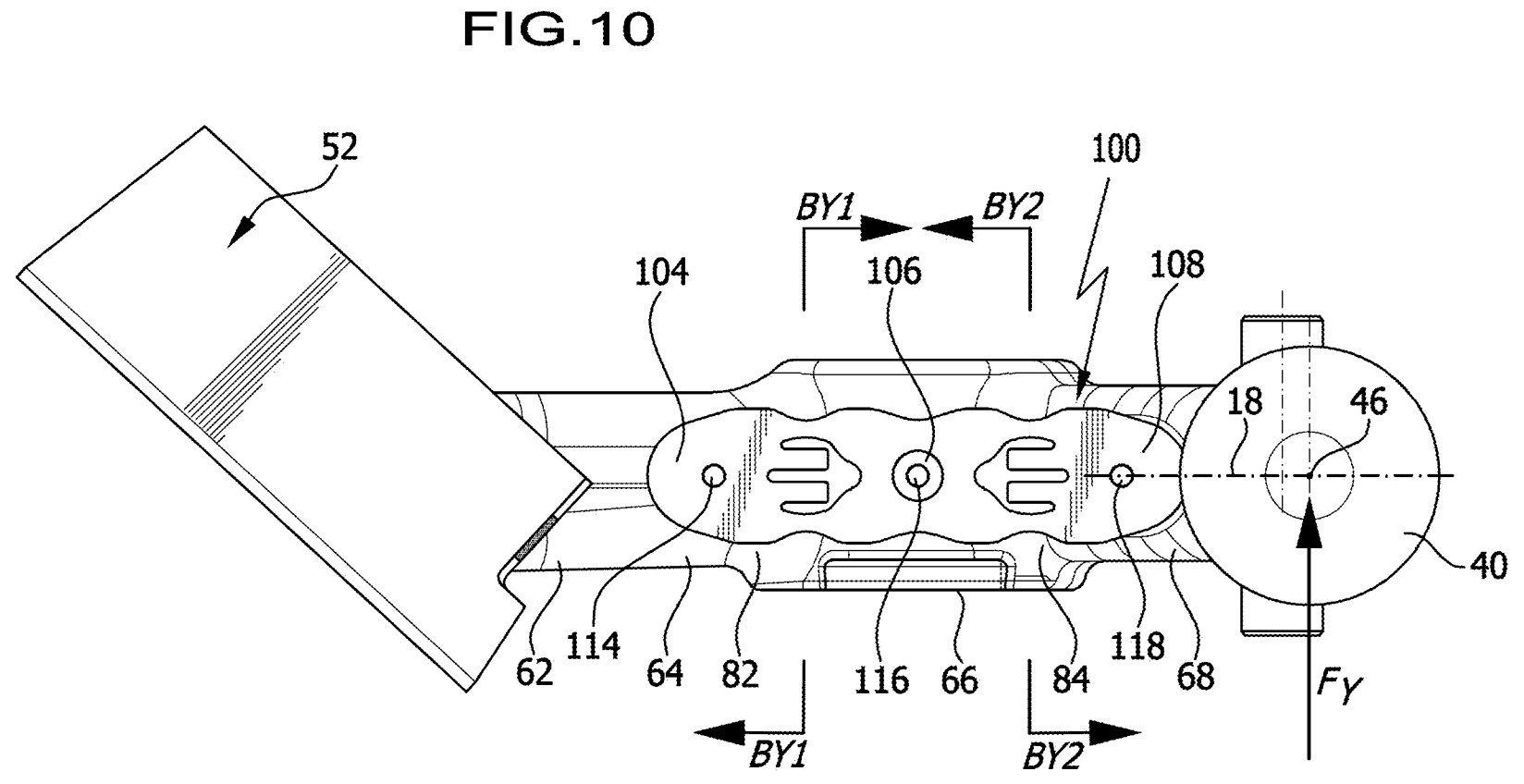

In addition, a force $F_y$ acting on the coupling element 40 and directed perpendicularly to the longitudinal median plane 18 and perpendicularly to the centre axis 46, as shown in FIGS. 9 and 10, leads to bending forces BY1 and BY2 acting on either side of the longitudinal median plane 18, but oppositely to one another on different sides of said plane.

To detect these tensile forces ZX1 and ZX2 and also the bending forces BX1 and BX2, BZ1 and BZ2 as well as BY1 and BY2, a force detection module denoted as a whole by 100 is arranged on the holding arm 30.

This force detection module 100 comprises a deformation transfer element 102, which is rigidly connected at three fastening regions 104, 106 and 108 to the holding arm 30, wherein the fastening region 104 is located on a side facing the first end 32 and is rigidly connected to a formation 114 of the holding arm 30, sitting for example on the middle piece 64, the fastening region 106 is arranged approximately centrally between the fastening regions 104 and 108 and for example is connected to a holding formation 116 sitting on the annular body 66, in particular centrally, and the fastening region 108 is connected to a formation 118 of the holding arm 30 arranged on the arcuate piece 68, for example in a central region of the arcuate piece 68 between the annular body 66 and the end 34.

The connection between the various connection elements 114, 116 and 118 of the holding arm 30 is in this case rigid and free from play, preferably as the result of a welding or an adhesive bonding, which does not allow any movement elasticity between the deformation transfer element 102 and the connection elements 114, 116 and 118.

The connection elements 114, 116 and 118 are preferably likewise rigidly connected to the holding arm, in particular moulded thereon.

Figure 11:
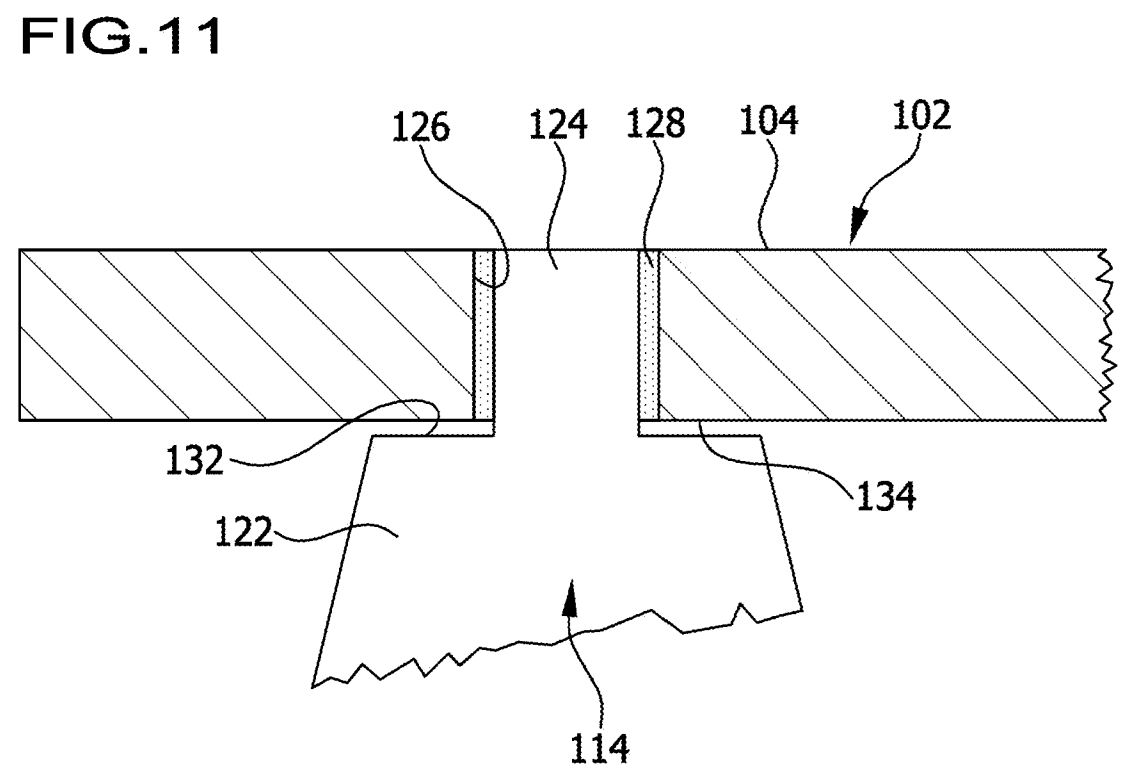

As shown by way of example in FIG. 11 on the basis of the example of the base 114, the connection elements 114, 116 and 118 of the holding arm 30 are preferably configured such that they have a foot region 122, which extends starting from the holding arm 30 and forms a fixing pin 124, which passes through a passage 126, which is arranged in the corresponding fastening region, in this case the fastening region 104 of the deformation transfer element 102.

The fixing pin 124 and the passage 126 are preferably matched in respect of their form such that they are rigidly connectable to one another by a weld seam 128.

In addition, the foot region 122 is preferably also formed such that it has a shoulder 132 which runs around the fixing pin 124 and on which the deformation transfer element 102 abuts by a contact face 134, surrounding the passage 126, of the fastening region 104 and thus is supported, for example when forming the weld seam 128.

The deformation transfer element 102 is also formed such that it has deformation-resistant regions 144, 146 and 148, which in particular include the fastening regions 104, and in that deformable regions 152, 154, 156, 158 are arranged between the deformation-resistant regions 144, 146, 148, wherein for example the deformable regions 152 and 154 lie between the deformation-resistant regions 144 and 146 and are preferably arranged at the same spacing from the longitudinal median plane 18, but on opposite sides thereof, and the deformable regions 156 and 158 lie between the deformation-resistant regions 146 and 148 and are likewise arranged on opposite sides of the longitudinal median plane 18, but preferably at the same spacing therefrom.

Here, the deformable regions 152 to 158 are preferably formed as deformation concentration regions; in other words a deformation acting on the deformation transfer element 102 acts much more strongly in these deformation concentration regions 152, 154, 156, 158 than in the deformation-resistant regions 144, 146 and 148, The formation of a deformation concentration region of this kind can be realised in the simplest case in that the material in the deformation concentration regions 152 to 158 has a lower rigidity than in the deformation-resistant regions 144, 146 and 148.

A variation of this kind of the rigidity can be achieved, for example, by changing the material in the region of the deformation concentration regions 152, 154, 156, 158 or also by changing the effective material cross-section.

In the shown exemplary embodiments according to FIGS. 6, 8 and 10, the deformation concentration regions 152, 154, 156 and 158 are formed as narrow webs of a plate 162 forming the deformation transfer element 102, whereas the deformation-resistant regions 144, 146 and 148 are formed by broadly extending regions of the plate 162.

In summary, a formation of the deformation transfer element 102 of this kind has the consequence that a deformation of the deformation region 82 of the holding arm 30 leads to a relative movement of the connection elements 114 and 116 rigidly connected to the holding arm 30, said movement being transferred to the fastening regions 104 and 106 and from there to the deformation-resistant regions 144 and 146 of the deformation transfer element 102, wherein the deformation-resistant regions 144 and 146 of the deformation transfer element 102 experience substantially no deformation, and thus all the deformations forming in the deformation region 82 transfer to the deformable regions 152 and 154, which, since they are also formed as deformation concentration regions, experience in a concentrated manner all the deformation forming between the connection elements 114 and 116 in the deformation region 82.

This means that the deformation concentration regions 152 and 154 experience both deformations caused by the bending forces BX1 effective in the longitudinal median plane 18 and deformations caused by the tensile forces ZX1 and also the deformations occurring as a result of the forces BZ1 and BZ2, wherein, since these deformations are all based on forces effective substantially in the longitudinal median plane 18, both deformation concentration regions 152 and 154 experience the same deformation.

The situation is different for the bending forces BY1 shown in FIGS. 9 and 10 acting on different sides of the longitudinal median plane 18 in different directions, such that, for example, starting from the bending forces BY1 shown in FIGS. 9 and 10, the deformation concentration region 152 experiences a deformation which is based on a compressive loading, whereas the deformation concentration region 154 experiences a deformation based on a tensile loading.

Similarly, deformations of the deformation region 84 of the holding arm are transferred by the connection elements 116 and 118 to the fastening regions 106 and 108, which are part of the deformation-resistant regions 146 and 148 and which thus transfer the deformations of the deformation region 84 to the deformable regions 156 and 158, which are likewise formed as deformation concentration regions and thus experience all of the deformation of the deformation region 84.

This likewise leads to a situation in which the forces BX2, ZX2 and BZ2, which are all effective substantially in the longitudinal median plane 18, act similarly on the deformation concentration regions 156 and 158, whereas the forces BY2 lead to opposite deformations in the deformation regions 156 and 158, so that for example the deformation in the deformation concentration region 156 is based on a compressive loading, whereas the deformation in the deformation concentration region 158 is based on a tensile loading.

Since the deformation regions 82 and 84 of the holding arm experience a different deformation under loading of the coupling element 40 by the force $F_x$ than under loading of the coupling element 40 by the force $F_z$, on account of the different deformation of the deformation regions 82 and 84 it is possible to recognise, on account of the different deformations occurring in the deformation concentration regions 152 and 154 or 156 and 158, whether a force $F_x$ or a force $F_z$ is acting on the coupling element 40, as will be explained in detail hereinafter.

Figure 12:
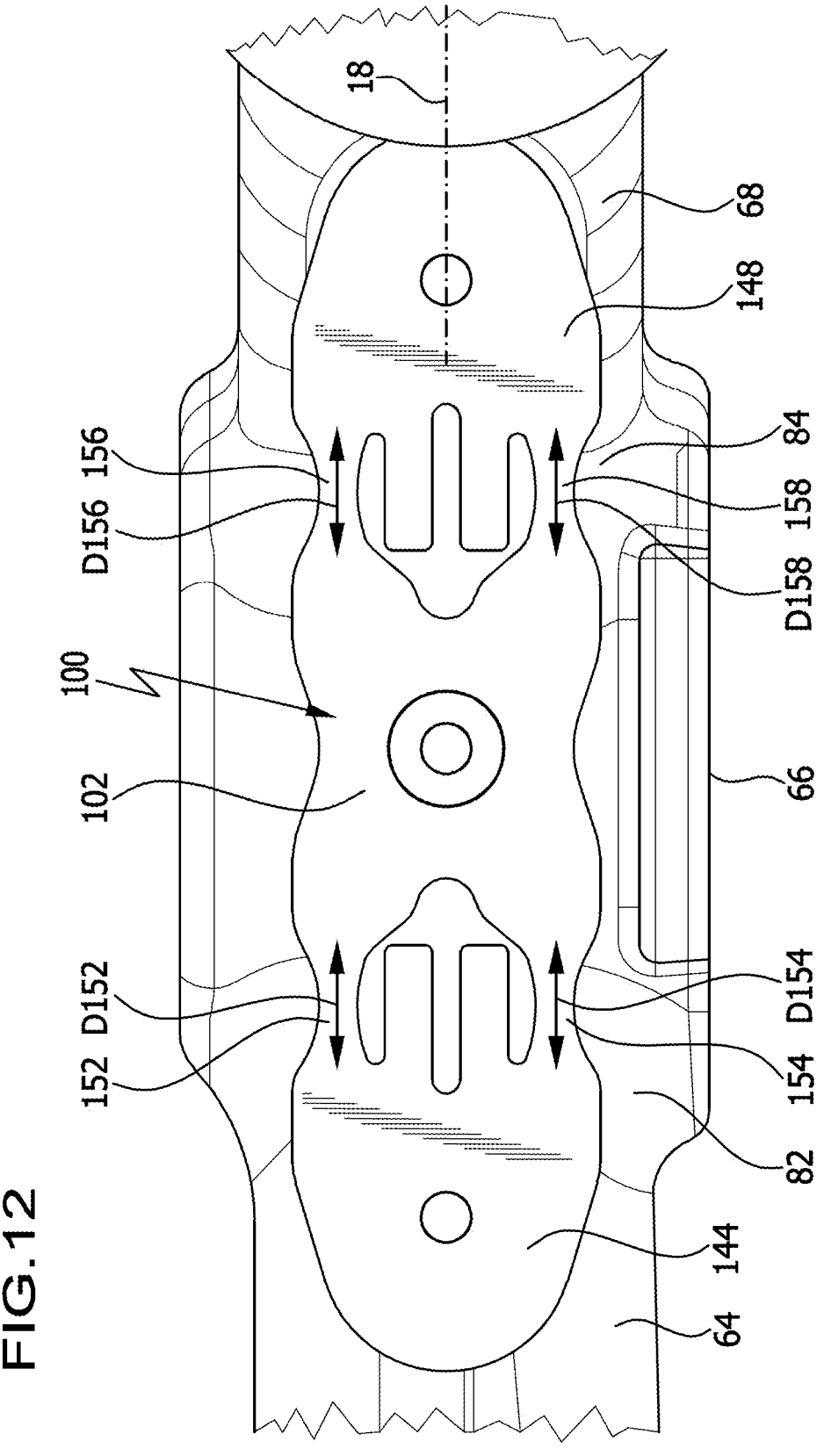
FIG. 12 shows an enlarged plan view of the holding arm with the deformation transfer element under the action of the force F, according to FIGS. 5 and 6.

To explain this it can be assumed, by way of example, that, as shown in FIG. 12, the deformations D152 in the deformation concentration region 152, the deformation D154 in the deformation concentration region 154, the deformation D156 in the deformation concentration region 156 and the deformation D158 in the deformation concentration region 158 are of substantially the same magnitude if the deformation regions 82 and 84, under the occurring bending forces BX1 and BX2 combined with the occurring tensile forces ZX1 and ZX2, behave in substantially the same way.

Figure 13:
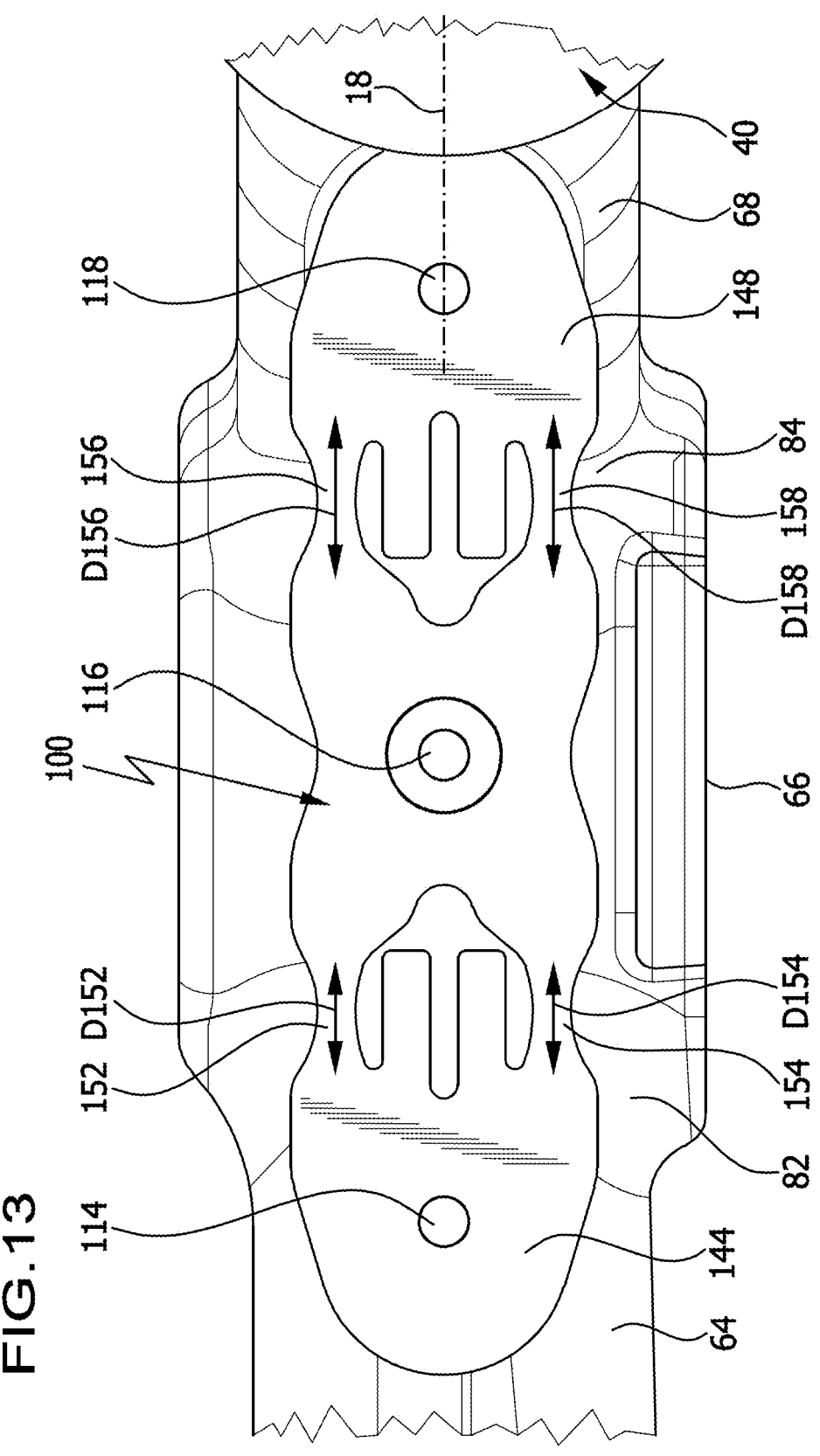
FIG. 13 shows a plan view corresponding to FIG. 12 under the action of the force $F_z$ according to FIGS. 7 and 8.

Furthermore, the behaviour of the deformations in the deformation regions 82 and 84 may change under application of the force $F_z$, such that, as shown by way of example in FIG. 13, the deformations D152 and D154 in the deformation concentration regions 152 and 154 may be significantly smaller than the deformations D156 and D158 in the deformation concentration regions 156 and 158.

Figure 14:
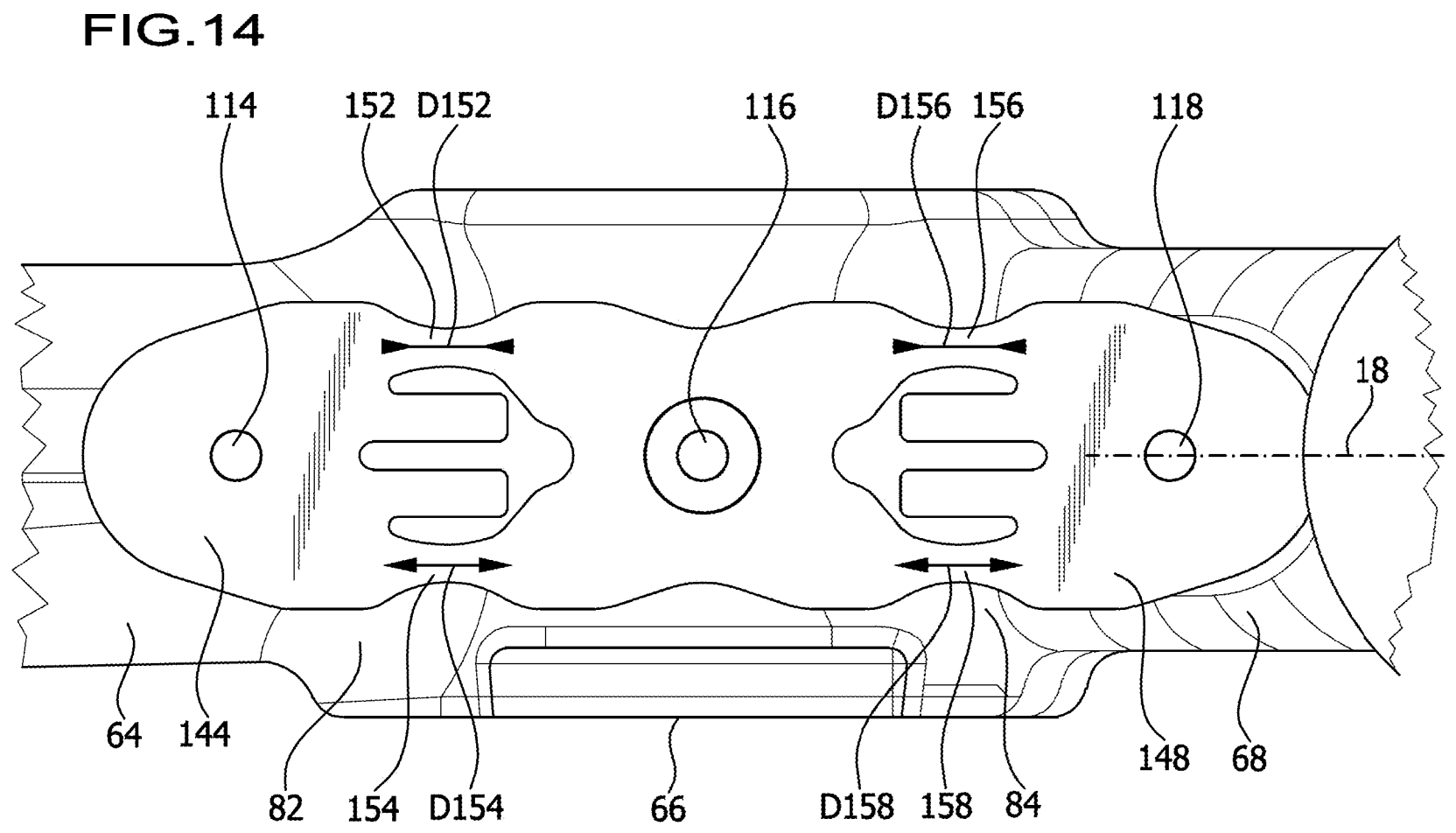

On the other hand, the situation is different under the action of the force $F_y$, as shown in FIG. 14.

In this case, a compression is occurring in the deformation concentration regions 152 and 156 as deformation D152 and D156, whereas a stretching is occurring as deformation D154 and D158 in the deformation concentration regions 154 and 158.

Here, the deformations D152 and D156 based on compressions may be the same or different and, similarly, the deformations D154 and D158 based on stretching may also be the same or different.

Figure 15:
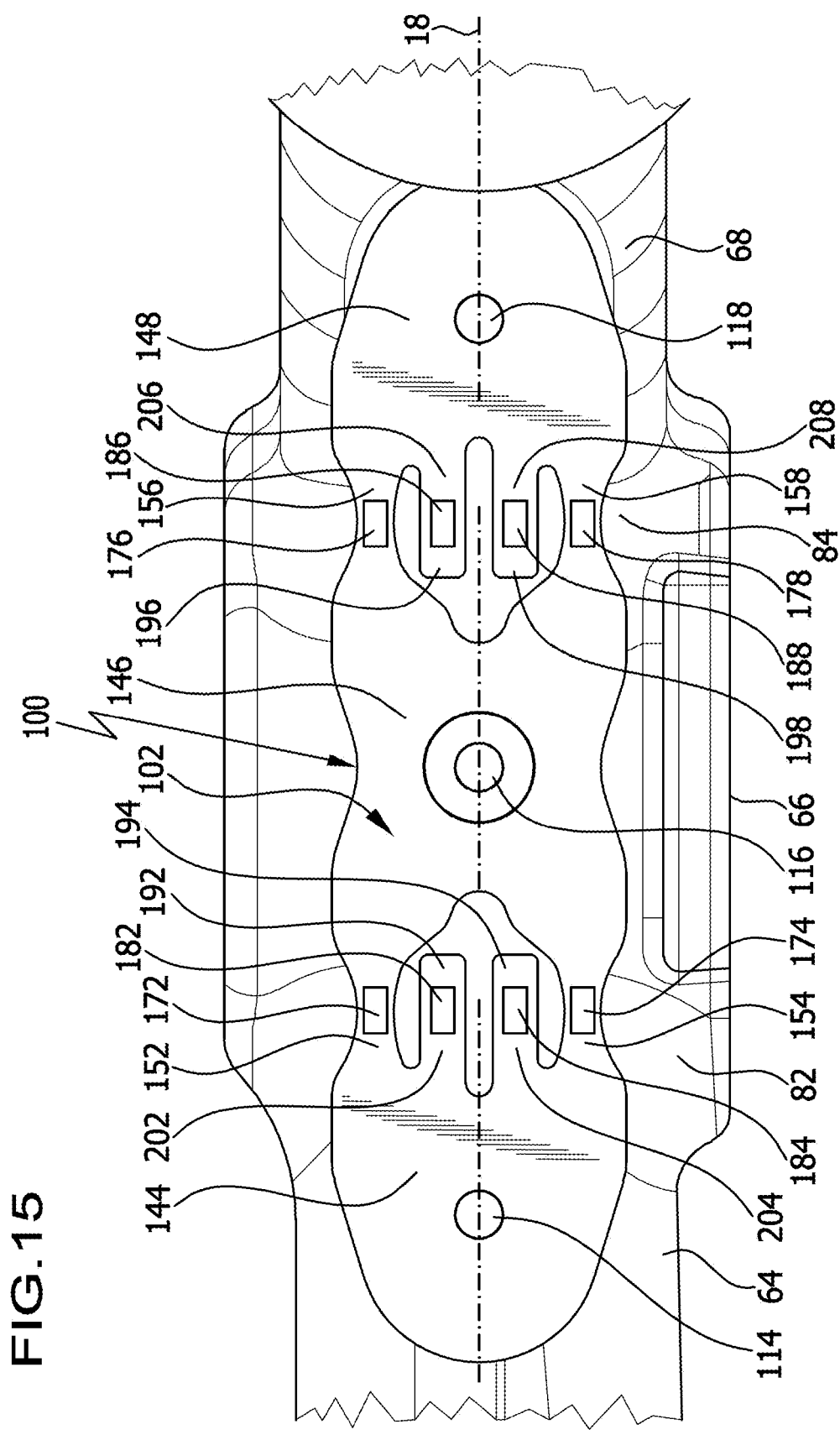
FIG. 15 shows an enlarged plan view of the deformation transfer element according to a first exemplary embodiment with the deformation sensors and reference deformation sensors arranged thereon.
Figure 17:
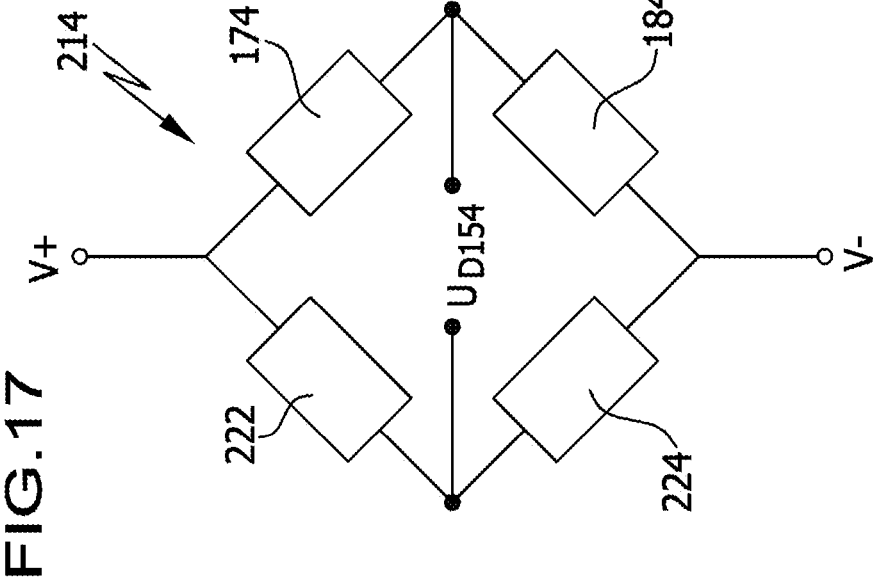
FIG. 17 shows a depiction of the Wheatstone bridge corresponding to FIG. 16 for connecting a second deformation sensor to a second reference deformation sensor.
Figure 16:
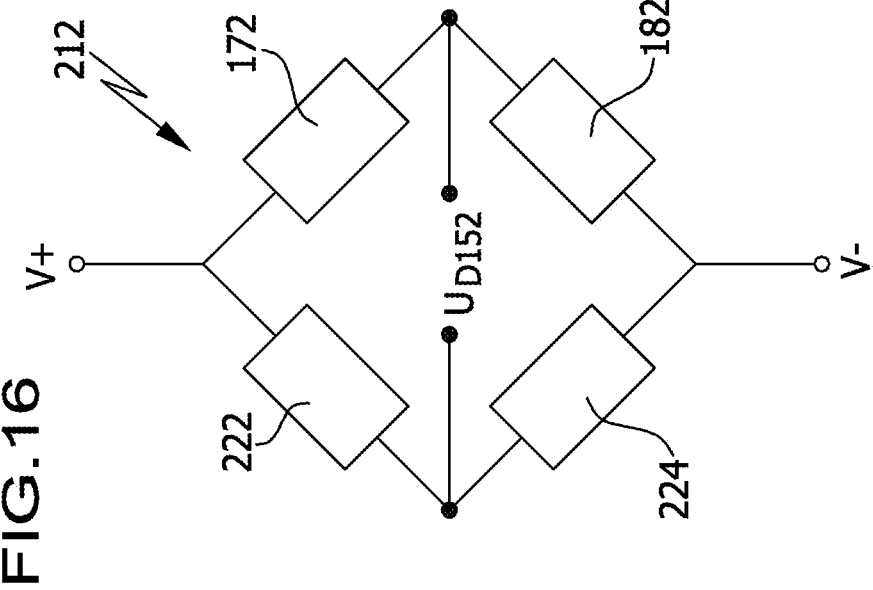
FIG. 16 shows a depiction of a Wheatstone bridge for connecting a first deformation sensor to a first reference deformation sensor.
Figure 19:
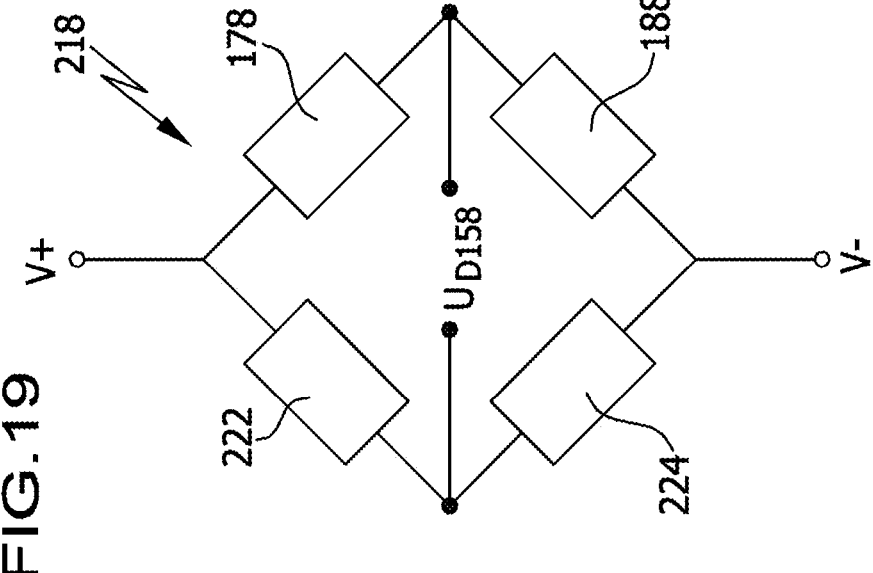
FIG. 19 shows a depiction of a Wheatstone bridge corresponding to FIG. 16 for connecting a fourth deformation sensor to a fourth reference deformation sensor.
Figure 18:
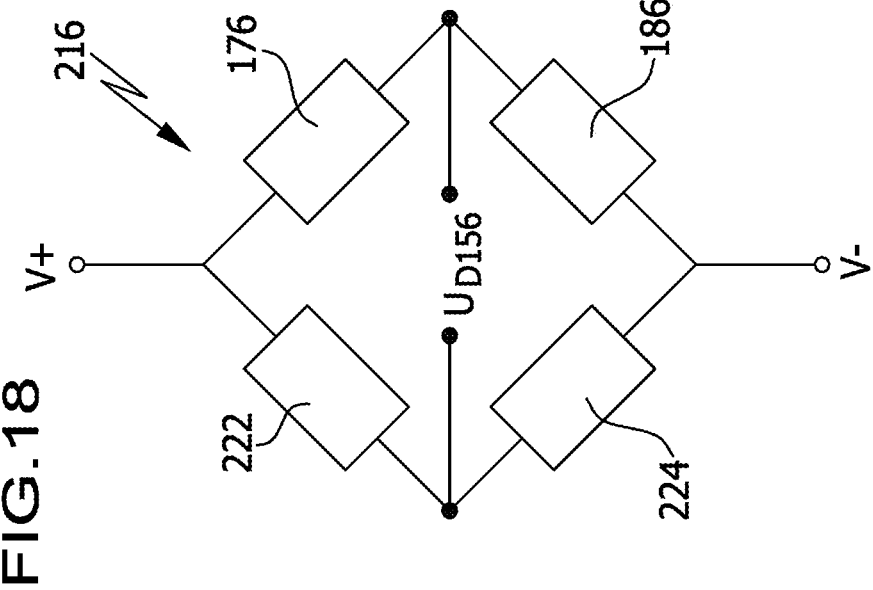
FIG. 18 shows a depiction of a Wheatstone bridge corresponding to FIG. 16 for connecting a third deformation sensor to a third reference deformation sensor.

To detect the stretching or compression occurring as a result of forces $F_x$ and/or $F_z$ and/or $F_y$ in the deformation concentration regions 152, 154, 156 and 158, deformation sensors 172, 174, 176 and 178 are arranged in one each of the deformation concentration regions 152, 154, 156 and 158, as shown in FIG. 15, thus creating a way of detecting the stretching and compression in the various deformation concentration regions 152, 154, 156 and 158.

Since, in the deformation concentration regions 152, 154, 156 and 158, not only do stretching and compression occur that are brought about by the deformation regions 82 and 84 of the holding arm 30, but, in the deformation concentration regions 152, 154, 156 and 158, stretching and compression brought about by a temperature expansion of the material also occur, the deformation sensors 172, 174, 176 and 178 are also assigned reference deformation sensors 182, 184, 186 and 188, which are arranged in load-free reference regions 192, 194, 196 and 198 of the deformation transfer element 102, wherein these load-free reference regions 192, 194, 196 and 198 are preferably formed as tongues 202, 204, 206 and 208 which are arranged as closely as possible to the deformation concentration regions 152, 154, 156, 158 and which extend, starting for example from the deformation-free regions 144 and 148, substantially parallel to the deformation concentration regions 152, 154, 156 and 158, but without contacting the latter or the deformation-free region 146, wherein the load-free reference regions 192, 194, 196 and 198, in the region in which they support the reference deformation sensors 182, 184, 186 and 188, have substantially the same material cross-section with the same material cross-sectional shape as the deformation concentration regions 152, 154, 156 and 158, and in addition the reference deformation sensors 182, 184, 186, 188 are preferably also formed identically with the deformation sensors 172, 174, 176 and 178.

To electronically detect the stretching and compression in the deformation concentration regions 152, 154, 156 and 158, the deformation sensors 172, 174, 176 and 178 arranged therein are each arranged in a Wheatstone bridge 212, 214, 216 and 218, wherein the various Wheatstone bridges 212, 214, 216 and 218 lie between supply connections V+ and V−, as shown in FIGS. 16 to 19.

Furthermore, the deformation sensors 172, 174, 176 and 178 in the Wheatstone bridges 212, 214, 216, 218 are connected in series between the supply connections V+ and V− to the reference deformation sensors 182, 184, 186 and 188 assigned to said deformation sensors, and these series connections of the deformation sensors 172, 174, 176 and 178 to the reference deformation sensors 182, 184, 186 and 188 are connected in parallel to resistors 222 and 224 to form the Wheatstone bridges 212, 214, 216, 218, wherein the resistors 222 and 224 have the same fixed values.

A voltage U can thus be tapped in the various Wheatstone bridges 212, 214, 216 and 218 at the centre taps between the deformation sensors 172, 174, 176 and 178 and the reference deformation sensors 182, 184, 186 and 188 and at the centre taps between the resistors 222 and 224, said voltage corresponding substantially to the deformations, that is to say the stretching and compression, occurring in the deformation concentration regions 152, 154, 156 and 158, wherein, by providing the reference deformation sensors 182, 184, 186, 188, temperature effects and in particular also temperature expansions in the deformation concentration regions 152, 154, 156 and 158 are largely compensated for, which is possible in particular if the reference deformation sensors 182, 184, 186 and 188 are identical sensors, similarly to the deformation sensors 172, 174, 176 and 178.

Figure 20:
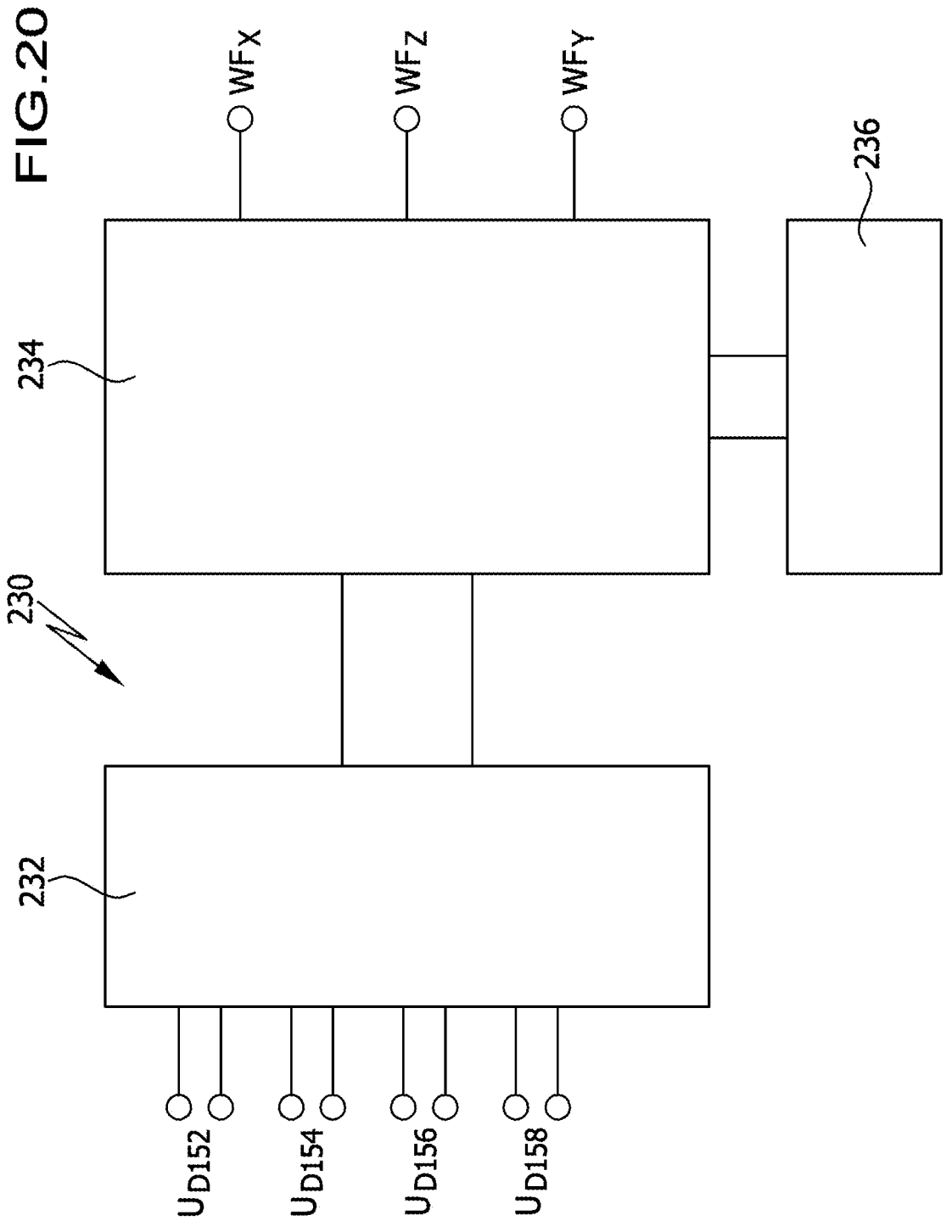
FIG. 20 shows a depiction of an evaluation circuit for processing the voltages measured in the Wheatstone bridges according to FIGS. 16 to 19.

The voltages UD152, UD154, UD156 and UD158 corresponding to the deformations in the deformation concentration regions 152, 154, 156 and 158 and tapped from the Wheatstone bridges 212, 214, 216, 218 are supplied, as shown in FIG. 20, to an A-D converter 232 of an evaluation circuit 230 comprising said converter, which additionally has a processor 234, which is coupled to the A-D converter 232 and which, from the digital values of the voltages UD152, UD154, UD156 and UD158, by comparing the latter with transformation values for the values of the voltages UD152, UD154, UD156 and UD158, said transformation values being determined within the scope of a calibration process and stored in a memory 236, outputs values $WF_x$, $WF_z$ and $WF_y$, for example to corresponding outputs, said values being associated with the forces $F_x$, $F_z$ and $F_y$.

In the simplest case, a transformation matrix T valid for all spatial directions is stored in the memory 236 and can be used to convert the digital values of the voltages UD152, UD154, UD156 and UD158 into values $WF_x$ and $WF_z$ and $WF_y$ for the forces acting on the coupling element 40.

Figure 21:
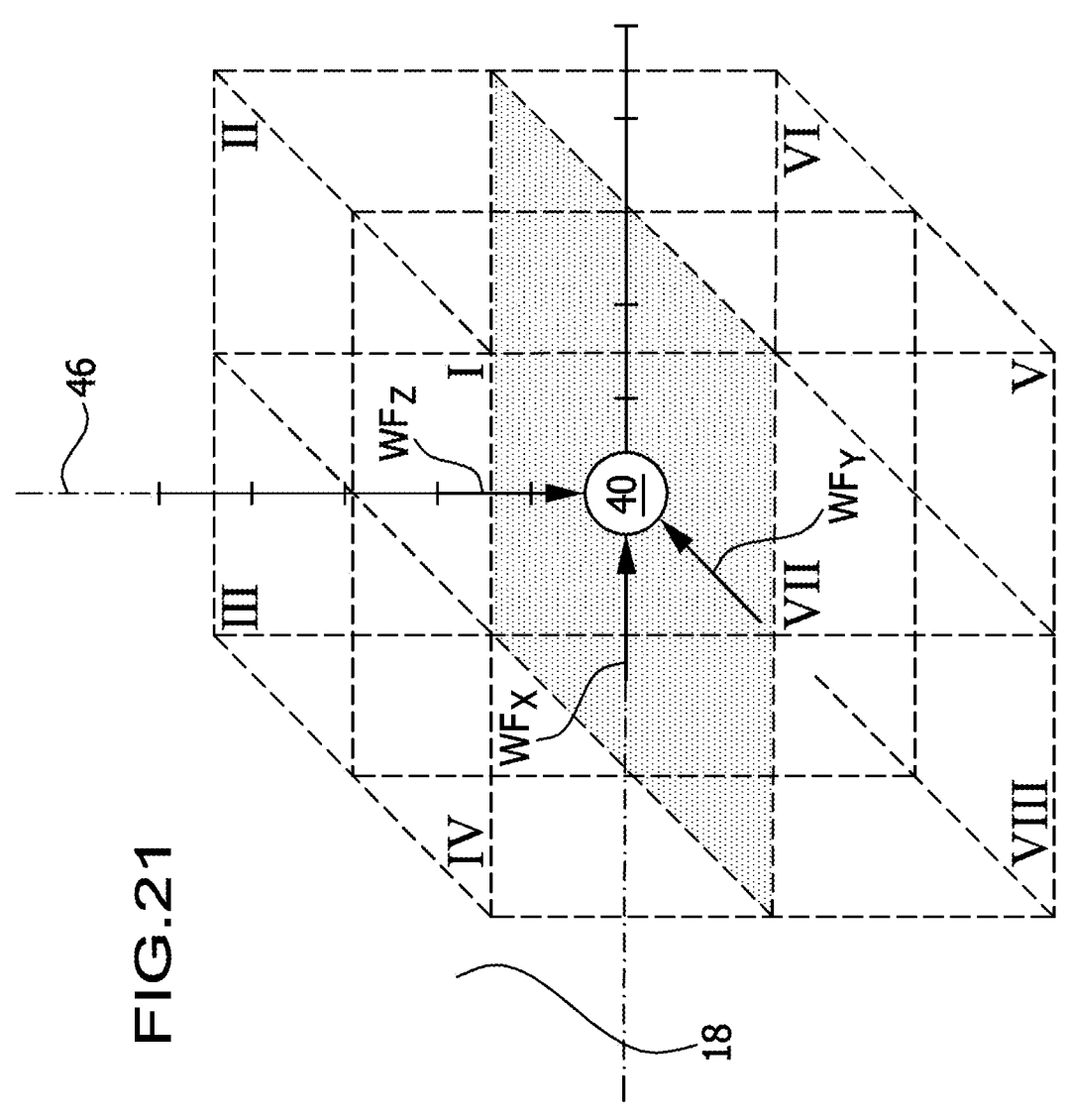
FIG. 21 shows a depiction of a coupling element 40 and of the forces determined by the evaluation circuit and acting on the coupling element 40.

It is possible to improve the quality of the values $WF_x$, $WF_z$ and $WF_y$, if the calibration is performed for value pairings $WF_x$, $WF_z$ and $WF_y$ located in each of the octants I to VIII according to FIG. 21 arranged around the trailer element 40, sand therefore it is also possible to incorporate a non-linear correlation between the forces $F_z$, $F_z$, $F_y$ acting on the coupling element 40 and the digital values of the voltages UD152, UD154, UD156 and UD158 into the calibration and thus a transformation of these values of the voltages UD152, UD154, UD156 and UD158 into the values $WF_x$, $WF_z$ and $WF_y$ for the forces acting on the coupling element 40.

The accuracy of the determined values $WF_x$, $WF_z$ and $WF_y$ is thus significantly improved.

A wide range of possibilities are conceivable in respect of the arrangement of the evaluation circuit 230 comprising in particular the A-D converter 232, the processor 234 and the memory 236.

For example, it would be conceivable to arrange the evaluation circuit 230 directly on the deformation transfer element 102.

However, it is particularly favourable if the evaluation circuit 230 is arranged on a circuit board 240, which is coupled to the deformation transfer element 102, but is arranged separately therefrom.

Not only can the evaluation circuit 230 then be arranged on this circuit board 240, but also the resistors 222 and 224 of the various Wheatstone bridges 212, 214, 216 and 218.

A particularly advantageous embodiment provides here that the deformation sensors 172, 174, 176 and 178 and also the reference deformation sensors 182, 184, 186 and 188 are arranged on one side of the deformation transfer element 102, more specifically on a side facing the circuit board 240, whereas on the circuit board 240 there is arranged the evaluation circuit 230, in particular with the A-D converter 232, the processor 234 and the memory 236, on a side that likewise faces the deformation transfer element 102.

Figure 23:
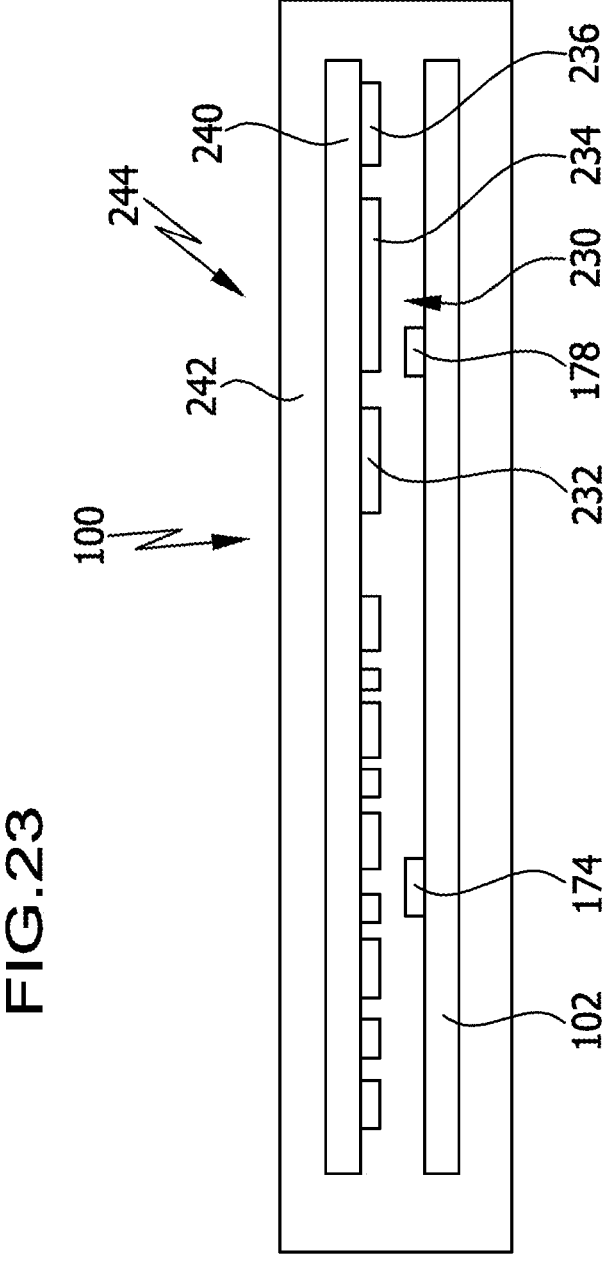
FIG. 23 shows a depiction of a unit formed of circuit board supporting the evaluation circuit and of the deformation transfer element with deformation sensors and reference deformation sensors in a side view.

The deformation transfer element 102 and the circuit board 240 are preferably also enclosed or cast in an enveloping material 242, such that the deformation transfer element 102, the circuit board 240 and the enveloping material 242 form a common unit 244 (FIG. 23).

Figure 22:
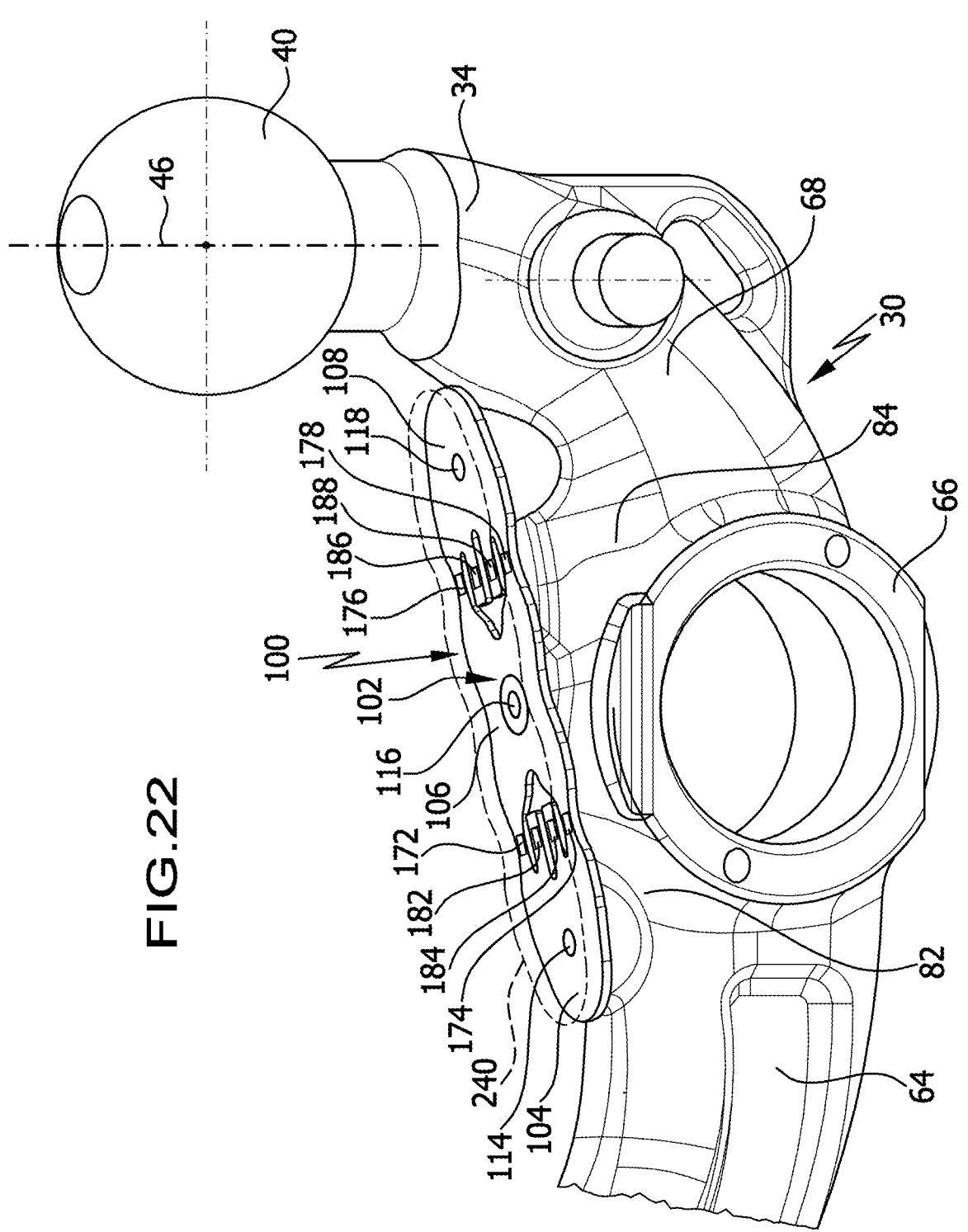
FIG. 22 shows a depiction of a side view of the first exemplary embodiment with the depiction of a circuit board supporting the evaluation circuit.

This unit 244 can be mounted at the connection elements 114, 116 and 118, such that the circuit board 240 lies on a side of the deformation transfer element 102 facing away from the holding arm 30, as shown for example in FIG. 22.

Figure 24:
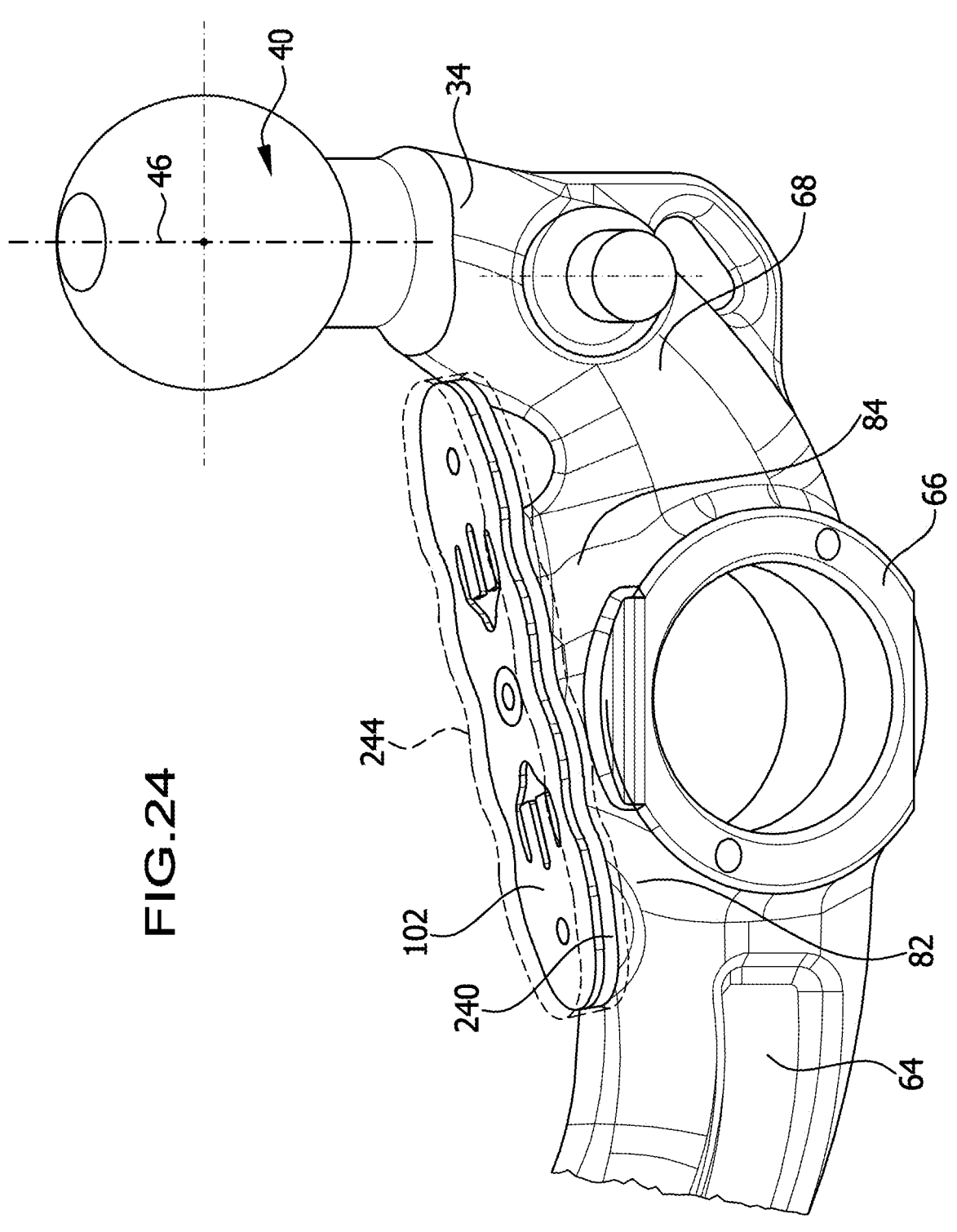
FIG. 24 shows a depiction of a second exemplary embodiment of a device according to the invention with reverse arrangement of the unit comprising the deformation transfer element, the strain sensors, the reference strain sensors and the evaluation unit.

However, in a second exemplary embodiment, it is also possible to arrange the unit 244 such that the circuit board 240 lies in a side of the deformation transfer element facing the holding arm 30, as shown for example in FIG. 24.

In a third exemplary embodiment, in order to protect the functions of the reference deformation sensors 182, 184, 186 and 188, for example each of the reference deformation sensors 182, 184, 186, 188 is assigned a separate temperature sensor 252, 254, 256 and 258.

Figure 25:
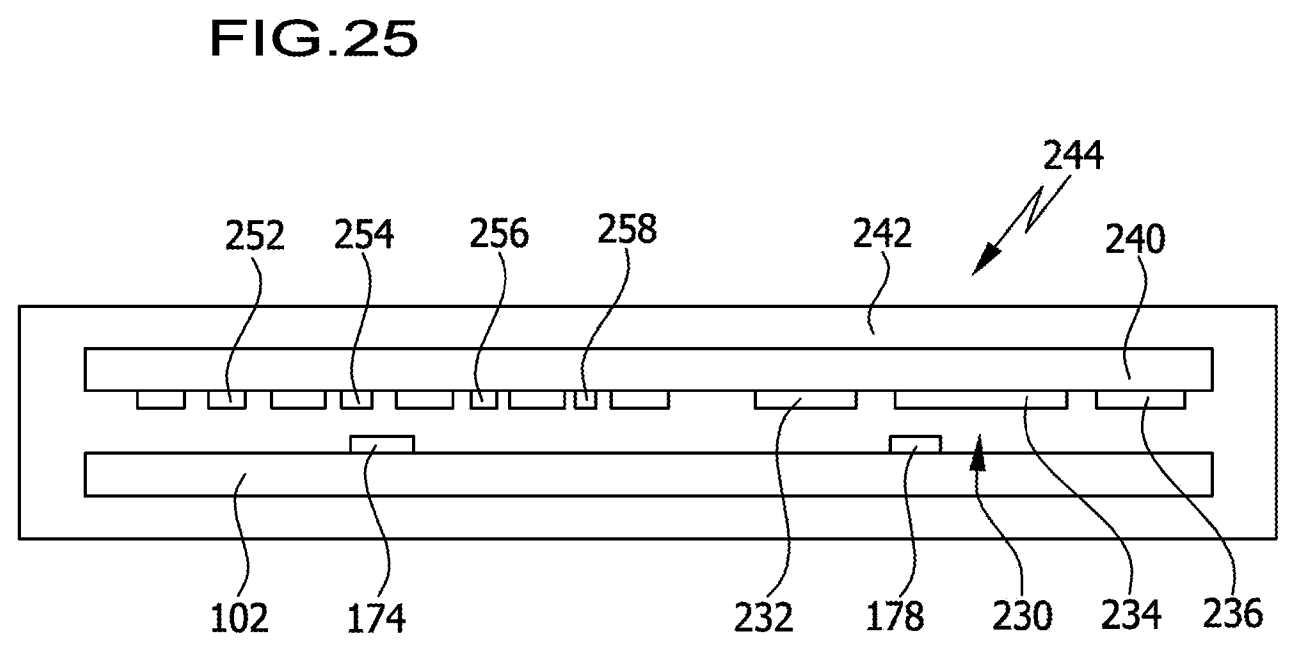
Figure 26:
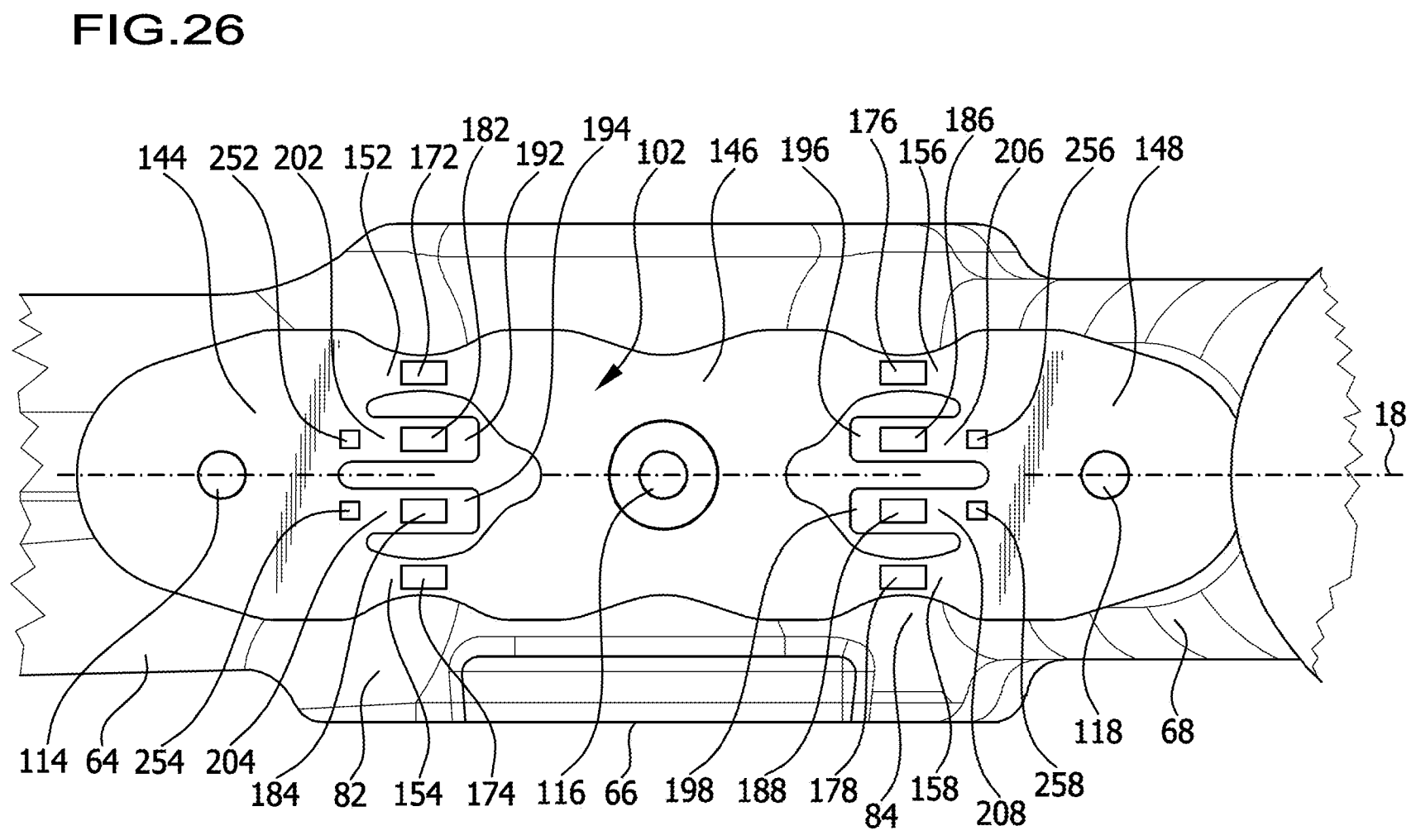

The separate temperature sensors 252, 254, 256, 258 can be arranged either on the circuit board 240, as shown in FIG. 25, or, as shown in a fourth exemplary embodiment in FIG. 26, on the deformation transfer element 102.

An additional temperature sensor 252, 254, 256, 258 of this kind opens up the possibility of carrying out an additional temperature measurement in order to check whether the reference deformation sensors 182, 184, 186 and 188 are fully functional or whether incorrect measurements in relation to the voltages UD152, UD154, UD156 and UD158 could be present due to functional limitations or functional failures of these reference deformation sensors 182, 184, 186, 188.

Figure 27:
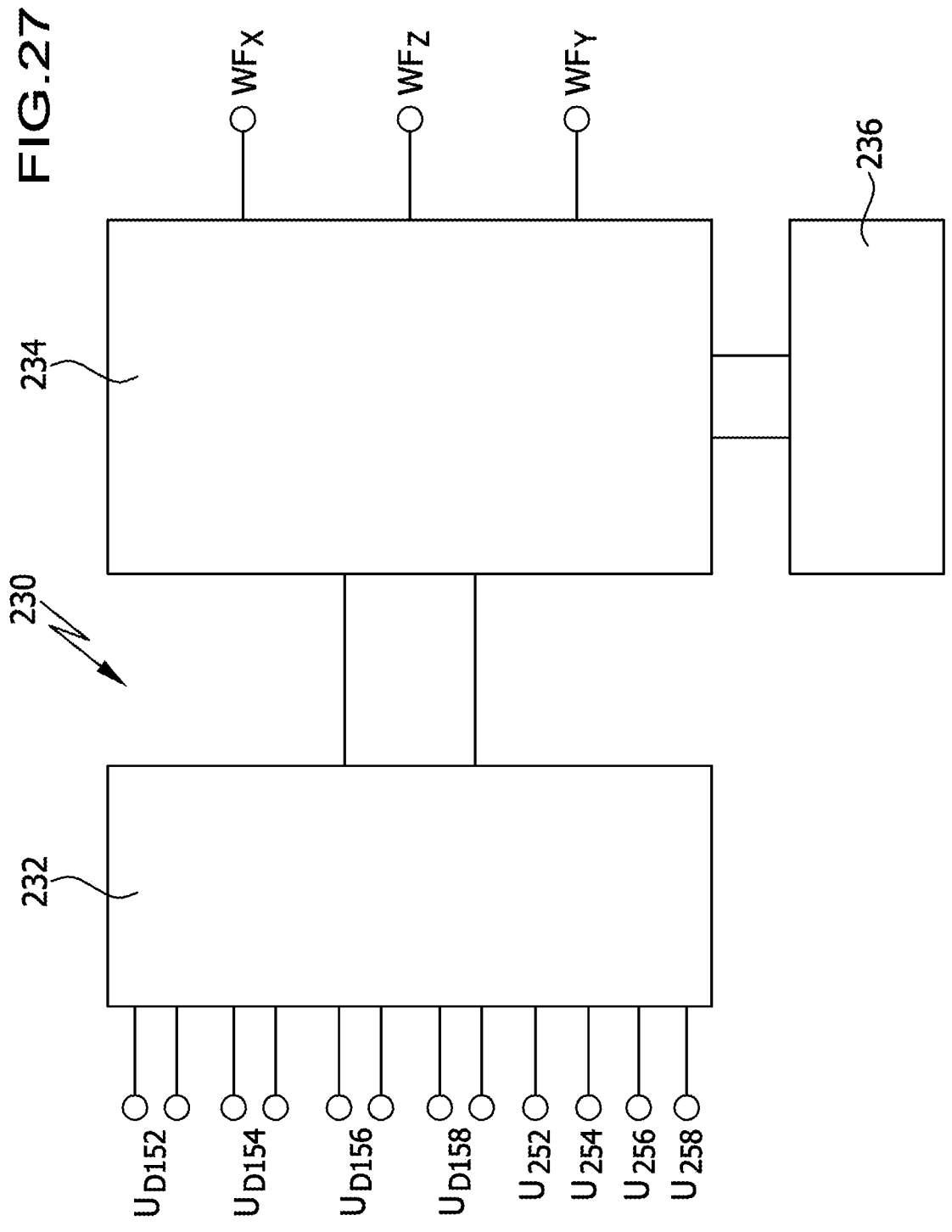
FIG. 27 shows a depiction of the evaluation unit in accordance with the third or fourth exemplary embodiment similar to FIG. 20.
Figure 28:
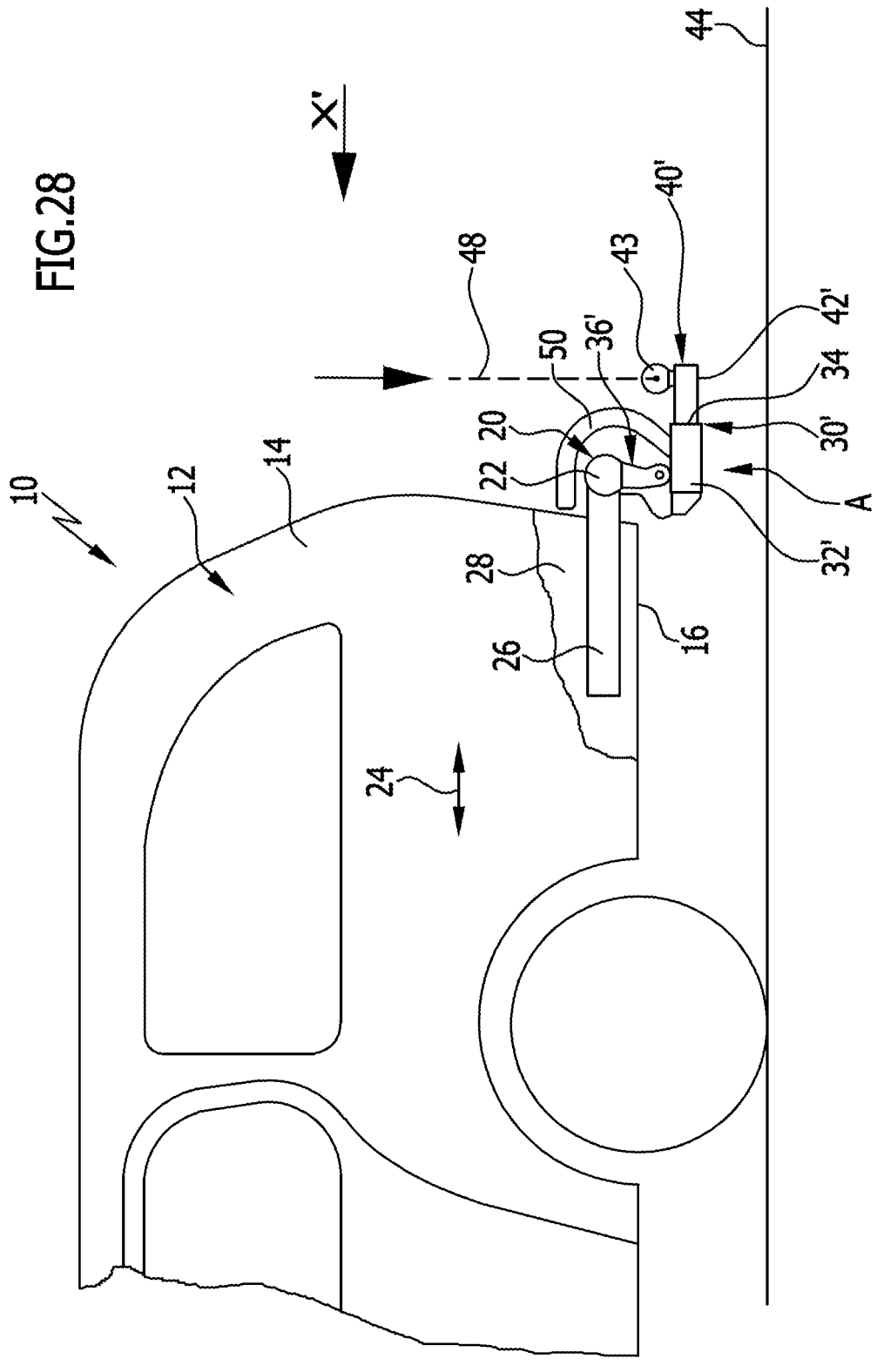
FIG. 28 shows a side view similar to FIG. 1 of a fifth exemplary embodiment of a device according to the invention.
Figure 29:
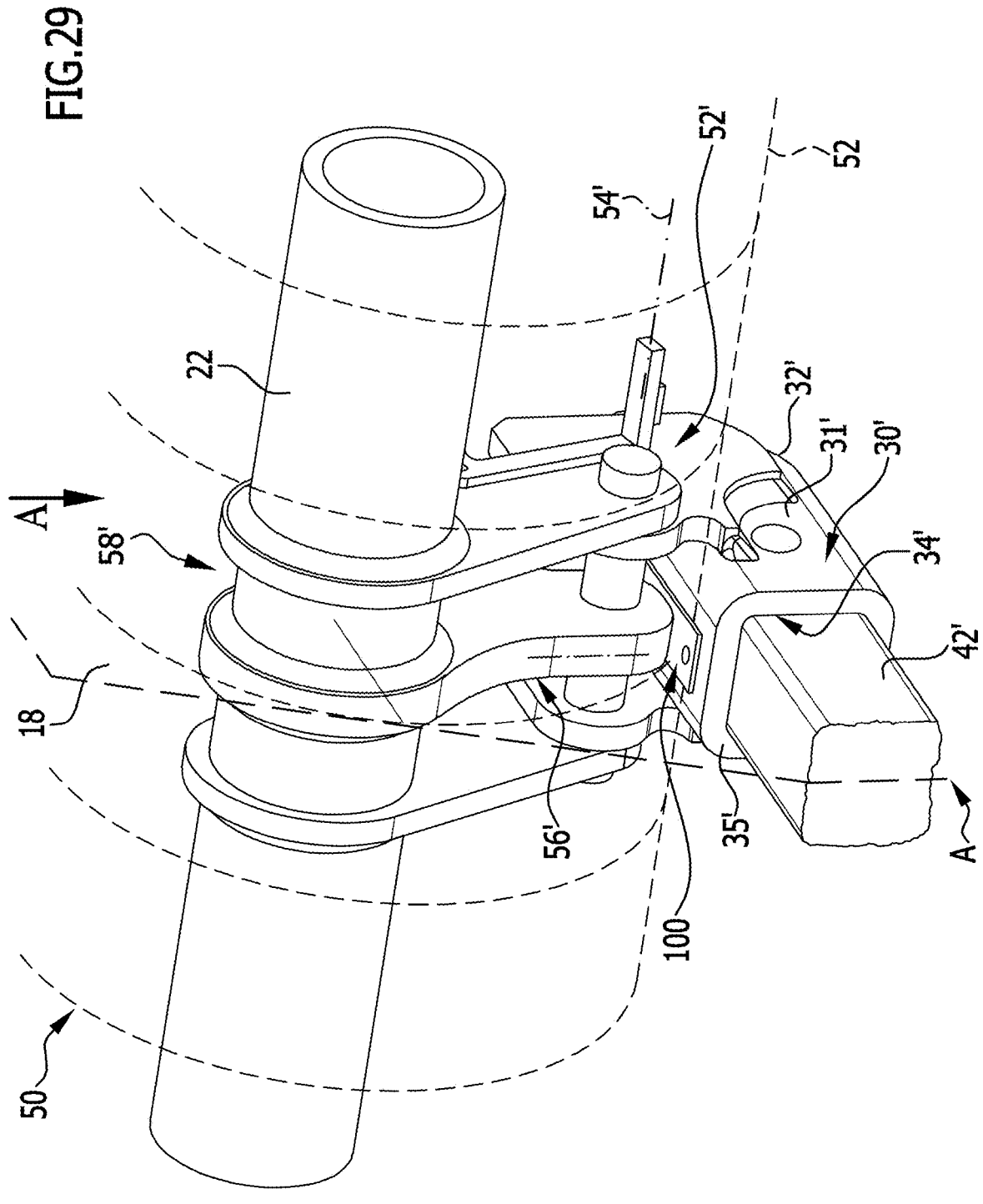
FIG. 29 shows a perspective depiction of the fifth exemplary embodiment of the device according to the invention in the working position.
Figure 30:
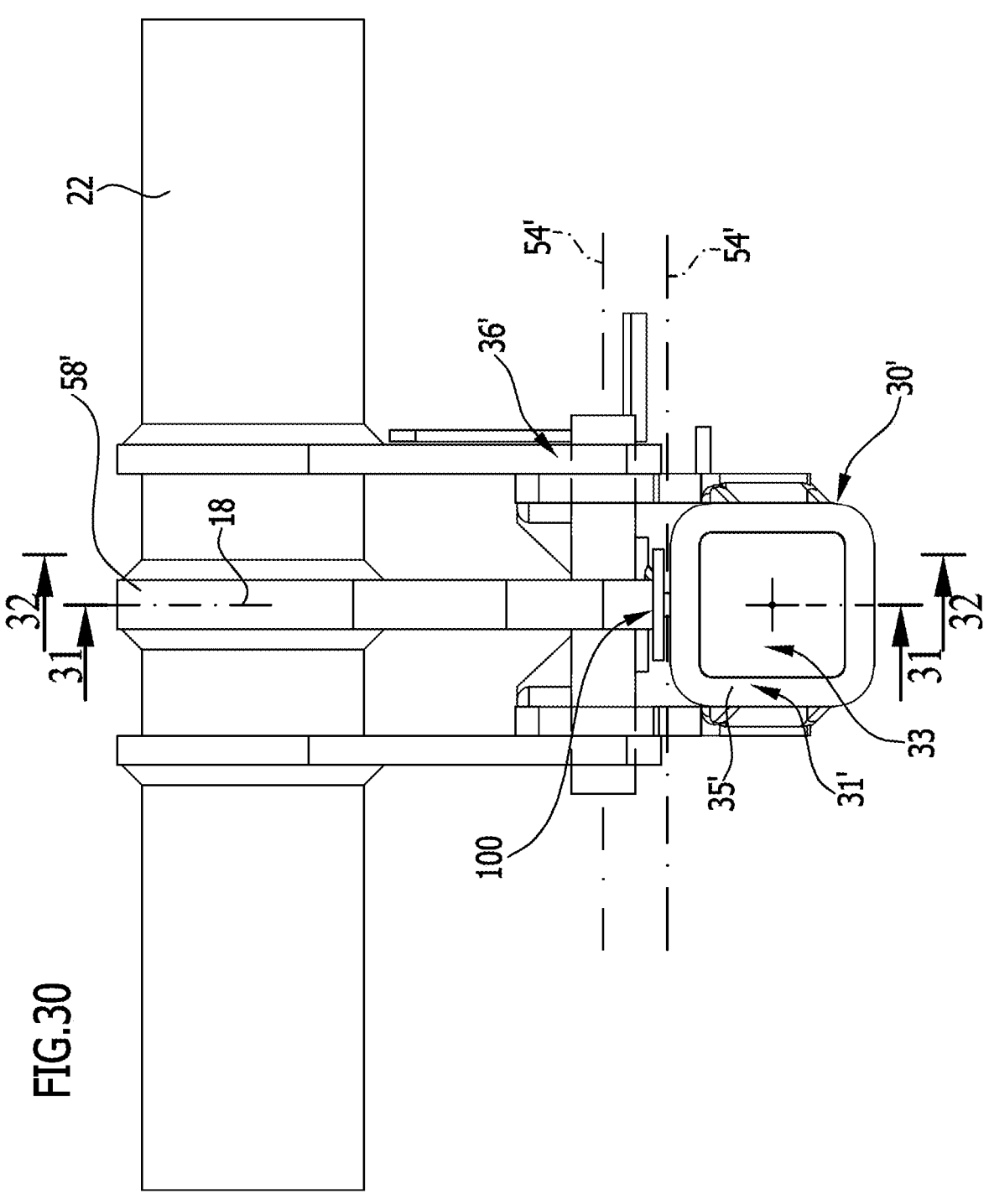
FIG. 30 shows a view of the fifth exemplary embodiment with a view in the direction of the arrow X' in FIG. 28 in the working position.

The voltages UD252, UD254, UD256 and UD258 measured for example at these temperature sensors 252, 254, 256 and 258 are likewise supplied directly, both in the case of the arrangement on the circuit board 240 (FIG. 25) and in the case of the arrangement on the deformation transfer element 102 (FIG. 26), to the A-D converter 232 or the processor 234, as shown in FIG. 27, and are checked by the processor 234 prior to performing the evaluation of the digital values corresponding to the voltages UD152, UD154, UD156 and UD158.

In a fifth exemplary embodiment, a holding arm denoted as a whole by 30' is connected to the carrier unit 20 in that a first end 32' of the holding arm 30' is either held directly or by means of a bearing unit 36' on the carrier unit 20, preferably on the cross-bar 22.

The holding arm 30' comprises a receiving body 31' between the first end 32' and the second end 34' and is formed to receive a coupling element 40', which is provided for example for towing a trailer or for fixing a load carrier unit.

For example, such a coupling element 40' is formed as a coupling ball 43' which is held on a carrier arm 42' and which allows a standard connection to a coupling head of a trailer, wherein the carrier arm 42' is insertable into the receiving body 31 by an insertion portion 45 into an insertion receptacle 33' of the receiving body 31' through an insertion opening 35, considered to be a rear insertion opening as seen in the direction of travel in the working position A, and is fixable therein.

The coupling element 40' for example is connected by means of the carrier arm 42' to the holding arm 30', in such a way that the coupling ball 43 extends starting from a side of the carrier arm 42' facing away from a roadway 44 in the direction of a centre axis 46, which in the case of a horizontal roadway 44 runs approximately vertically and, in the case of the coupling ball 43', runs through a ball centre point 48.

In particular, the insertion receptacle 33' is formed such that it receives the insertion portion 45 transversely to an insertion direction E in positive-locking fashion and releasably and provides a means of securing against a movement in the insertion direction ER by way of a positive-locking element 41.

In particular, the insertion portion 45 of the carrier arm 42' is fixed releasably in the receiving body 31 by a fixing pin 41 running transversely to the vehicle longitudinal median plane 18 and passing through both the receiving body 31 and the carrier arm 42'.

However, a coupling element 40' formed in this way also allows for a simple mounting of a load carrier unit, since widely used load carrier units are likewise formed such that they can be mounted on the coupling ball 43 and, as necessary, can be supported additionally on the holding arm 30.

Alternatively, however, merely a carrier arm 42 held on the load carrier unit and having an insertion portion 45 suitable for insertion into the insertion receptacle 33' is also usable as a coupling element 40'.

To improve the aesthetic effect, the cross-bar 22 is preferably arranged below a rear-end bumper unit 50 of the motor vehicle body 12, wherein the bumper unit 50 covers for example the cross-bar 22 and a part of the first end 32' of the holding arm 30'.

In particular in the shown fifth exemplary embodiment, by way of the insertion portion 45 inserted into the insertion receptacle 33', the holding arm 30' supports the coupling element 40' comprising the coupling ball 43, wherein the holding arm 30', as shown in particular in FIGS. 28 to 32, extends starting from the pivot bearing unit 36', to which the holding arm 30' is connected at its first end region 32', wherein for example a pivot bearing body 52' of the pivot bearing unit 36' is moulded on the first end region 32'.

The pivot bearing body 52' of the pivot bearing unit 36' is mounted at a pivot bearing receptacle 56' so as to be pivotable about a pivot axis 54', running in particular transversely to the vertical vehicle longitudinal median plane 18, said pivot bearing receptacle on the one hand guiding the pivot bearing body 52' rotatably about the pivot axis 54' and on the other hand comprising a locking unit, which in the working position A and the rest position allows the holding arm 30' to be non-rotatably fixed in respect of pivot movements about the pivot axis 54'.

In respect of the formation of the pivot bearing unit 36' and the particular locking of the pivot bearing body 52' relative to the pivot bearing receptacle 56', reference is made fully to the disclosure of DE 10 2016 107 302 A1.

Figure 31:
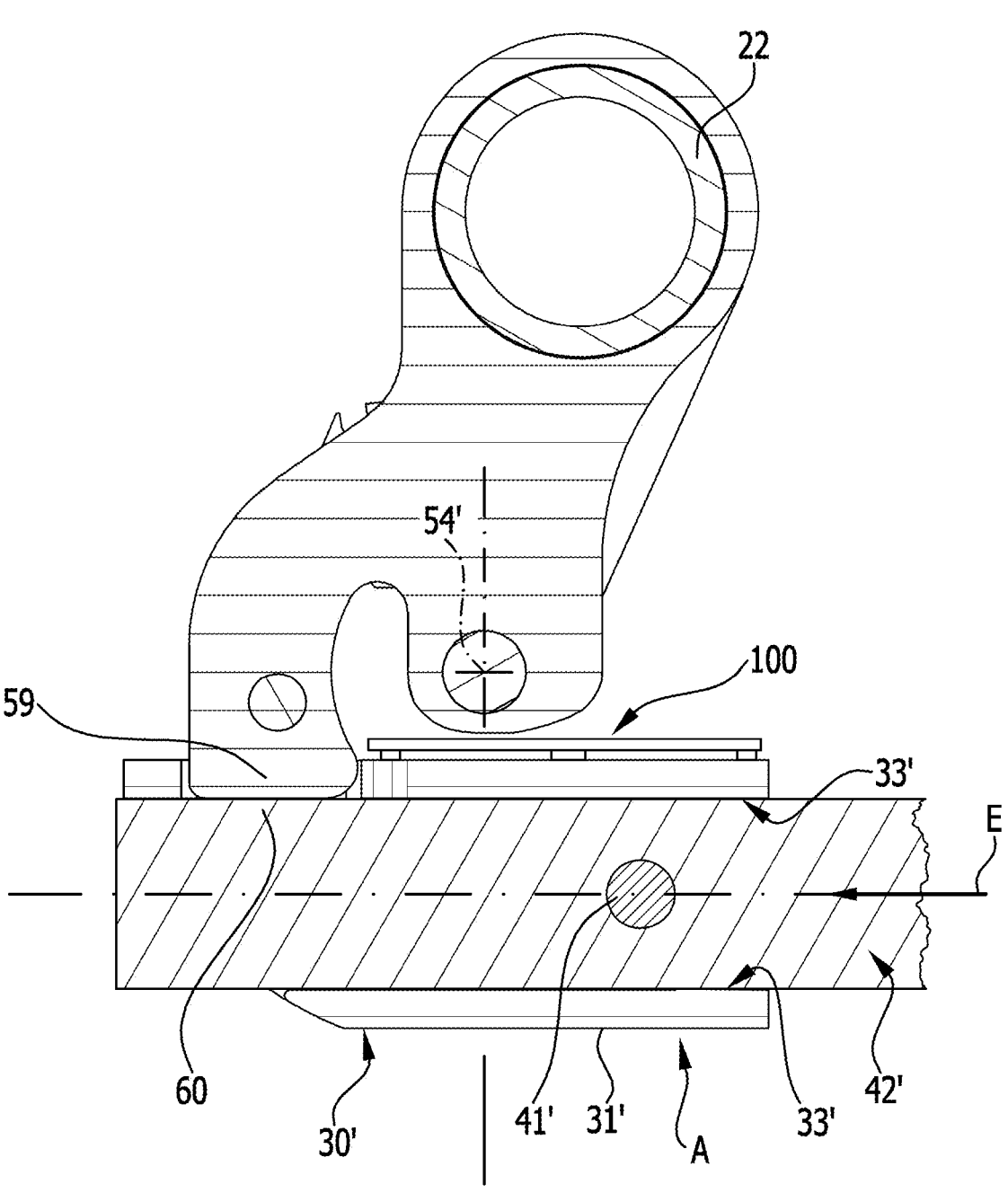
FIG. 31 shows a section along line 31-31 in FIG. 30.
Figure 32:
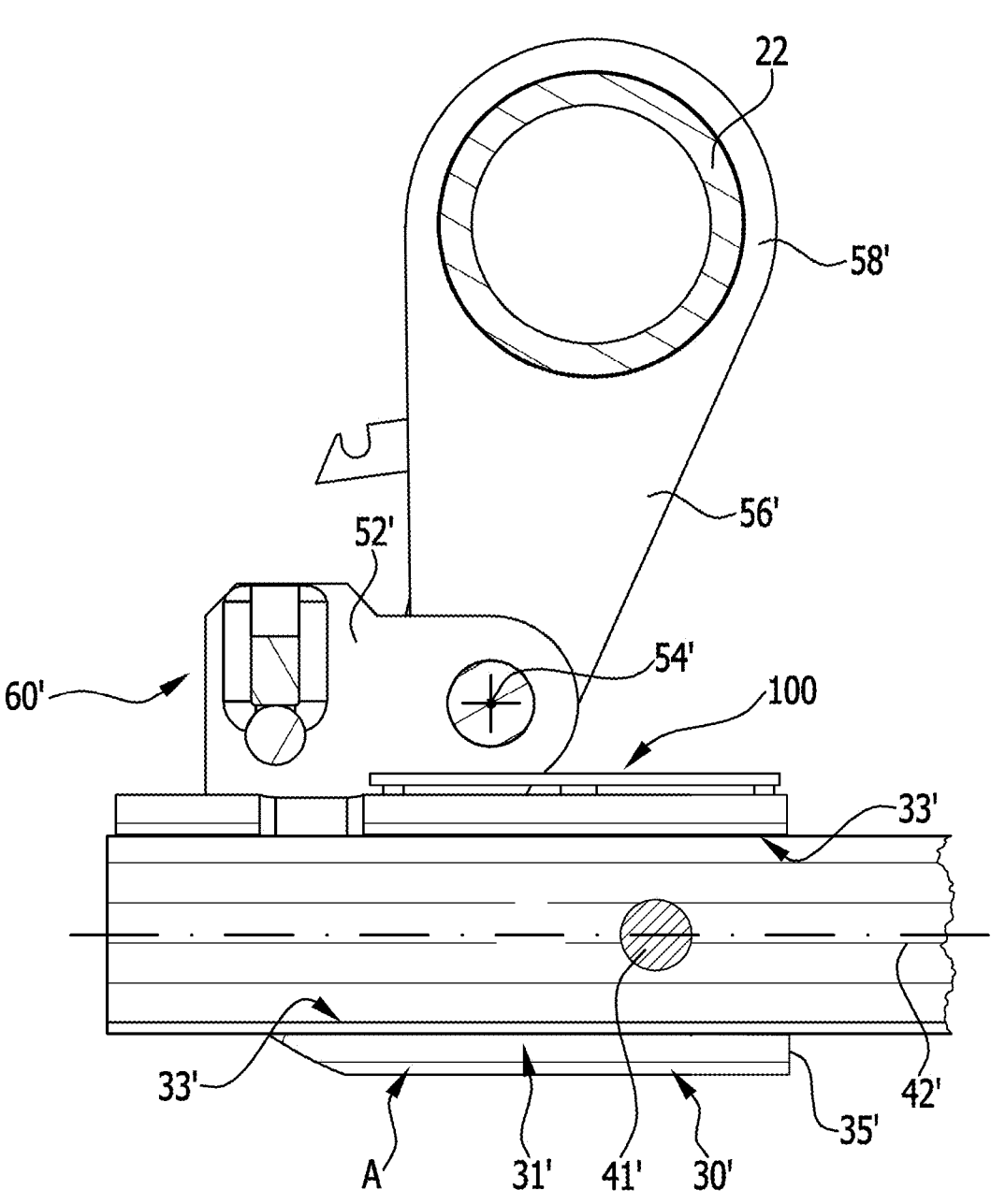
FIG. 32 shows a section along line 32-32 in FIG. 30.

In particular, to lock the pivot bearing body 52' in the working position A, a stop element 59' shown in FIG. 31 is provided, which passes through a passage in the holding arm 30' and is supported on an and of the insertion portion 45 of the carrier arm 42' inserted into the insertion receptacle 33', said end being arranged remotely from the insertion opening 35', and thus blocks a pivoting motion of the holding arm 30' with the receiving body 31' about the pivot axis 54' with simultaneous cooperation with a stop unit 60' (FIG. 32), comprising stop elements arranged on the pivot bearing body 52' and the pivot bearing receptacle 56'.

Figure 33:
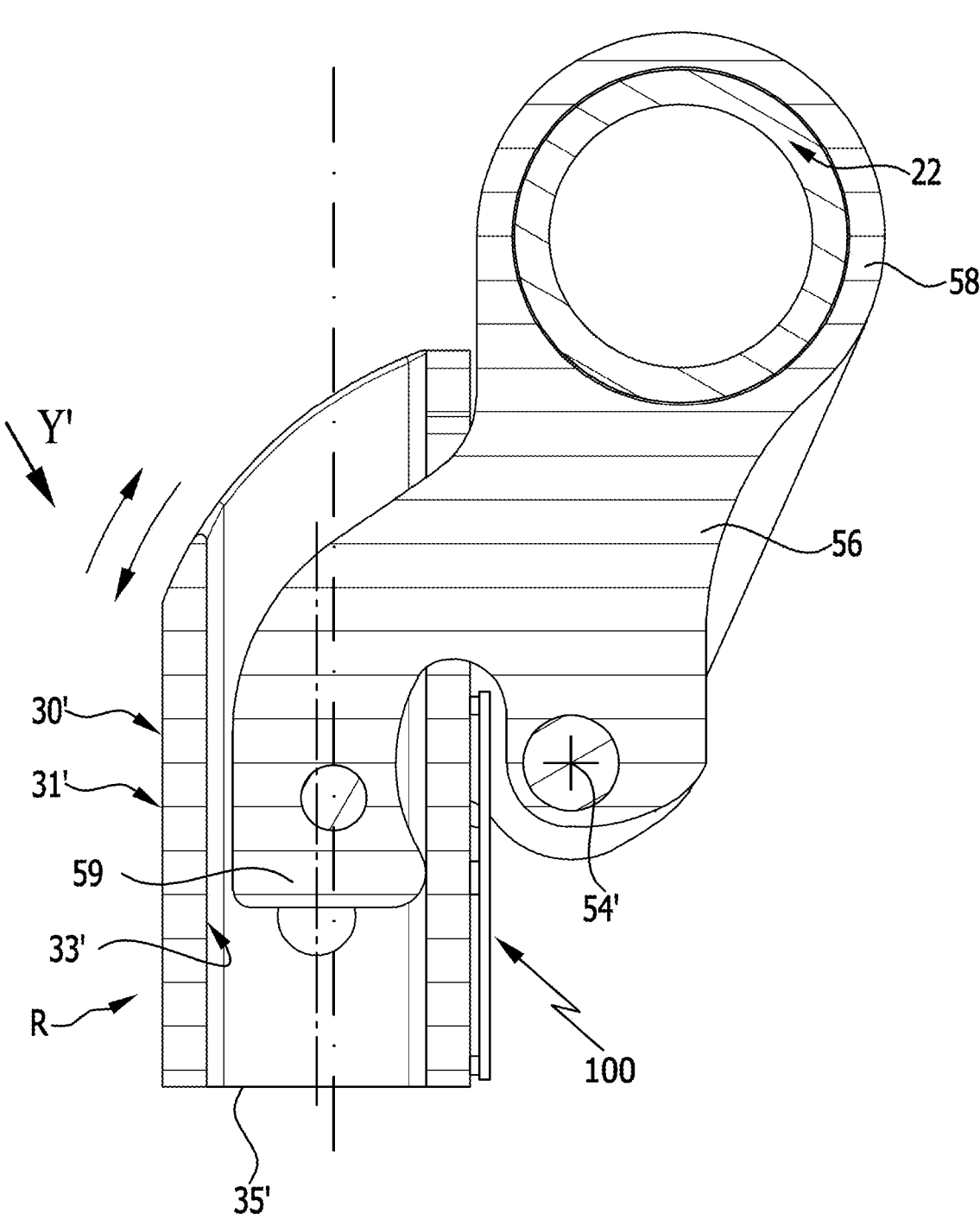
FIG. 33 shows a section similar to FIG. 31 of the exemplary embodiment in the rest position.

In addition, the pivot bearing body 52' is locked in the rest position R by a detent device 61, shown in FIG. 33.

The pivot bearing receptacle 56' is then in turn fixedly connected to the cross-bar 22 via a pivot bearing base 58'.

Figure 34:
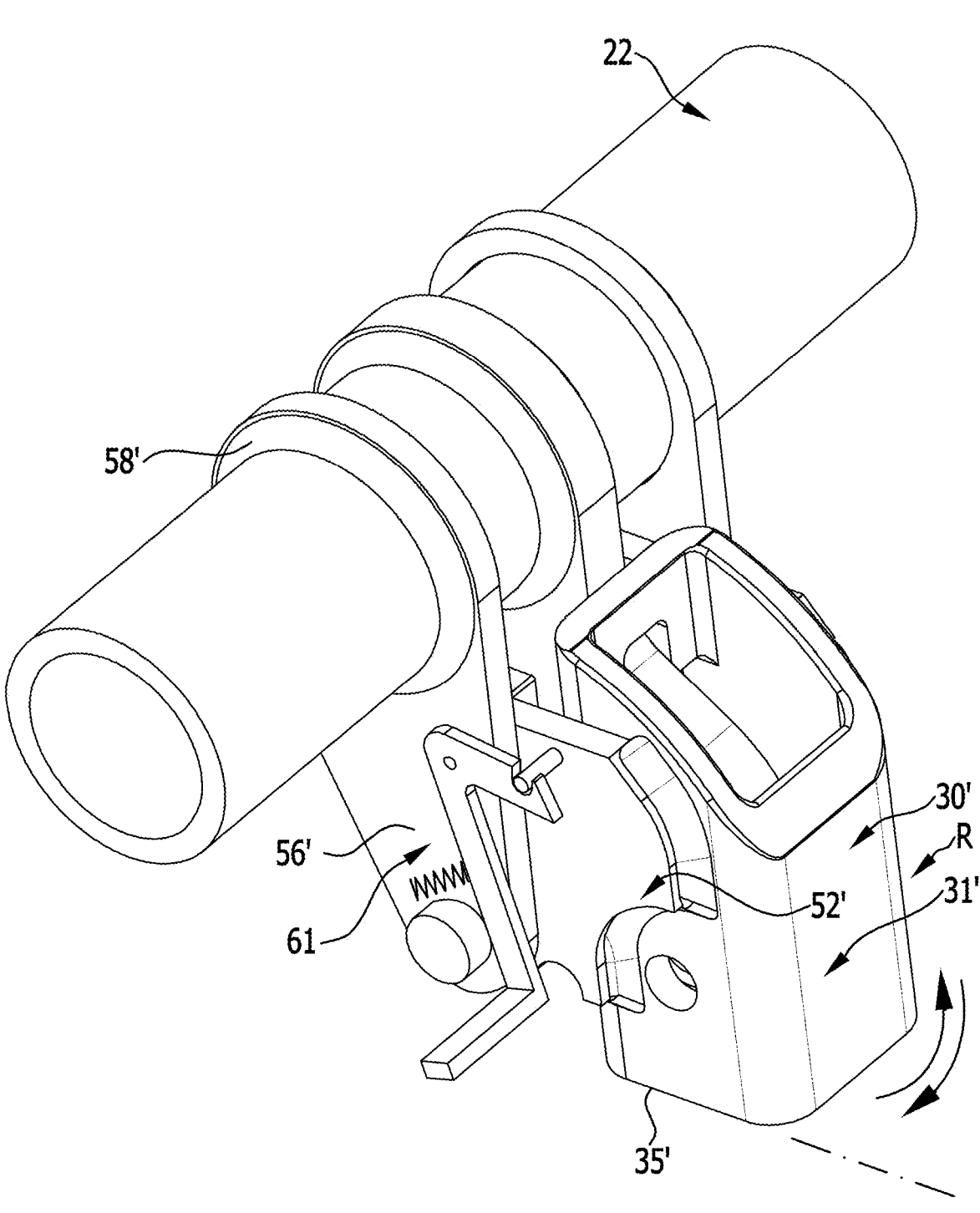
FIG. 34 shows a perspective depiction of a fifth exemplary embodiment in the rest position with a view in the direction of the arrow Y' in FIG. 33.

As shown in FIGS. 28 to 34, the holding arm 30' in this fifth exemplary embodiment is pivotable from a working position A, shown in FIGS. 28 to 32, in which the coupling element 40' having the coupling ball 43 is arranged such that it is positioned behind the bumper unit 50 on a side facing away from a roadway 44, into a rest position R, shown in FIGS. 33 and 34, in which, when the coupling element 40' is disassembled, an insertion opening 35 of the insertion receptacle 33 is arranged facing the roadway 44.

In particular, the holding arm 30' in the working position A extends here substantially in the vertical vehicle longitudinal median plane 18, wherein this intersects the coupling element 40' centrally in the case of a formation thereof as a coupling ball 43 provided with the carrier arm 42, such that a vertical ball centre axis 48 in the working position A lies in the longitudinal median plane 18.

Starting from the first end region 32', the receiving body 31' of the holding arm 30' in the shown exemplary embodiment extends with a starting piece 62' as far as an intermediate piece 64', which extends as far as an intermediate body 66, which is adjoined on a side opposite the intermediate piece 64 and the starting piece 62 by an end piece 68, beyond which the coupling element 40' extends with the carrier arm 42 arranged between the coupling ball 43 and the end piece 68.

The end piece 68 here forms the end region 34' of the holding arm 30', wherein the holding arm 30' with the insertion receptacle 33' receives the forces transferred thereto from the insertion portion 45 of the carrier arm 42'.

A holding arm 30' formed in such a way and receiving the forces transferred from the insertion portion 45 is, as shown in FIGS. 35 to 40, formed approximately in a straight line by the starting piece 62', the intermediate piece 64' of the intermediate body 66 and the end piece 68, and in the working position A, in which loads on the coupling element 40' occur and are to be detected, is oriented such that the forces acting on the coupling element 40', in particular the ball centre point 46, are transferred via the holding arm 30' to the pivot bearing body 52' of the pivot bearing unit 36', wherein the pivot axis 54' represents a centre point of the force uptake by the pivot bearing unit 36'.

The forces acting on the coupling element 40, as shown in FIGS. 28 to 32, are transferred by the holding arm 30' to the bearing unit 36' and from there to the carrier unit 20, which then introduces these forces into the rear-end region 14 of the motor vehicle body 12, wherein different regions of the holding arm 30' are used to detect the forces acting on the coupling element 40.

In the exemplary embodiment described above, a first deformation region 82 of the holding arm 30 is used by way of example, which is formed for example by a transition region from the intermediate piece 64 into the intermediate body 66', and a second deformation region of the holding arm 30' is used, which is formed by a transition region of the intermediate body 66' into the end piece 68'.

Furthermore, in this exemplary embodiment, it is assumed that the intermediate body 66' has a high stability in respect of bending forces running in the longitudinal median plane 18 and also transversely thereto, and in particular responds primarily to tensile loads.

The first and second deformation region 82, 84 are formed, for example, by a region that is formed purposefully, for example by material weakening, wherein in the simplest case the material weakening can be created by introducing a cross-sectional variation.

Figure 35:
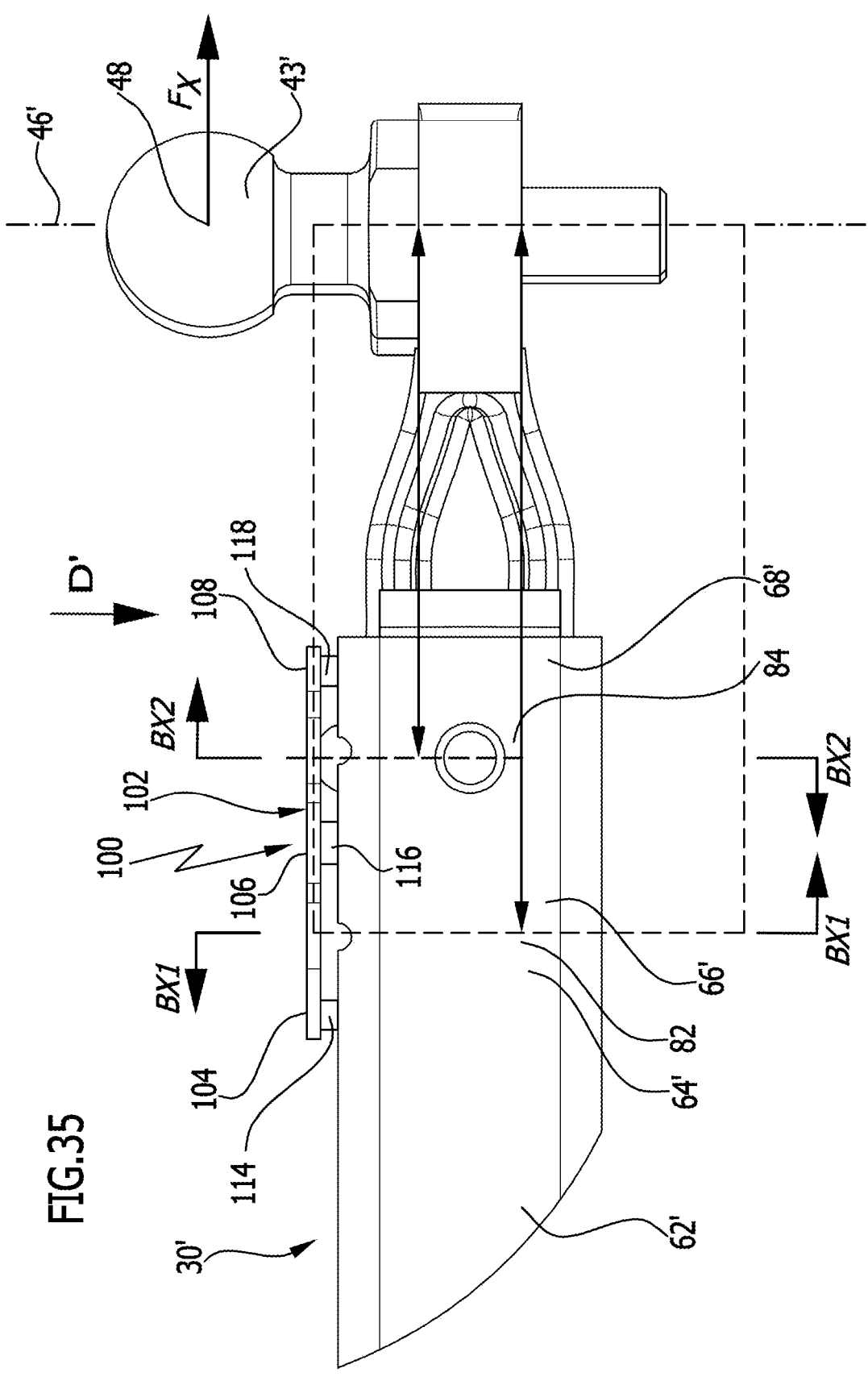
FIG. 35 shows a side view of the holding arm of the fifth exemplary embodiment with depiction of the loading of the coupling element with a force $F_x$.
Figure 36:
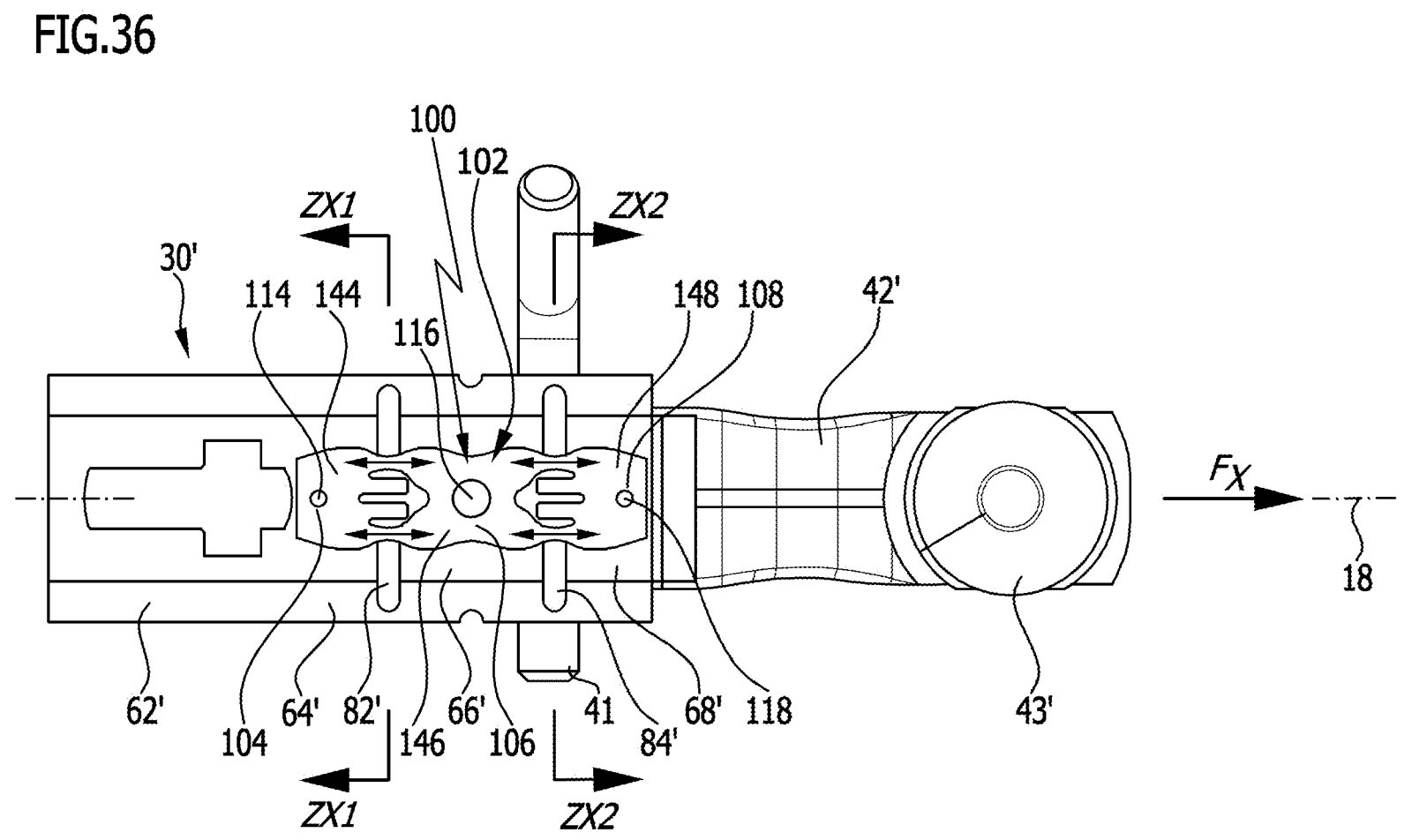

For example, the force $F_x$ shown in FIGS. 35 and 36, which is directed in the longitudinal median plane 18 and perpendicularly to the centre axis 46 and also away from the pivot bearing body 52, causes on the one hand tensile forces ZX1 and ZX2 (FIG. 36) to occur in the deformation regions 82 and 84 and on the other hand, at least in the case of the coupling ball 43' protruding from the carrier arm 42' in the operating position on a side facing away from the roadway 44, also bending forces BX1 and BX2 (FIG. 35), which are superimposed by these tensile loads ZX1 and ZX2, wherein these forces act in the direction of the longitudinal median plane 18, in particular in the longitudinal median plane 18, of the holding arm 30'.

Figure 37:
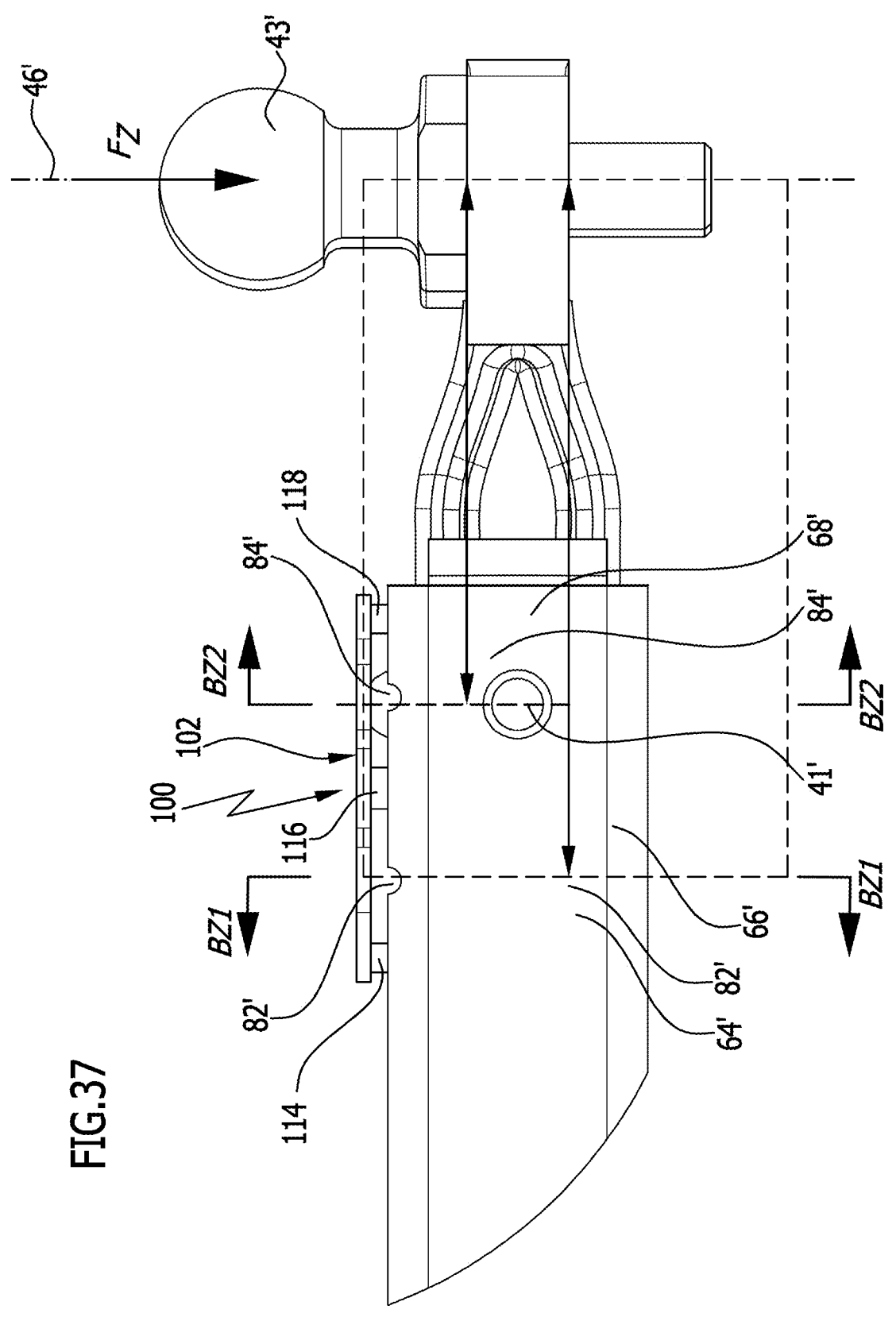
FIG. 37 shows a side view of the holding arm of the fifth exemplary embodiment under the action of a force $F_z$.
Figure 38:
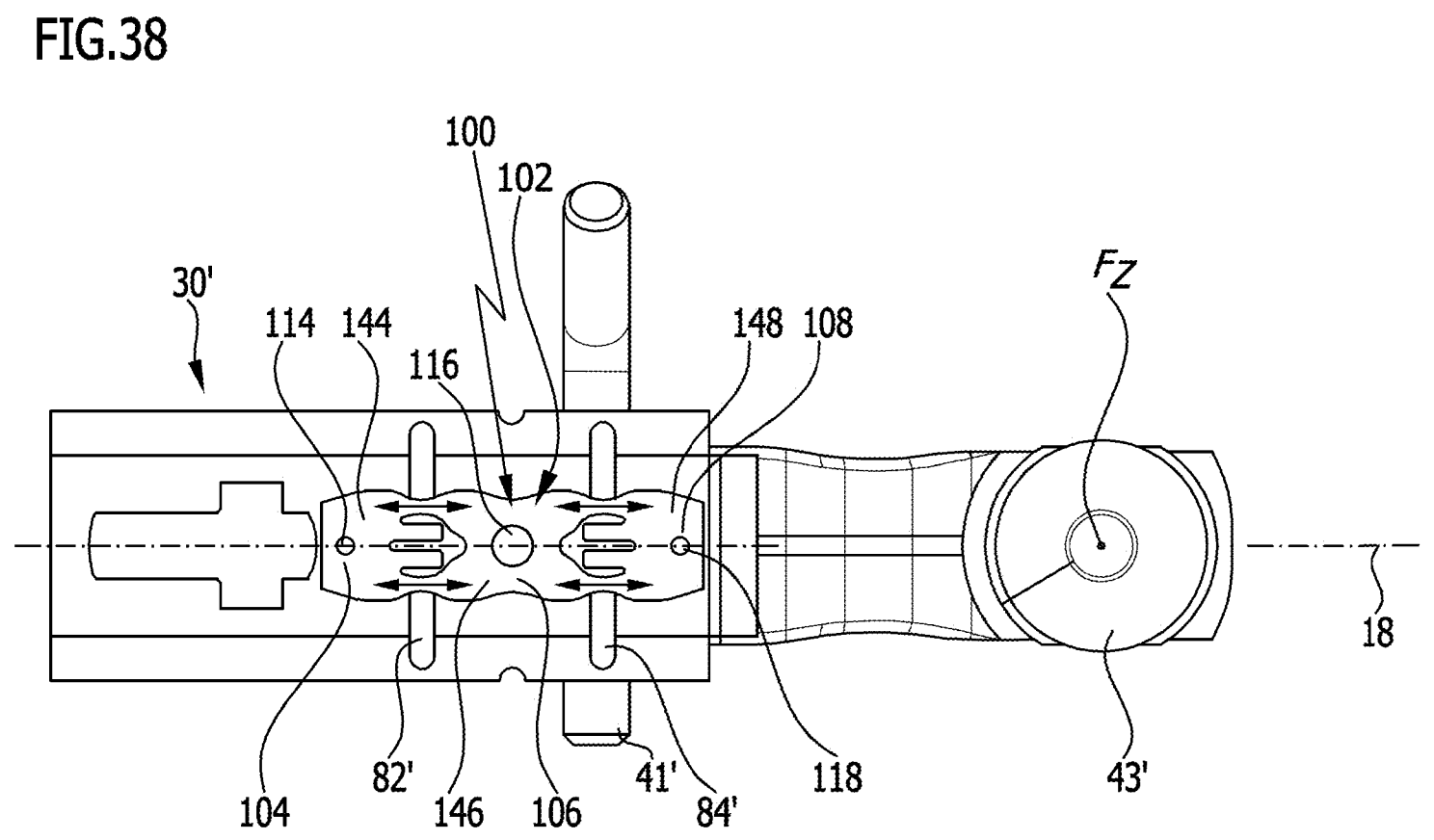

Furthermore, in the deformation regions 82 and 84, as shown in FIGS. 37 and 38, under a loading of the coupling element 40 by a force $F_z$ acting in the direction of the centre axis 46, substantially bending forces BZ1 and BZ2 occur in the deformation regions 82 and 84, wherein these forces act in the direction of the longitudinal median plane 18, in particular in the longitudinal median plane 18, of the holding arm 30, which, based on a so-called length-invariable neutral fibre NF, thus have opposite effects on opposite sides.

Figure 39:
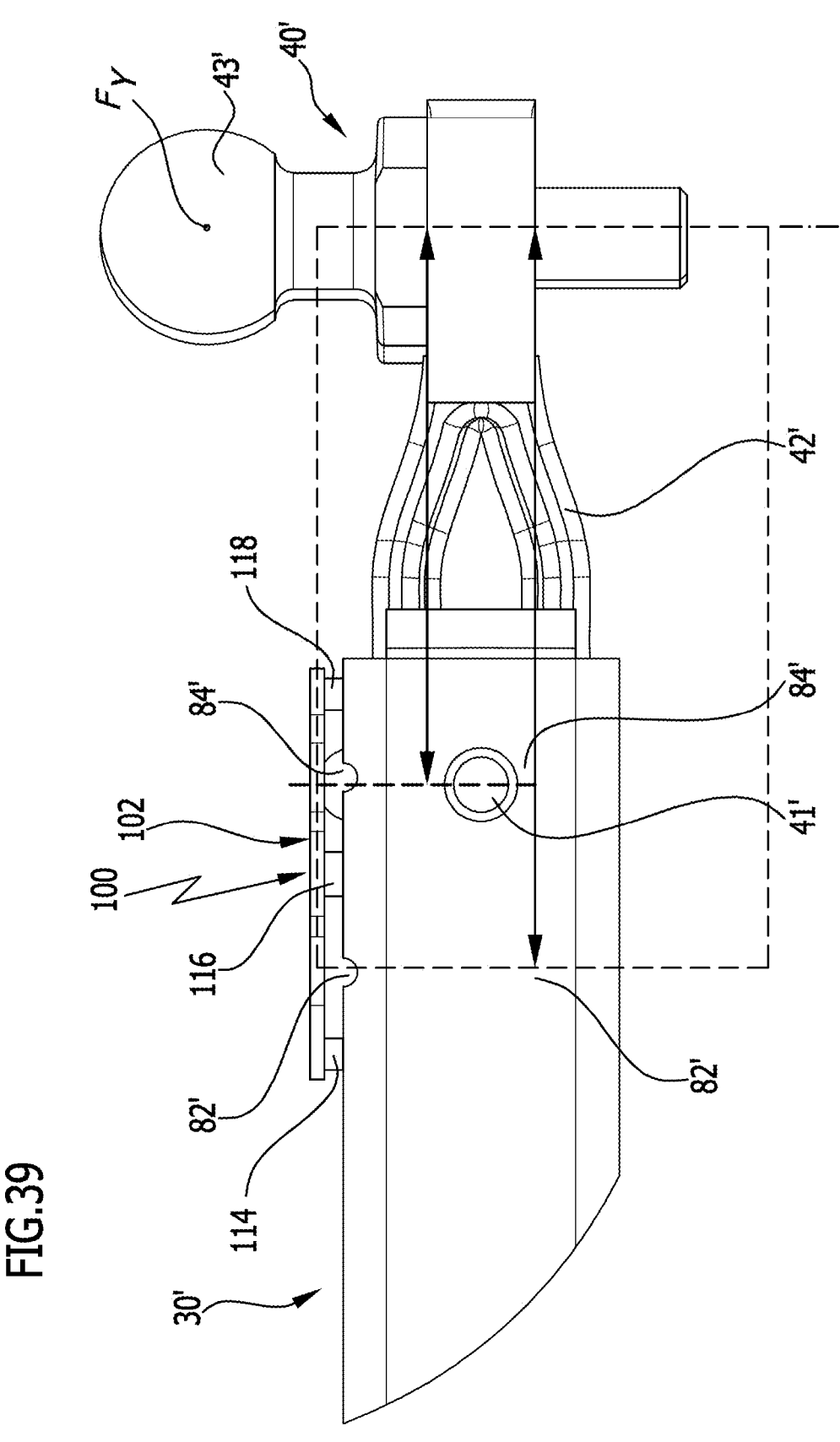
FIG. 39 shows a side view of a holding arm of the fifth exemplary embodiment under the action of a force $F_y$.
Figure 40:
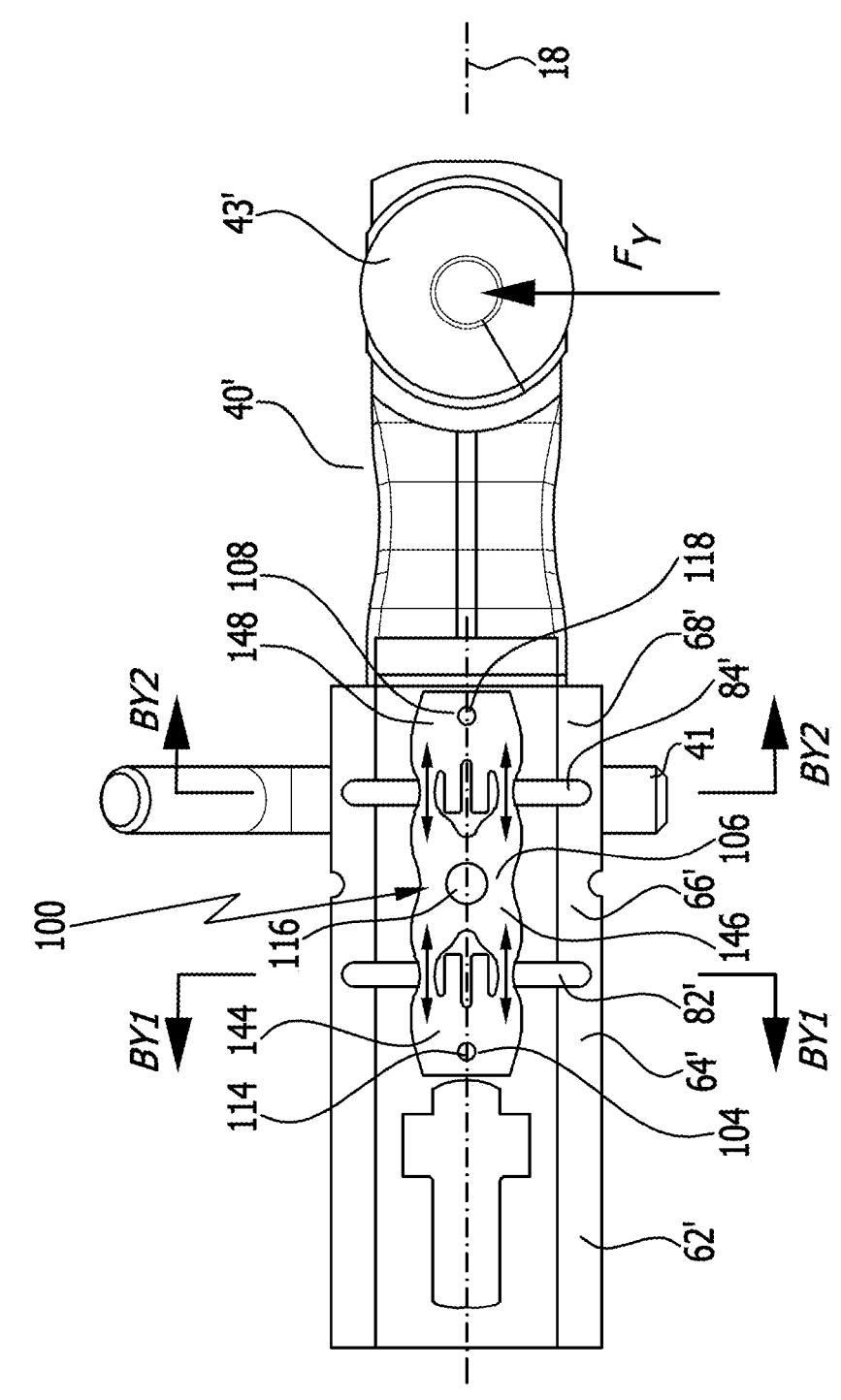
FIG. 40 shows a plan view similar to FIG. 36 under the action of the force $F_y$.

In addition, a force $F_y$ acting on the coupling element 40 and directed perpendicularly to the longitudinal median plane 18 and perpendicularly to the centre axis 46, as shown in FIGS. 39 and 40, leads to bending forces BY1 and BY2 acting on either side of the longitudinal median plane 18, but oppositely to one another on different sides of said plane.

In particular, the deformation regions 82 and 84 are formed such that they respond to the tensile forces Z and the bending forces B with deformations of different magnitude.

To detect these tensile forces ZX1 and ZX2 and also the bending forces BX1 and BX2, BZ1 and BZ2 as well as BY1 and BY2, a force detection module denoted as a whole by 100 is arranged on the holding arm 30'.

This force detection module 100 comprises a deformation transfer element 102, which is rigidly connected at three fastening regions 104, 106 and 108 to the holding arm 30', wherein the fastening region 104 is located on a side facing the first end 32 and is rigidly connected to a base 114 of the holding arm 30', sitting for example on the intermediate piece 64, the fastening region 106 is arranged approximately centrally between the fastening regions 104 and 108 and for example is connected to a holding formation 116 sitting on the intermediate body 66, in particular centrally, and the fastening region 108 is connected to a base 118 of the holding arm 30 arranged on the end piece 68, for example in a central region of the end piece 68 between the intermediate body 66 and the end 34.

The connection between the various connection elements 114, 116 and 118 of the holding arm 30' is in this case rigid and free from play, preferably as the result of a welding or an adhesive bonding, which does not allow any movement elasticity between the deformation transfer element 102 and the connection elements 114, 116 and 118.

The connection elements 114, 116 and 118 are preferably likewise rigidly connected to the holding arm 30', in particular moulded thereon.

The force detection module 100, the deformation transfer element 102, the connection elements 114, 116, 118, the deformation sensors 172, 174, 176, 178, the reference deformation sensors 182, 184, 186, 188, the Wheatstone bridges 212, 214, 216, 218, the evaluation circuit 230 and the circuit board 240 with the enveloping material 242 and the temperature sensors 252, 254, 256, 258 are formed in the fifth exemplary embodiment in the same way as described in the first to fourth exemplary embodiment and also operate in the same way.

Figure 41:
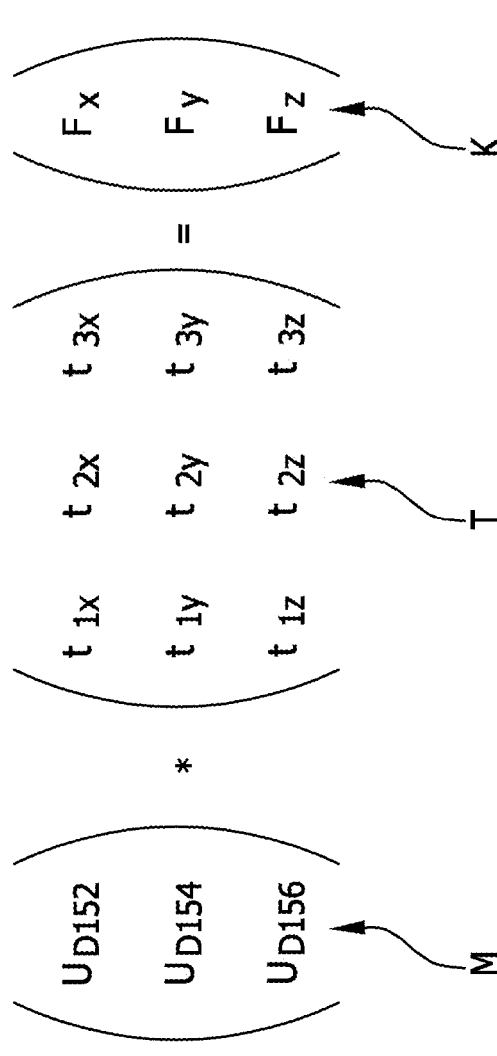
FIG. 41 shows a depiction of a first possibility of a mathematical linking of the values of the force components to the sensor values.

In all of the above-described exemplary embodiments, a gauging or calibration is performed to determine a relationship between a measurement value vector M for the sensor values which represents the measured voltages UD152, UD154, UD156 and UD158 and a vector K which represents the values $WF_x$, $WF_y$ and $WF_z$ for the force components generated by the evaluation circuit 230 or 230', said relationship being defined by a transformation matrix T, as shown in FIG. 41.

Since the force vector K comprises the three force components with the values $WF_x$, $WF_y$ and $WF_z$, for example only three sensor values from the sensor values UD152, UD154, DU156 and UD158, for example the sensor values UD152, UD154 and UD156, are used to form the measurement value vector M.

A measurement value vector M of this kind must then be multiplied by the transformation matrix T in order to obtain the individual values $WF_x$, $WF_z$ and $WF_y$ of the force components of the force vector K, as shown in FIG. 41.

The transformation matrix T in this case comprises nine transformation coefficients $t_{1x}$, $t_{2x}$, $t_{3x}$, $t_{1y}$, $t_{2y}$, $t_{3y}$, $t_{1z}$, $t_{2z}$, $t_{3z}$.

Figure 42:
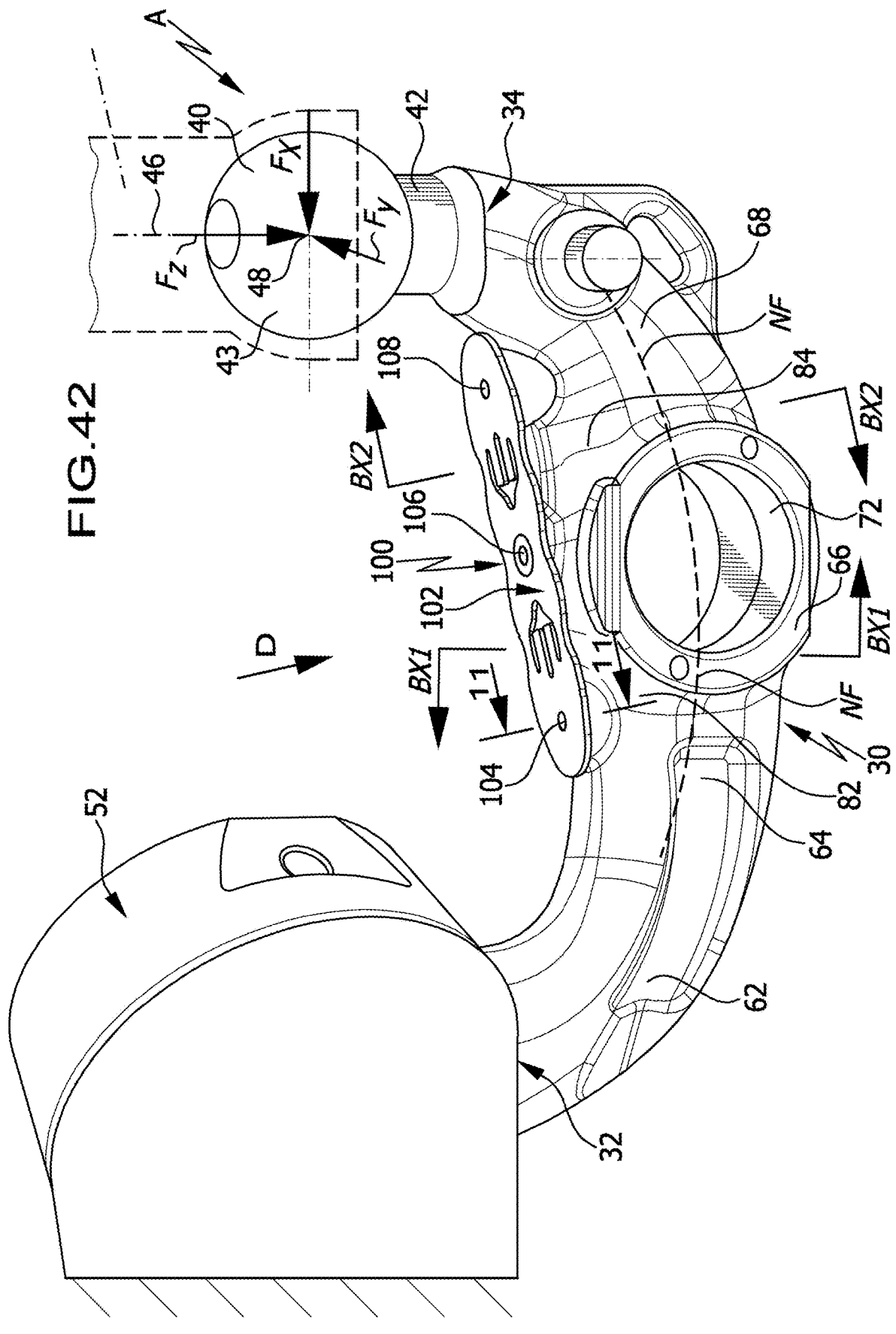
FIG. 42 shows a schematic depiction of the approach when calibrating a holding arm.

To determine these transformation coefficients $t_{1x}$ to $t_{3z}$, as shown in FIG. 42, on a test bench with the holding arm 30 fixed for example in a stationary manner to the pivot bearing body 52, the coupling element 40 is acted on by means of a force-loaded arm KA with various forces in various spatial directions.

For example, the arm KA applies a force $F_x$ in the X direction, and/or applies a force $F_z$ in the Z direction and/or applies a force $F_y$ in the Y direction or applies one or more combinations of these forces.

As already mentioned, in the simplest case, a transformation matrix T valid for all spatial directions x, y, z is stored in the memory 236 and can be used to convert the values of the voltages UD152, UD154, UD156 and UD158 into values $WF_x$ and $WF_z$ and $WF_y$ for the force components acting on the coupling element 40.

In a calibration of this kind (FIG. 42), three calibration operations are performed in succession, and for example in the first calibration operation only the force component $F_x$, and in the third calibration operation only the force component $F_y$ or only the force component $F_z$ is applied to the coupling element 40, and then the sensor values UD152, UD154 and UD156 are measured for each calibration operation.

Since, in each of the three described calibration operations, the other force components $F_y$ and $F_z$ or $F_x$ and $F_z$ or $F_x$ and $F_y$ are zero, after all three calibration operations an equation system is provided that comprises nine equations for determining the total of nine unknown transformation coefficients $t_{1x}$ to $t_{3z}$.

However, it is also possible to work with all four sensor values UD152, UD154, UD156 and UD158, as shown in FIG. 43; in this case all four calibration processes must be performed to determine the total of twelve transformation coefficients $t_{1x}$ to $t_{4z}$, in order to obtain a total of twelve equations for the twelve unknown transformation coefficients $t_{1x}$ to $t_{4z}$.

During the gauging or calibration, the force $F_z$ acts preferably in the direction of the force of gravity with an orientation of the holding arm 30 as is provided when the motor vehicle 10 is standing on a substantially horizontal plane.

Likewise with an orientation of the holding arm 30 as is provided when the motor vehicle 10 is standing on a substantially horizontal surface, the force $F_x$ acts in a substantially horizontal direction, more specifically in particular in a vertical vehicle longitudinal median plane 18 and thus also in the vertical longitudinal median plane 18 of the holding arm 30.

Further, the force $F_y$ acts transversely, in particular perpendicularly, to the vertical longitudinal median plane 18 and perpendicularly to the force $F_x$ and to the force $F_z$.

The physical relationship assumed here between the exerted forces $F_x$, $F_y$, $F_z$ and the occurring deformations represents the simplest possible assumption.

Figure 44:
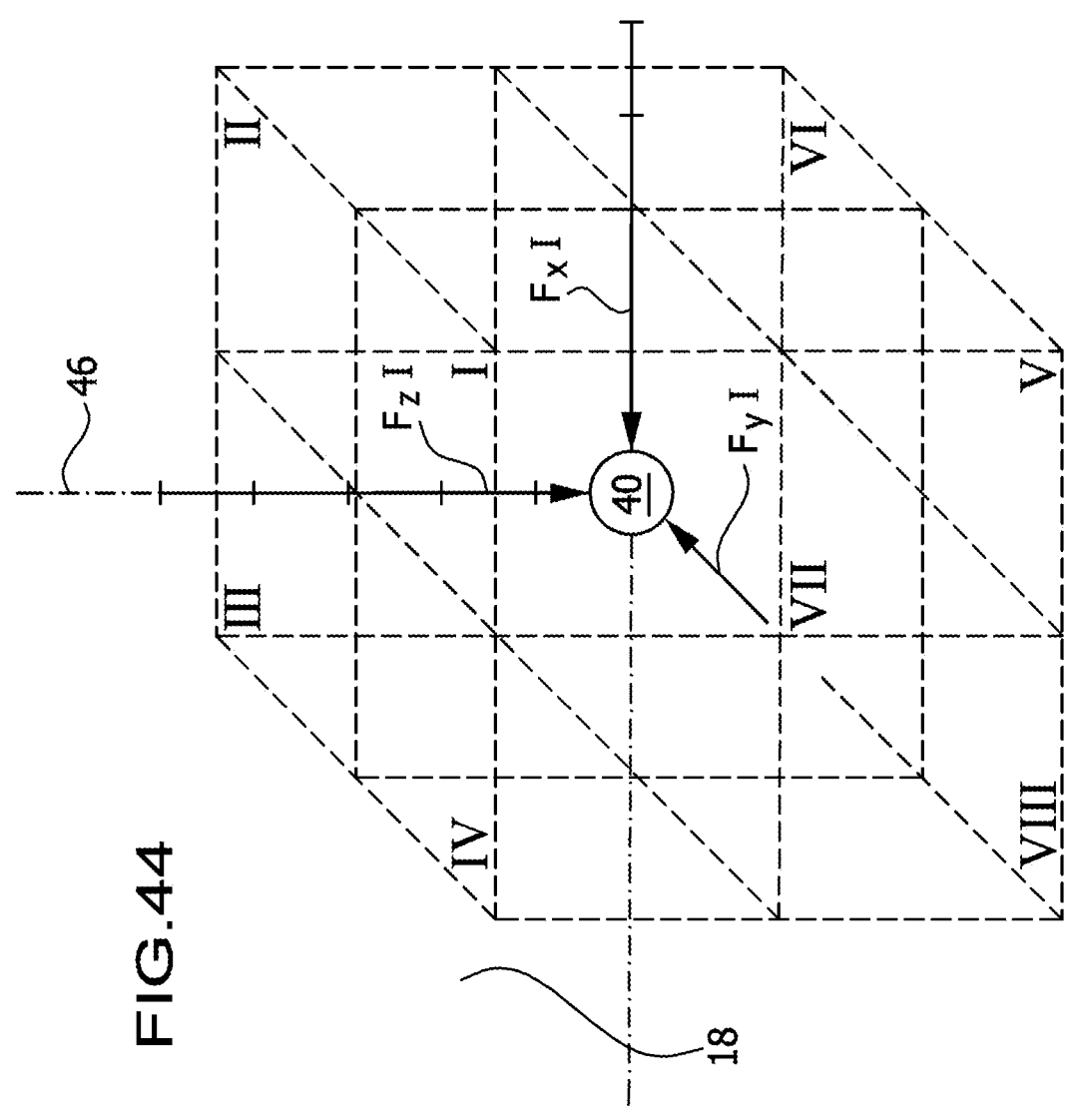
FIG. 44 shows a depiction of a calibration on the basis of force components in octants with the coupling element as centre point.

It is possible to improve the quality of results for the values $WF_x$, $WF_z$ and $WF_y$ if the calibration is performed for value pairings $WF_x$, $WF_z$ and $WF_y$ located in each of the octants I to VIII according to FIGS. 21 and 44 arranged around the coupling element 40, and therefore it is also possible to incorporate non-linear spatial correlations between the forces $F_x$, $F_z$, $F_y$ acting on the coupling element 40 and the digital values of the voltages UD152, UD154, UD156 and UD158 into the calibration and thus a transformation of these values of the voltages UD152, UD154, UD156 and UD158 into the values $WF_x$, $WF_z$ and $WF_y$ for the forces acting on the coupling element 40.

The accuracy of the determined values $WF_x$, $WF_z$ and $WF_y$ is thus significantly improved.

For calibration in respect of the octants I to VIII, shown in FIG. 44, the forces $F_x$, $F_y$ and $F_z$ are each selected for the gauging or calibration for determination of an octant-specific transformation matrix T, such that said forces lie within the particular octant, and in particular all act in the direction of the same point on the coupling element 40.

For example, to determine the transformation matrix TI for the octant I, only forces with force components $F_xI$, $F_zI$ and $F_yI$ lying within said octant are used.

Values $WF_x$, $WF_z$ and $WF_y$ of the force components determined for the space within the particular octant I to VIII can thus be determined even more precisely.

Since, when determining an unknown force on the coupling element 40, the orientation of said force and thus also its assignment to one of the octants is unknown, the components $WF_x$, $WF_y$ and $WF_z$ of said force are determined for example either with the transformation matrix T determined for all spatial directions or with one of the transformation matrices TI to TVIII, and it is then checked by the evaluation circuit 230 or 230', on the basis of the values $WF_x$, $WF_y$ and $WF_z$, to which of the octants, for example the octant III, the force should be assigned, and the values $WF_x$, $WF_y$, $WF_z$ are then determined once more by means of the transformation matrix determined for this octant, for example the transformation matrix TIII.

Figure 45:
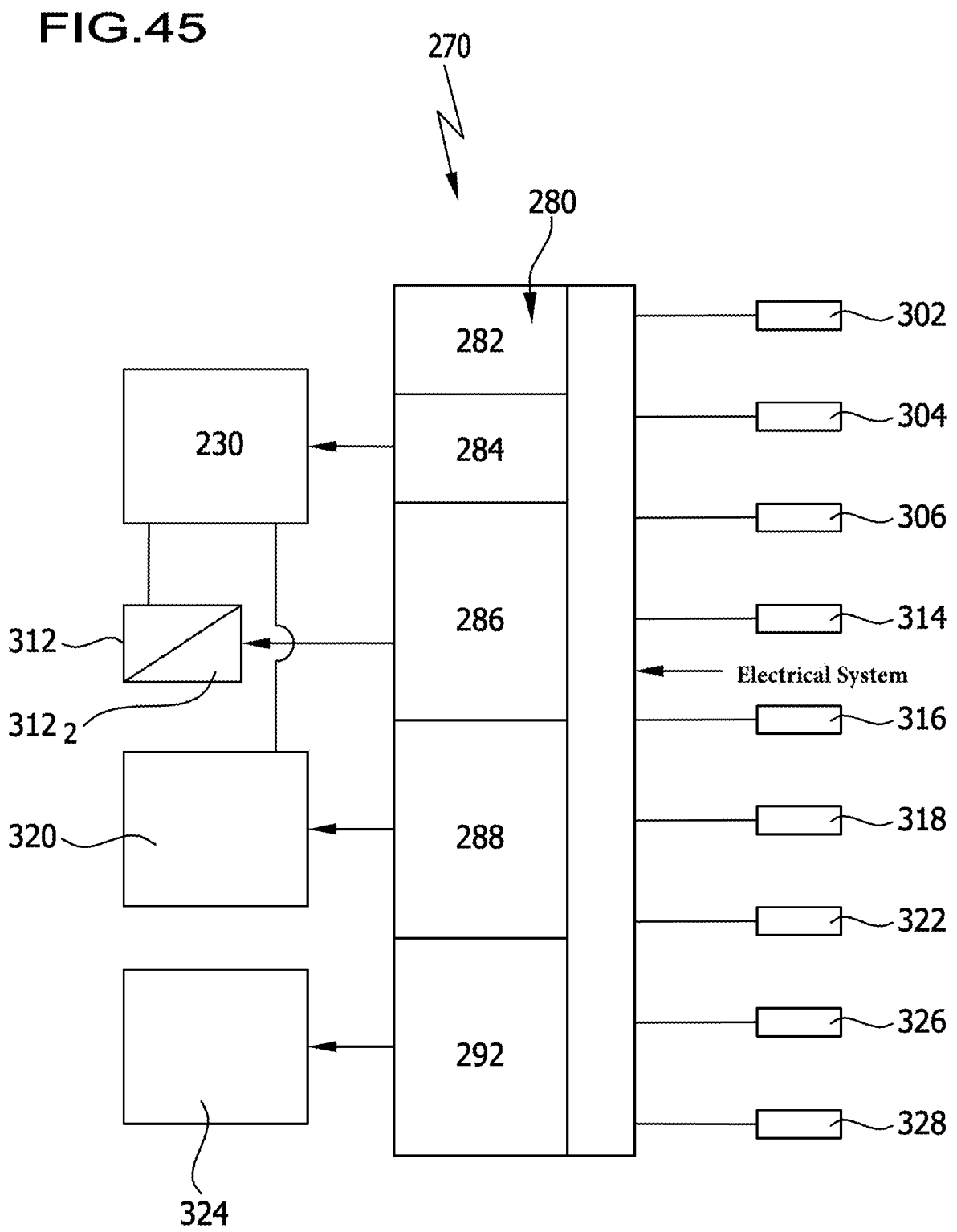
FIG. 45 shows a schematic depiction of an evaluation unit and its cooperation with further components.

In order to determine load-induced forces on the coupling element 40 on the basis of the sensor values UD152, UD154, UD156 and UD158, as shown in FIG. 45, an evaluation unit 270 is provided, which additionally to the evaluation circuit 230 also has a sequence control system 280.

The sequence control system 280 firstly checks, in a state detection stage 282, whether a voltage supply of the evaluation circuit 230 is sufficient.

The state detection stage 282 checks here, for example with a voltage sensor 302, the battery voltage of the vehicle, in particular the voltage applied at the deformation sensors 182, 184, 186, 188 and optionally at the temperature sensors 252, 254, 256, 258 and at the evaluation circuit 230.

In particular, the state detection stage 282 also checks whether the motor vehicle 10 is in a state feasible for detecting the forces on the holding arm, that is to say whether the vehicle is oriented substantially in a horizontal plane, wherein a substantially horizontal plane is then provided if the deviation from an exactly horizontal plane is at most ± 20° in each plane direction.

To this end, the state detection stage 282 checks the orientation of the device according to the invention of the vehicle relative to the horizontal using one or more inclination sensors 304 (FIGS. 3 and 45), wherein the inclination sensor 304 can be provided for example in the sequence control system 280 or in the motor vehicle 10 or can be provided on the carrier unit 20 and is queried by the state detection stage 282.

Furthermore, in the state detection stage 282, the position of the holding arm 30 is checked in order to ascertain whether this is in the working position or is outside said position.

To this end, the state detection stage 282 checks, with a sensor set 306 (FIGS. 3 and 45), the working position and/or further positions of the holding arm 30, wherein at least one check of the working position is performed and then, if this position is not present, this check is assessed as being negative.

If, in the state detection stage 282 on the one hand it is determined that there is a sufficient voltage supply, and on the other hand a satisfactory orientation of the motor vehicle 10, and in addition the working position of the holding arm 30 exists, in an activation stage 284 which is then used the evaluation circuit 230 is activated, such that it determined the values $WF_x$, $WF_z$ and $WF_y$ in the current state of the motor vehicle 10 on the basis of the sensor values.

After a state admissible for detection of the forces on the holding arm 30, in particular on the coupling element 40 thereof, has been recognised by the state detection stage 282 and the activation stage 284 has activated the evaluation circuit 230, a zero-load detection stage 286 is used.

In the zero-load detection stage 286, it is first checked whether the external force acting at zero load, that is to say no load, on the holding arm 30, in particular the load with no external force acting on the coupling element 40 of the holding arm 30, can actually be detected.

The zero-load detection stage 286 activates, for example, a zero-load value memory 312₁, which accepts the values of the evaluation circuit 230 output at the time of the activation at the outputs $WF_x$, $WF_z$, $WF_y$ and stores them as values $WF_{x0}$, $WF_{z0}$ and $WF_{y0}$, which are determined without the action of any external force, that is to say at zero load.

These values stored in the zero-load value memory 312₁ are then compared with stored reference values, provided in a zero-load reference memory 312₂, for a state of the holding arm 30, in particular of the coupling element 40, at zero load in order to carry out a plausibility check to ascertain whether a loading of the holding arm 30, in particular of the coupling element 40, by an external force can be ruled out.

These values stored in the zero-load reference memory 312₂ are detected for example by a determination of the values $WF_{x0}$, $WF_{z0}$, $WF_{y0}$ at zero load performed beforehand or at the factory.

In addition, the zero-load detection stage 286 checks how great the period of time is that has elapsed between the last movement of the holding arm 30 into the working position and the current moment in time.

If it is determined, for example, that the movement of the holding arm 30 and of the coupling element 40 into the working position was performed only a few seconds ago, it can be assumed that there is still no external force acting on the coupling element 40, and therefore the zero load can be determined.

A further possibility is that the zero-load detection stage 286 activates a camera system 314 on the motor vehicle 10 (FIGS. 1 and 44), which for example is integrated into the reversing camera system of the motor vehicle 10 and is able to detect whether or not an object, in particular a coupling head or a load carrier, is actively engaged with the coupling element 40 and thus with the holding arm 30.

A further possibility is that the zero-load detection stage 286 activates a sensor system 316 (FIGS. 2 and 44), for example comprising a set of ultrasonic sensors, which in particular are integrated in the rear-end bumper unit 50 and are likewise capable of recognising whether or not an object is engaged with the holding arm 30 and the coupling element 40.

A further possibility for checking whether no object is engaged with the coupling element 40 and thus the holding arm 30 provides that the zero-load detection stage 286 identifies whether a socket 31 associated with the device and intended to ensure the supply to a trailer or a load carrier unit is active, that is to say whether a supply plug is inserted into this socket (FIGS. 2 and 45).

If this is recognised by a sensor 318 associated with the plug 31, it is likewise assumed that an object is acting on the coupling element 40 and/or the holding arm 30, and therefore zero-load detection is not possible.

Based on this, the zero-load memory 312 is then activated in order to store the values $WF_x$, $WF_z$ and $WF_y$ delivered by the evaluation circuit 230 or 230' as values $WF_{x0}$, $WF_{z0}$ and $WF_{y0}$ at zero load, which correspond to a state of the holding arm 30 and of the coupling element 40 without the action of external force.

If, however, the zero-load detection stage 286 does not determine a state in which the detection of a zero-load state is possible, the values $WF_{x0}$, $WF_{z0}$ and $WF_{y0}$ stored for example in the zero-load memory 312₂ for the last zero-load detection are not replaced by the values just stored in the zero-load value memory 3121, and instead are re-used, and the values stored in the zero-load memory 312₁ are deleted.

Once the zero-load detection stage 286 has been run through, a load detection stage 288 is activated.

The load detection stage 288 serves only to detect the force components acting on the coupling element 40 and the holding arm 30 as the result of loading.

The load-detection state is preferably only active if an on-board function of the motor vehicle 10 is activated, that is to say for example the operation of all electrical components is activated. This is performed for example by querying a suitable vehicle electrical system voltage.

Furthermore, the load-detection stage 288 checks, with access to the sensor 318, whether a socket 31 associated with the device according to the invention is activated, the activation of said socket indicating the presence of an external force acting on the coupling element 40, whether by a trailer or a load carrier unit (FIG. 45).

Furthermore, the load-detection stage 288 checks, by means of a sensor 322 or by interrogating a vehicle control system, whether or not the vehicle is moving at a speed less than 5 km/h, so that a motor vehicle 10 available in principle for the load detection can be assumed (FIG. 45).

In addition, the load-detection stage 288 checks, for example likewise with the camera system 314, whether an external object, for example a trailer or a load carrier unit, is engaged with the coupling element 40 and/or the load-detection stage 288 checks by means of the camera system 314 and/or the sensor system 316 whether an external object, for example a trailer or a load carrier unit, is engaged with the holding arm 30 and the coupling element 40.

It is optionally also additionally checked by the load-detection stage 288, by means of the sensor 306, whether the holding arm 30 with the coupling element 40 is in the working position, in which a trailer may actually be hitched up or a load carrier unit may be mounted.

If it is recognised by the load-detection stage 288 that an external object is acting on the coupling element 40 and the holding arm 30, the load-detection stage 288 prompts on the one hand the values $WF_x$, $WF_z$ and $WF_y$ to be accepted by the evaluation circuit 230 or 230' and on the other hand the values $WF_{x0}$, $WF_{z0}$ and $WF_{y0}$ to be assumed by the zero-load memory 312₂, and these values $WF_{x0}$, $WF_{z0}$ and $WF_{y0}$ to be subtracted in a subtraction unit 320 from the values $WF_x$, $WF_z$ and $WF_y$ (FIG. 45), so that values $WF_{x1}$, $WF_{z1}$ and $WF_{y1}$ are then present, which represent the load-induced values for the external force components $F_x$, $F_z$, $F_y$ acting on the holding element 30 and the coupling element 40.

For example, a presentation unit 304, for example a display, is controlled from a subsequent presentation stage 292 of the sequence control system 280 and presents the individual load-induced values $WF_{x1}$, $WF_{z1}$ and $WF_{y1}$ of the force components in a manner that is as easily understandable as possible by a user.

Figure 46:
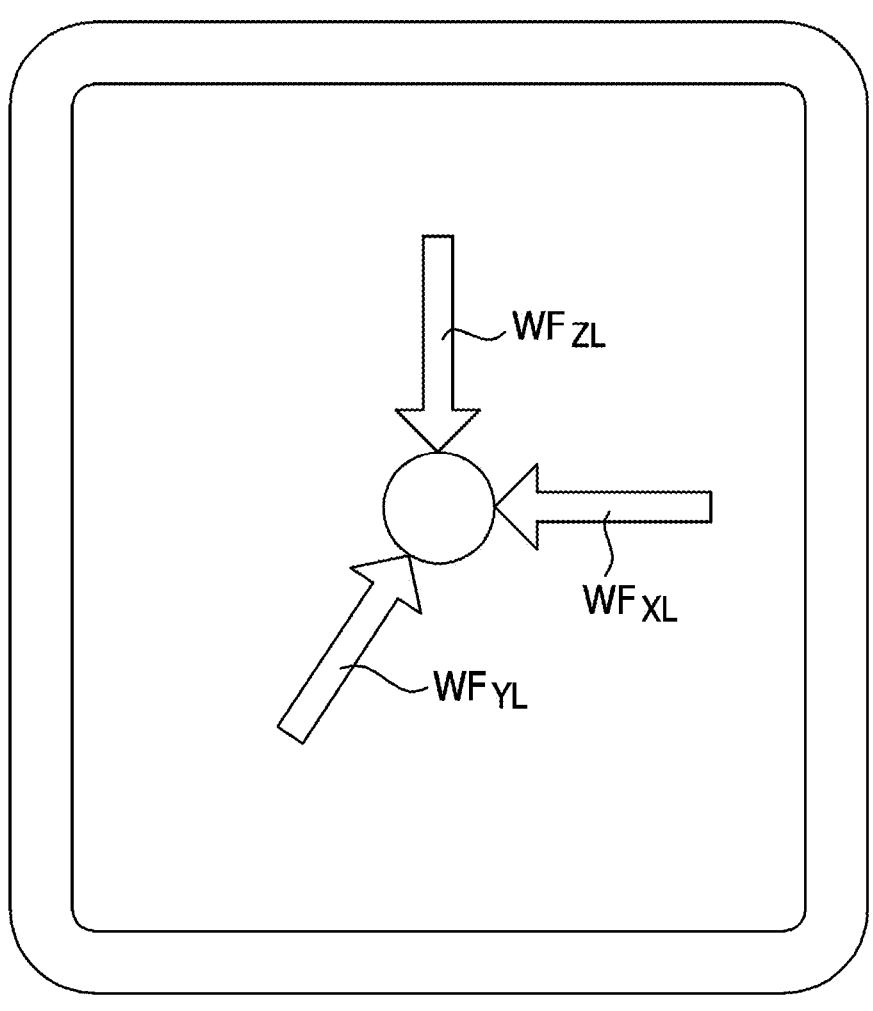
FIG. 46 shows an exemplary depiction of a presentation of the load-induced values of the force components in bar form.

The presentation stage 292 here can present the load-induced values $WF_{x1}$, $WF_{z1}$, $WF_{y1}$ on the presentation unit 324 for example numerically or graphically as a bar chart (FIG. 46), wherein a length of the bar represents the value.

Figure 47:
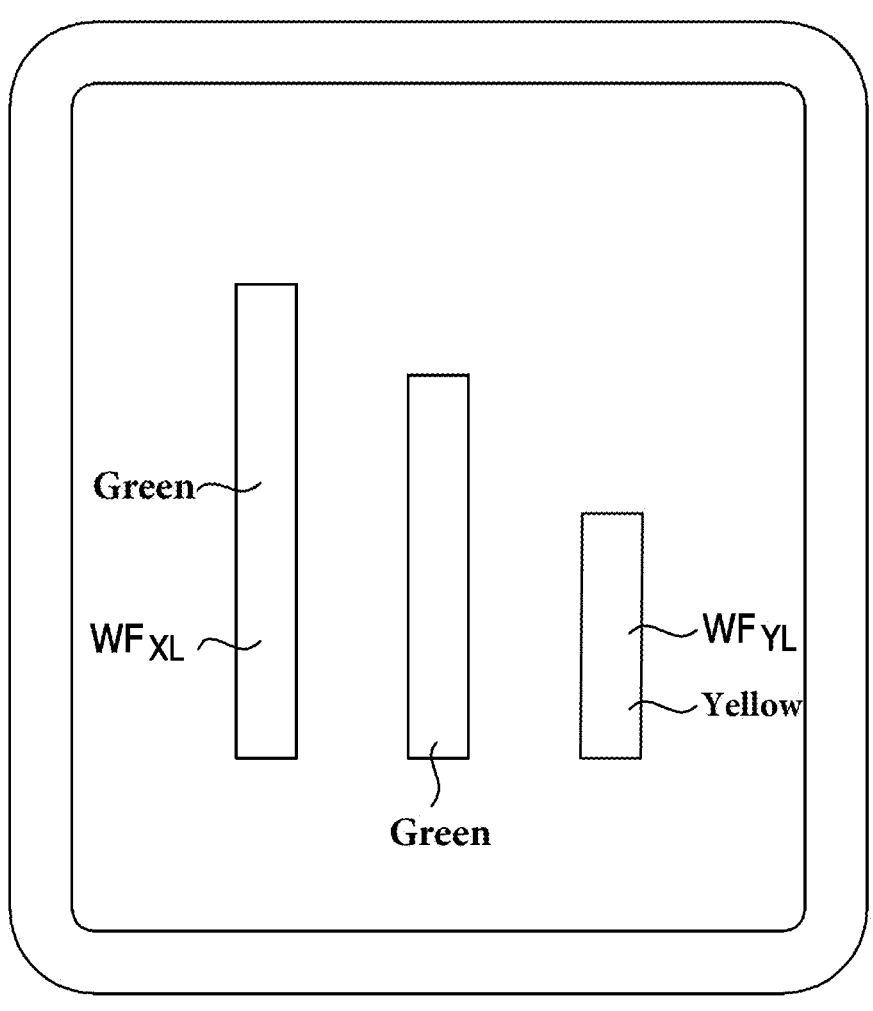
FIG. 47 shows a depiction of a presentation of the load-induced values of the force components together with the different measurement accuracies.
Figure 48:
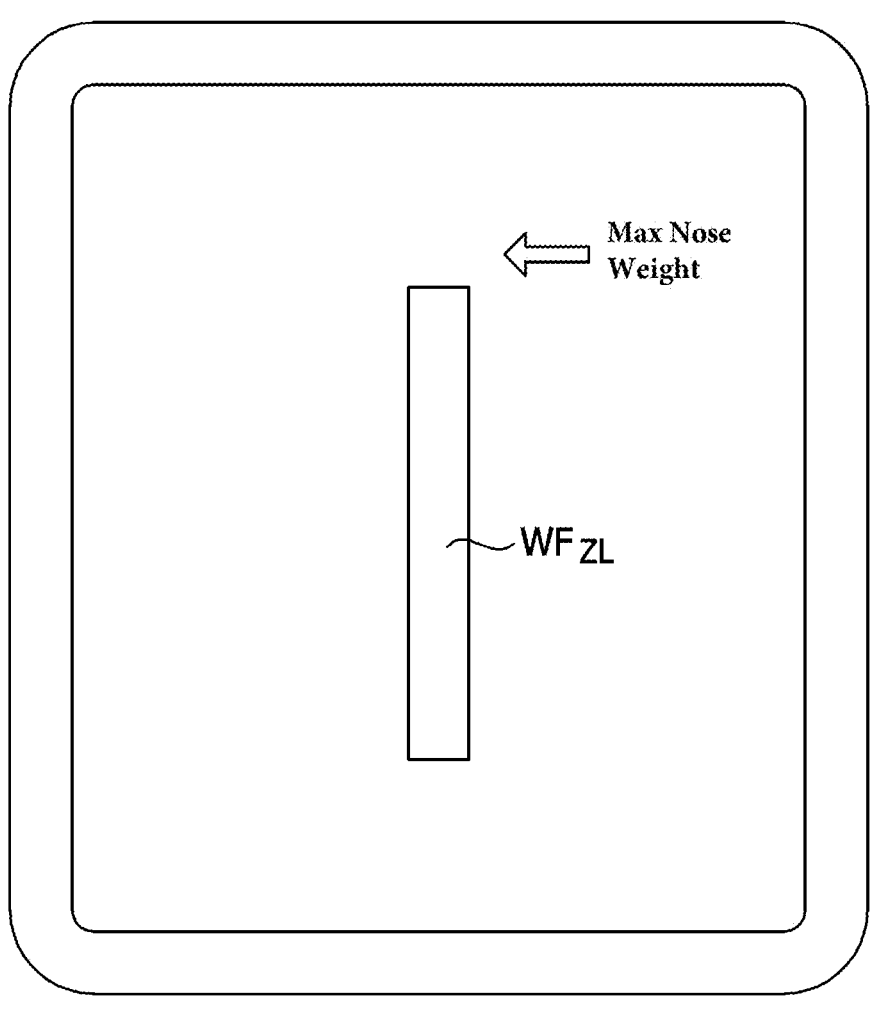
FIG. 48 shows a depiction of a presentation of the value of the vertical force component in conjunction with a predefined support load.

It is particularly advantageous if the presentation stage 292 presents the values $WF_{x1}$, $WF_{z1}$ and $WF_{y1}$ of the force components in relation to the measurement accuracy achievable for the determination of said values by means of the transformation matrix T and thus also makes the measurement uncertainty visible to a user, as shown for example in FIG. 47, wherein the individual bars are shaded in different colours for different measurement accuracies.

Another possibility lies in the fact that the presentation stage 292 shows the component $WF_{z1}$, which represents the support load, in comparison to the support load permissible for this motor vehicle 10, for example graphically as in FIG.

48, so that a vehicle user can immediately identify whether or not the maximally permissible support load of this motor vehicle 10 has been reached.

In addition, it is also possible, by means of the presentation stage 292, to transmit the load-induced values $WF_{xe}$, $WF_{ze}$ and $WF_{ye}$ of the force components to a stabilisation system 326 and/or a chassis control system 328 of the motor vehicle (10) (FIGS. 1 and 44) in order to improve the driving properties in towing operation.

The invention claimed is:

1. A device, which can be mounted on the rear end of a motor vehicle body, for coupling a trailer or a load carrier unit, comprising a holding arm, which at a first end is fixedly connected to the motor vehicle body during operation and which, at a second end, is configured to support a coupling element, wherein the holding arm is provided with a sensor arrangement comprising at least three deformation sensors arranged along a common face of a deformation transfer element which is connected to the holding arm to respond in different ways to three forces acting on the coupling element in spatial directions running transversely to one another, and the at least three deformation sensors deliver sensor values, on the basis of which at least one force component acting on the coupling element is determined by means of an evaluation unit.

2. The device in accordance with claim 1, wherein the evaluation unit determines at least one of the values of its force components running in the spatial directions.

3. The device in accordance with claim 1, wherein the evaluation unit determines the value of its force component running in the direction of the force of gravity.

4. The device in accordance with claim 1, wherein the evaluation unit determines the value of its force component running in the direction of travel of the motor vehicle.

5. The device in accordance with claim 1, wherein the evaluation unit determines the value of the force component running transversely to a vertical longitudinal median plane.

6. The device in accordance with claim 1, wherein the evaluation unit, prior to a determination of the force components, checks by means of a state detection stage whether a suitable state exists for determining the force components on the coupling element.

7. The device in accordance with claim 6, wherein the state detection stage, by detecting at least one of the parameters comprising at least one of voltage supply, vehicle orientation in space, presence of the working position of the holding arm, checks whether a suitable state exists for determining the force on the coupling element.

8. The device in accordance with claim 1, wherein the evaluation unit, by means of a zero-load detection stage, prior to determination of the force components on the coupling element, detects the values of the force components in the case of a zero load.

9. The device in accordance with claim 8, wherein, following a movement of the holding arm into a working position, at least one of the values of the force components at zero load is detected by the zero-load detection stage.

10. The device in accordance with claim 8, wherein, following mounting of a coupling element to the holding arm, at least one of the values of the force components at zero load is detected by the zero-load detection stage.

11. The device in accordance with claim 1, wherein, following a detection of at least one of the values of the force components at zero load, at least one of the values of the force components at zero load is detected once more after a predefined time.

12. The device in accordance with claim 1, wherein the evaluation unit, by means of a load detection stage for determining at least one of the load-induced values of the force components, subtracts the corresponding values of the force components delivered at zero load from the values of the force components delivered when a force is acting on the coupling element.

13. The device in accordance with claim 12, wherein the load detection stage performs a determination of one value of the force components on the coupling element, provided an on-board function of the motor vehicle is performed.

14. The device in accordance with claim 12, wherein the load detection stage performs a determination of one of the values of the force components on the coupling element if a plug is inserted into a socket associated with the holding arm.

15. The device in accordance with claim 12, wherein the load detection stage performs a determination of one of the values of the force components on the coupling element following recognition of an object, comprising a trailer or a load carrier, engaging with the coupling element.

16. The device in accordance with claim 12, wherein the load detection stage performs a determination of one of the values of the force components on the coupling element when the speed of the motor vehicle is less than five kilometres per hour.

17. The device in accordance with claim 1, wherein the evaluation unit, by means of a presentation stage, transmits at least one load-induced value of the force components acting on the coupling element.

18. The device in accordance with claim 1, wherein the evaluation unit, by means of a presentation stage, transmits at least one value of the load-induced force component acting in the vertical direction on the coupling element.

19. The device in accordance with claim 1, wherein the evaluation unit, by means of a presentation stage, transmits at least one value of the load-induced force component acting on the coupling element in the direction of travel.

20. The device in accordance with claim 1, wherein the values of the force components and the sensor values acting on the coupling element are linked by means of transformation coefficients.

21. The device in accordance with claim 1, wherein the evaluation unit, by means of a presentation stage, transmits at least one value of the load-induced force component acting transversely to a vertical longitudinal median plane of the holding arm.

22. The device in accordance with claim 1, wherein a presentation stage, by means of a presentation unit, indicates the at least one value of the particular force component and also indicates the measurement accuracy associated with this value.

23. The device in accordance with claim 1, wherein a presentation stage by means of the presentation unit qualitatively indicates the at least one value of the particular force component.

24. The device in accordance with claim 1, wherein a presentation stage, by means of the presentation unit, indicates the at least one value of the load-induced force component acting on the coupling element in the vertical direction in relation to a predefined support load for the respective motor vehicle.

25. The device in accordance with claim 1, wherein a presentation stage transmits at least one of the values of the force components acting on the coupling element to an electronic stabilisation system of the motor vehicle.

26. The device in accordance with claim 1, wherein a presentation stage transmits at least one of the values of the force components acting on the coupling element to a chassis control system of the motor vehicle.

27. The device in accordance with claim 1, wherein the deformation sensors are arranged relative to the holding arm such that they deliver different sensor values under the action of a force having an identical value in each of the three spatial directions.

28. The device in accordance with claim 1, wherein four deformation sensors are arranged on the holding arm and deliver different sensor values in the event of a force acting with the same magnitude in the various spatial directions running transversely to one another.

29. The device in accordance with claim 1, wherein the sensor values delivered by the deformation sensors are linked by means of transformation coefficients of a transformation matrix to the values of the force components in the three spatial directions running transversely to one another.

30. The device of claim 1, wherein all deformation sensors of the sensor arrangement are arranged on the common face of the deformation transfer element.

31. A device, which can be mounted on the rear end of a motor vehicle body, for coupling a trailer or a load carrier unit, comprising a holding arm, which at a first end is fixedly connected to the motor vehicle body during operation and which, at a second end, is configured to support a coupling element, wherein the holding arm is provided with a sensor arrangement, the holding arm is provided with at least three deformation sensors, which respond in different ways to three forces acting on the coupling element in spatial directions running transversely to one another, and the at least three deformation sensors deliver sensor values, on the basis of which at least one force component acting on the coupling element is determined by means of an evaluation unit, wherein the evaluation unit, by means of a zero-load detection stage, prior to determination of the force components on the coupling element, detects the values of the force components in the case of a zero load, wherein the values of the force components at zero load are stored by the zero-load detection stage only if the values of the force components drop below predefined values ruling out an external force on the coupling element.

32. A device, which can be mounted on the rear end of a motor vehicle body, for coupling a trailer or a load carrier unit, comprising a holding arm, which at a first end is fixedly connected to the motor vehicle body during operation and which, at a second end, is configured to support a coupling element, wherein the holding arm is provided with a sensor arrangement, the holding arm is provided with at least three deformation sensors, which respond in different ways to three forces acting on the coupling element in spatial directions running transversely to one another, and the at least three deformation sensors deliver sensor values, on the basis of which at least one force component acting on the coupling element is determined by means of an evaluation unit, wherein the evaluation unit, by means of a zero-load detection stage, prior to determination of the force components on the coupling element, detects the values of the force components in the case of a zero load, wherein, in the event of recognition of movement towards a trailer or a load carrier, at least one of the values at zero load is detected by the zero-load detection stage.

33. A device, which can be mounted on the rear end of a motor vehicle body, for coupling a trailer or a load carrier unit, comprising a holding arm, which at a first end is fixedly connected to the motor vehicle body during operation and which, at a second end, is configured to support a coupling element, wherein the holding arm is provided with a sensor arrangement, the holding arm is provided with at least three deformation sensors, which respond in different ways to three forces acting on the coupling element in spatial directions running transversely to one another, and the at least three deformation sensors deliver sensor values, on the basis of which at least one force component acting on the coupling element is determined by means of an evaluation unit, wherein a presentation stage, by means of the presentation unit, indicates the at least one value of the force component acting in the direction of travel in relation to a maximum tractive force.

34. A device, which can be mounted on the rear end of a motor vehicle body, for coupling a trailer or a load carrier unit, comprising a holding arm, which at a first end is fixedly connected to the motor vehicle body during operation and which, at a second end, is configured to support a coupling element, forces acting on the coupling element during operation and transferred from the holding arm to the motor vehicle body are detected by an evaluation unit with a sensor arrangement which has at least three deformation sensors, and the at least three deformation sensors of the sensor arrangement are part of a deformation transfer element connected to the holding arm and arranging the deformation sensors on the holding arm, the deformation transfer element being arranged on the same side of a neutral fibre of the holding arm not length-variable under a bending deformation of the holding arm.

35. A method for detecting the force on the device of claim 34, comprising transmitting at least one of the values of the force components acting on the coupling element to a chassis control system of the motor vehicle.

* * * * *